US012738225B2

(12) United States Patent
Ishii

(10) Patent No.: US 12,738,225 B2
(45) Date of Patent: Sep. 15, 2026

(54) DISPLAY DEVICE

(71) Applicant: Japan Display Inc., Tokyo (JP)

(72) Inventor: Tatsuya Ishii, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/209,195

(22) Filed: May 15, 2025

(65) Prior Publication Data

US 2025/0372039 A1 Dec. 4, 2025

(30) Foreign Application Priority Data

Jun. 4, 2024 (JP) ................................ 2024-091001

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2011/0285691 A1 11/2011 Takasugi et al.
2023/0197003 A1* 6/2023 Her ..................... G09G 3/3233 345/690

* cited by examiner

*Primary Examiner* — Carl Adams
(74) *Attorney, Agent, or Firm* — K&L Gates LLP

(57) ABSTRACT

A display device includes a first transistor connected to a first node, switching of the first transistor controlled by a first control signal, a second transistor connected to a second node and a third node, a third transistor connected between the first and the second nodes, switching of the third transistor controlled by a second control signal, a fourth transistor connected to the second node, switching of the fourth transistor controlled by a third control signal, a fifth transistor connected to the third node, switching of the fifth transistor controlled by a fourth control signal, a sixth transistor connected to the fourth node, switching of the sixth transistor controlled by a third control signal, a first capacitive element connected between the first and the fourth nodes, a second capacitive element connected between the third and the fourth nodes, and a light-emitting element connected to the second transistor.

18 Claims, 42 Drawing Sheets

DISPLAY DEVICE

CROSS-REFERENCE TO RELATED APPLICATIONS

This application claims the benefit of priority to Japanese Patent Application No. 2024-091001 filed on Jun. 4, 2024, the entire contents of which are incorporated herein by reference.

FIELD

An embodiment of the present invention relates to a display device.

BACKGROUND

In recent years, a display device including a light-emitting device has been mounted on a television, a smartphone, or the like, and is becoming popular. For example, the display device includes a plurality of pixels and a control circuit for driving the plurality of pixels. Each of the plurality of pixels includes a plurality of transistors, a capacitive element, and a light-emitting device. The light-emitting device is an element that emits light in a self-luminous manner, and is, for example, a light-emitting diode (Light Emitting Diode: LED), a minute light-emitting diode (micro-LED), or an organic electroluminescence (Electro Luminescence: EL) element. In the display device, the control circuit supplies a voltage to each of the plurality of pixels, so that a current corresponding to the supplied voltage value flows to the light-emitting device included in each of the plurality of pixels. Each light-emitting devices emits light with a luminance corresponding to a current flowing through the light-emitting device, and a pixel including the light-emitting device can display an image with a gradation corresponding to the luminance.

For example, there is known an organic light emitting diode display device that detects a threshold voltage of a drive transistor included in a pixel, and includes a program period in which a voltage corresponding to a threshold voltage-compensated data voltage is stored in a storage capacitor, and drives a light-emitting element.

SUMMARY

A display device includes a first transistor electrically connected between an image data signal line to which a data voltage is supplied and a first node, switching of the first transistor controlled by a first control signal, a second transistor electrically connected between a power supply line to which a first constant voltage is supplied and a third node, the second transistor including a gate electrode electrically connected to a second node, a third transistor electrically connected between the first node and the second node, switching of the third transistor controlled by a second control signal different from the first control signal, a fourth transistor electrically connected to the second node, and supplying a reference voltage to the second node, switching of the fourth transistor controlled by a third control signal different from the first control signal and the second control signal, a fifth transistor electrically connected between an initialization voltage power supply line to which an initialization voltage is supplied and the third node, switching of the fifth transistor controlled by a fourth control signal different from the first control signal, the second control signal, and the third control signal, a sixth transistor electrically connected to the fourth node, and supplying the reference voltage to the fourth node, switching of the sixth transistor controlled by the third control signal, a first capacitive element electrically connected between the first node and the fourth node, a second capacitive element electrically connected between the third node and the fourth node, and a light-emitting element electrically connected to the second transistor.

A display device includes a first transistor and electrically connected between an image data signal line to which a data voltage is supplied and a first node, switching of the first transistor controlled by a first control signal, a second transistor electrically connected between a third node and a fourth node, the second transistor including a gate electrode electrically connected to a second node, a third transistor electrically connected between a reference voltage power supply line to which a reference voltage is supplied and the first node, switching of the third transistor controlled by a second control signal different from the first control signal, a fourth transistor electrically connected between the second node and the fourth node, switching of the fourth transistor controlled by the second control signal, a fifth transistor electrically connected between a reset voltage power supply line to which a reset voltage is supplied and the fourth node, switching of the fifth transistor controlled by a third control signal different from the first control signal and the second control signal, a sixth transistor electrically connected between an initialization voltage power supply line to which an initialization voltage is supplied and the third node, switching of the sixth transistor controlled by a fourth control signal different from the first control signal, the second control signal, and the third control signal, a seventh transistor electrically connected between a power supply line through which a constant voltage is supplied and the fourth node, switching of the seventh transistor controlled by a fifth control signal different from the first control signal, the second control signal, the third control signal, and the fourth control signal, a first capacitive element electrically connected between the first node and the second node, a second capacitive element electrically connected between the first node and the third node, and a light-emitting element electrically connected to the third node.

A display device includes a first transistor electrically connected between an image data signal line to which a data voltage is supplied and a third node, switching of the first transistor controlled by a first control signal, a second transistor electrically connected between the third node and a fourth node, the second transistor including a gate electrode electrically connected to a second node, a third transistor electrically connected between the second node and the fourth node, switching of the third transistor controlled by a second control signal different from the first control signal, a fourth transistor electrically connected between a reference voltage power supply line to which a reference voltage serving as an initialization voltage is supplied and the third node, switching of the fourth transistor controlled by the second control signal, a fifth transistor electrically connected between the fourth node and a fifth node, switching of the fifth transistor controlled by a third control signal different from the first control signal and the second control signal, a sixth transistor the third control signal, and electrically connected between the reference voltage power supply line and the first node, switching of the sixth transistor controlled by a fourth control signal different from the first control signal, the second control signal, a seventh transistor electrically connected between a reference voltage line to which a reference voltage is supplied and the third node, switching of the seventh transistor controlled by a fifth control signal different from the first control signal, the second control signal, the third control signal, and the fourth control signal, an eighth transistor electrically connected between a power supply line to which a constant voltage is supplied and the fifth node, switching of the eighth transistor controlled by the fourth control signal, a first capacitive element electrically connected between the first node and the second node, a second capacitive element electrically connected between the first node and the third node, and a light-emitting element electrically connected between the power supply line and the fifth node.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. Further, in order to make the description clearer, the drawings may be schematically represented with respect to the width, thickness, shape, configuration, and the like of each part as compared with the actual embodiment, but the drawings are merely examples, and do not limit the interpretation of the present invention. In addition, it should be noted that the terms "first" and "second" for each element are merely labels used for convenience to distinguish each element, and do not have any further meaning unless otherwise specified.

Also, in the present specification, the expression "a includes A, B, or C," "a includes any of A, B, and C," "a includes one selected from a group consisting of A, B, and C," and the like does not exclude cases where a includes a plurality of combinations of A to C unless otherwise specified. Furthermore, these expressions do not exclude the case where a includes other elements.

For example, a display device according to one embodiment of the present invention is a display device using EL elements as a self-luminous light-emitting device. For example, the display device using EL elements may be referred to as a self-luminous display device, an EL display device, or the like.

1. First Embodiment

[1-1. Overview of Display Device 10]

Figure 1:
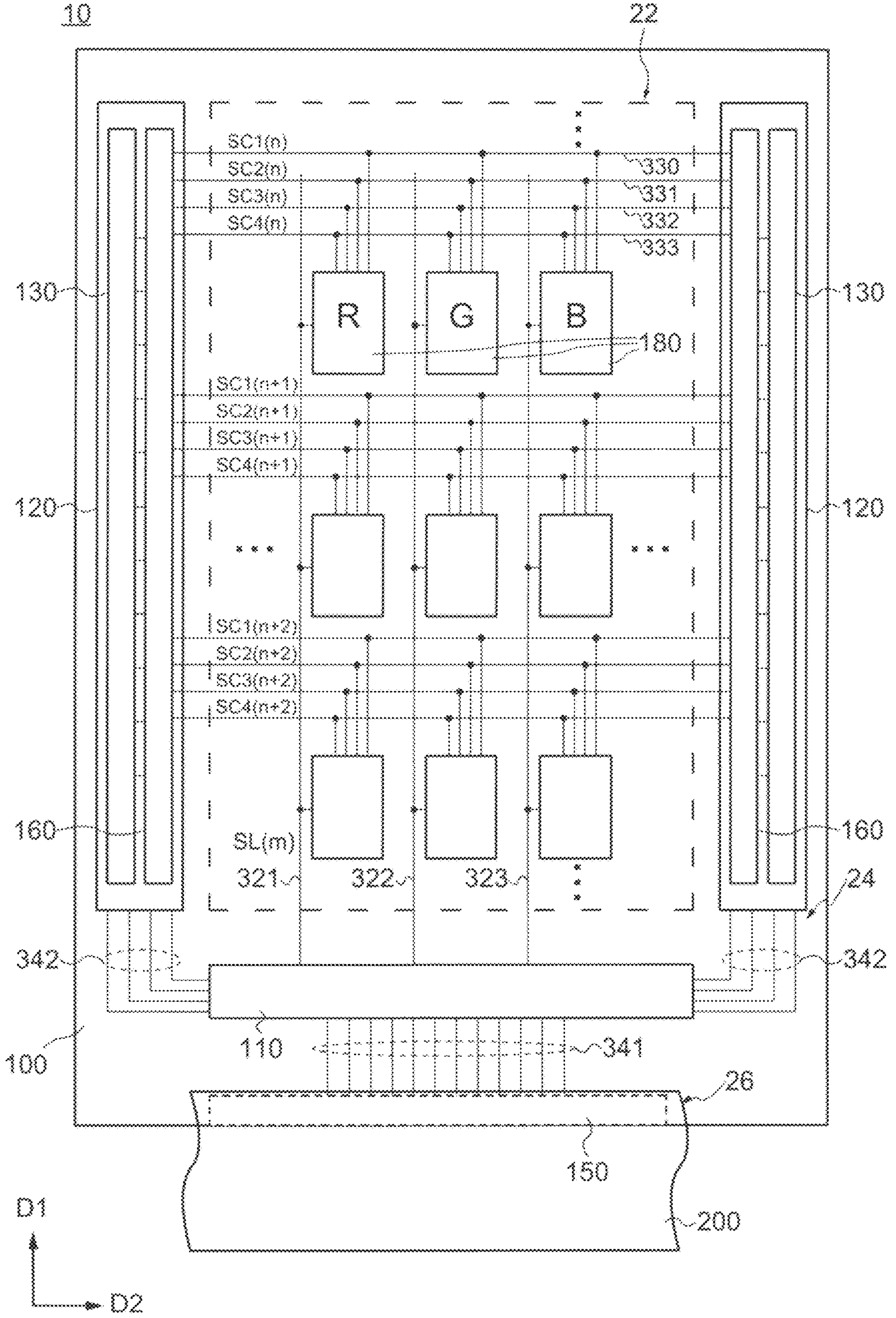
FIG. 1 is a schematic diagram showing a configuration of a display device according to a first embodiment of the present invention.

An overview of a display device 10 according to a first embodiment will be described with reference to FIG. 1. FIG. 1 is a schematic diagram showing a configuration of the display device 10. The configuration of the display device 10 shown in FIG. 1 is an example, and the configuration of the display device 10 is not limited to the configuration shown in FIG. 1.

The display device 10 includes an array substrate 100, a flexible printed circuit board 200 (FPC 200), and an IC chip 110. The display device 10 includes a display region 22 arranged on the array substrate 100, a peripheral region 24 surrounding the display region 22, and a terminal region 26.

In the display region 22, a plurality of pixels 180 is arranged in a matrix along a first direction D1 (column direction) and a second direction D2 (row direction) intersecting the first direction D1. The pixel 180 is the smallest unit constituting a part of the image to be displayed in the display region 22. Each of the plurality of pixels 180 may correspond to, for example, a sub-pixel R, a sub-pixel G, or a sub-pixel B. A single pixel may be formed by three sub-pixels. Arrangement of the pixels 180 is not limited, and the arrangement of the plurality of pixels 180 is, for example, a stripe arrangement. The arrangement of the display device 10 may be a delta arrangement, a pentile arrangement, or the like.

The sub-pixel R, the sub-pixel G, and the sub-pixel B are configured to display images of different colors. For example, each of the sub-pixel R, the sub-pixel G, and the sub-pixel B includes a light-emitting device including a light-emitting layer that emits red, green, or blue light. An arbitrary voltage or current is supplied to each of the three sub-pixels, and the display device 10 can display an image.

The peripheral region 24 is provided with the IC chip 110 and two control circuits 120. The two control circuits 120 are arranged on the left and right sides of the display region 22. The IC chip 110 is connected to a terminal portion 150 using a connection wiring 341. Each of the two control circuits 120 is connected to the IC chip 110 using a connection wiring 342. The peripheral region 24 may be referred to as a frame region. The connection wiring 341 may be referred to as the connection wiring 341 alone, and a bundle of a plurality of connection wirings 341 may be referred to as the connection wiring 341. Similar to the connection wiring 341, the connection wiring 342 may be referred to as the connection wiring 342 alone, and a bundle of a plurality of connection wirings 342 may be referred to as the connection wiring 342.

The terminal region 26 is provided with the terminal portion 150 and the FPC 200 electrically connected to the terminal portion 150. The terminal region 26 is a region on an opposite side of the peripheral region 24 in the first direction D1 from the region in which the display region 22 is arranged.

The FPC 200 is connected to an external device (not shown) outside the display device 10. The display device 10 is connected to an external device via the FPC 200 and the terminal portion 150 connected to the FPC. A control signal and voltage are transmitted from the external device to the display device 10 via the FPC 200 and the terminal portion 150 connected to the FPC. The display device 10 drives each pixel 180 provided in the display device 10 by using the received control signal and voltage from the external device. As a result, the display device 10 can display an image in the display region 22.

The IC chip 110 supplies signals, voltages, and the like for driving the respective pixels 180 to the two control circuits 120 and the respective pixels 180 (pixel circuits 181) via the FPC 200, the terminal portion 150, and the connection wiring 341.

In the present specification and the drawings, the IC chip 110, each of the two control circuits 120 and each of the IC chips 110 may be referred to as the control circuit alone, and a circuit group including the IC chip 110, each of the two control circuits 120 and a part or all of the IC chips 110 may be referred to as the control circuit.

[1-2. Configuration of IC Chip 110]

Referring to FIG. 1, an overview of the IC chip 110 will be described. The IC chip 110 is arranged at a position adjacent to the display region 22 in the first direction D1. Image data signal lines 321, 322, and 323 extend from the IC chip 110 in the first direction D1 and are connected to the plurality of pixels 180 arranged in the first direction D1.

For example, the IC chip 110 includes a plurality of selection circuits (not shown). For example, each of the plurality of selection circuits is a switch which is controlled based on an ON signal and an OFF signal supplied to a selection signal. The selection circuit is selected by the ON signal supplied to the selection signal and supplies an image data signal SL(m) including a data signal VDATA to the image data signal line 321 and the pixel 180 electrically connected to the image data signal line 321. The selection signal and the image data signal SL(m) are transmitted from the external device to the IC chip 110 via the FPC 200 and the terminal portion 150 connected to the FPC. For example, the data signal VDATA (the image data signal SL(m)) includes a data voltage equal to or higher than a voltage VSIGL (see FIG. 5) and equal to or lower than a voltage VSIGH (see FIG. 5).

For example, the ON signal is a signal including a voltage that conducts the selection circuit (switch), and the OFF signal is a signal including a voltage that cuts off the selection circuit (switch). In the present disclosure, the ON signal may be a high-level voltage (potential) (high, High, HI), the OFF signal may be a low-level voltage (potential) (low, Low, LO), the ON signal may be a low-level voltage (potential) (low, Low, LO), and the OFF signal may be a high-level voltage (potential) (high, High, HI). The high-level voltage is greater (higher) than the low-level voltage. In the display device according to one embodiment of the present specification, as an example, the ON signal is a high-level voltage and the OFF signal is a low-level voltage.

[1-3. Configuration of Control Circuit 120]

An overview of the control circuit 120 will be described with reference to FIG. 1. The two control circuits 120 are arranged at positions adjacent to both sides of the display region 22 with respect to the second direction D2 of the display region 22. A scan signal line 330, a scan signal line 331, a scan signal line 332, and a scan signal line 333 extend from the control circuit 120 in the second direction D2 and are connected to the plurality of pixels 180 arranged in the second direction D2. As an example, each scan signal line of the display device 10 shown in FIG. 1 is connected to both of the two control circuits 120. Each scan signal line may be connected to one of the control circuits 120. That is, an n-th scan signal line may be electrically connected to the control circuit 120 on the right side with respect to the second direction D2 of the display region 22, and an n+1-th scan signal line may be electrically connected to the control circuit 120 on the left side with respect to the second direction D2 of the display region 22. The number n is a positive integer.

The control circuit 120 includes a shift register circuit 130 and a scan driver circuit 160. For example, the control circuit 120 is a gate driver, and receives a control signal including a clock signal, a start pulse, a plurality of enable signals, and the like, and voltages such as a drive voltage VDDEL (see FIG. 2) and a reference voltage VSSEL (see FIG. 2). The control circuit 120 can sequentially select the scan lines according to the input of the control signal and the power supply.

The shift register circuit 130 is electrically connected to the scan driver circuit 160. The shift register circuit 130 includes a plurality of shift registers (not shown). Further, the shift register circuit 130 is supplied with the plurality of control signals described above via the plurality of connection wirings 342, the drive voltage VDDEL is supplied via a drive power supply line PVDD (see FIG. 2), and the reference voltage VSSEL is supplied via a reference voltage line PVSS (see FIG. 2). The shift register circuit 130 has a role of generating a plurality of output signals (not shown) shifted at different timings based on the plurality of control signals described above, and sequentially outputting the output signals to the scan driver circuit 160.

The scan driver circuit 160 includes a plurality of scan drivers. For example, the plurality of scan drivers is supplied with the plurality of output signals from the shift register circuit 130, the plurality of enable signals described above are supplied from the IC chip 110 via the plurality of connection wirings 342, the drive voltage VDDEL is supplied via the drive power line PVDD, and the reference voltage VSSEL is supplied via the reference voltage line PVSS. The plurality of scan drivers sequentially supply scan signals having different timings (for example, a first scan signal SC1(*n*), a second scan signal SC2(*n*), a third scan signal SC3(*n*), and a fourth scan signal SC4(*n*)) to the respective scan signal lines based on the plurality of output signals and the plurality of enable signals, and drive the pixel 180 (the pixel circuit 181) electrically connected to the respective scan signal lines. For example, the fourth scan signal SC4(*n*) and the scan signal line 333 to which the fourth scan signal SC4(*n*) is supplied is a so-called scan signal and scan signal line.

[1-4. Configuration of Pixel 180]

Figure 2:
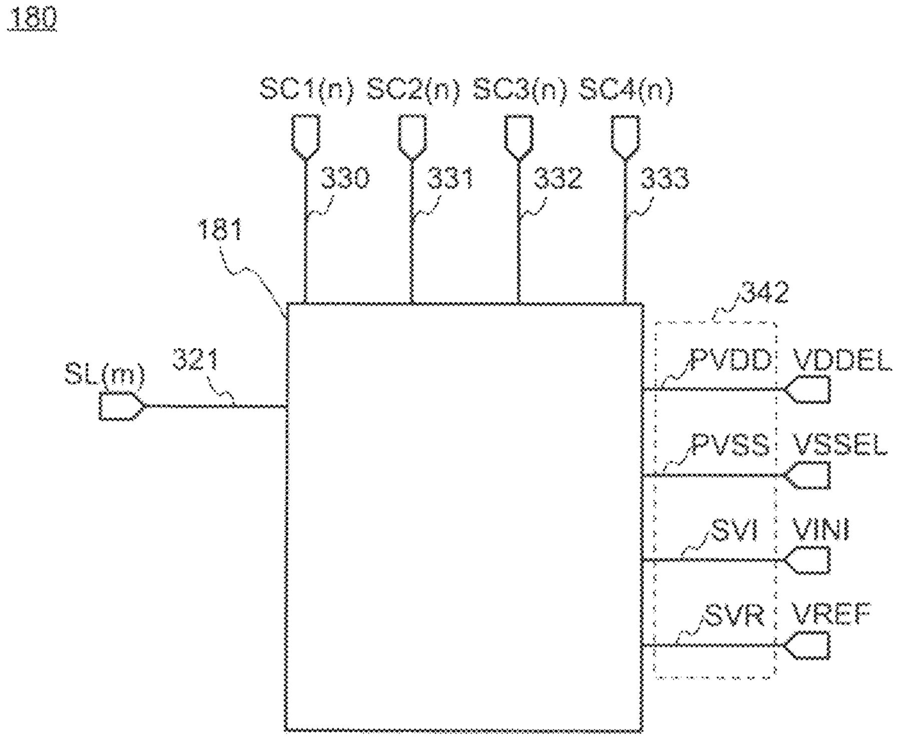
FIG. 2 is a schematic diagram showing an input signal to a pixel circuit according to the first embodiment of the present invention.
Figure 3:
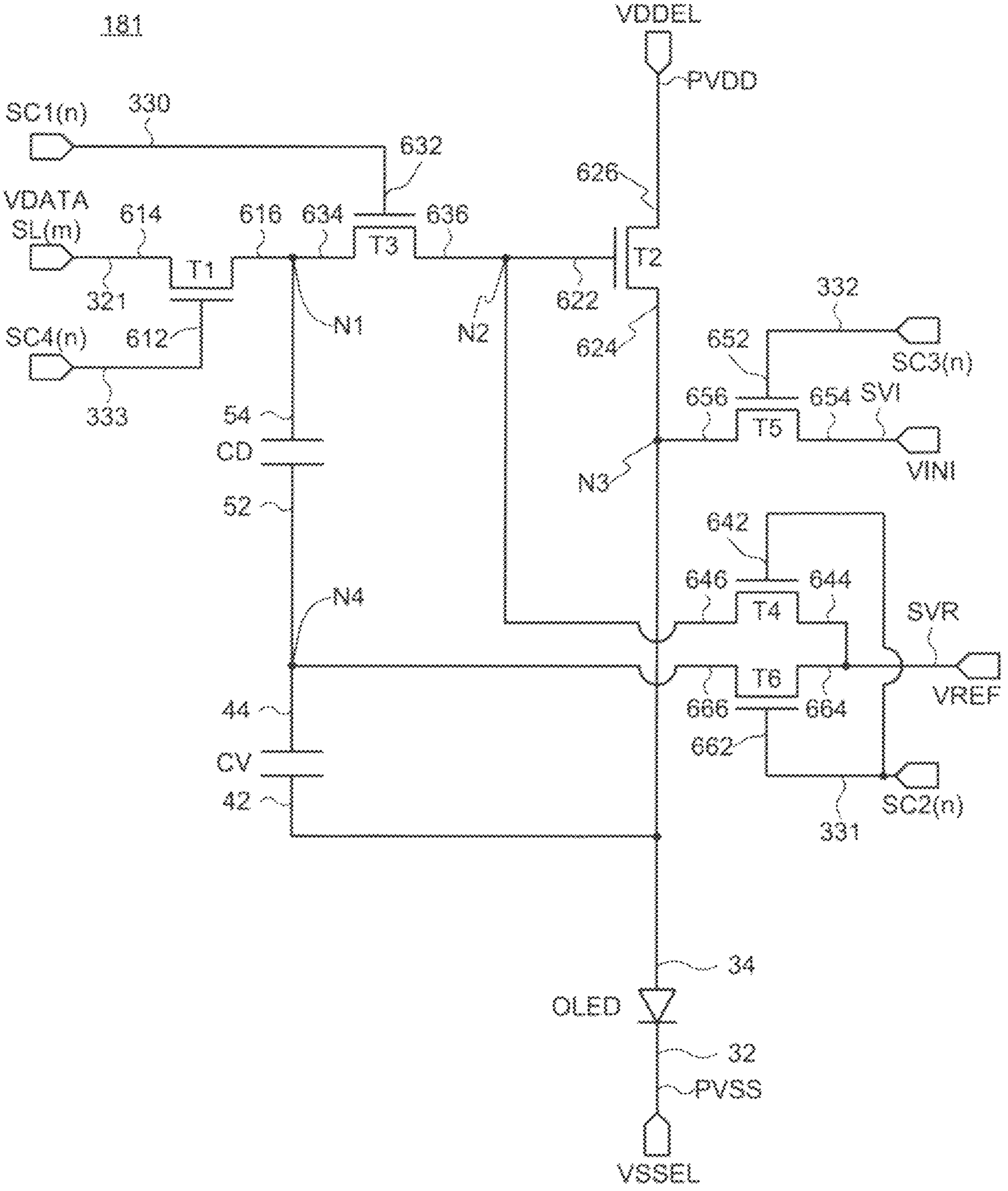
FIG. 3 is a circuit diagram showing a configuration of the pixel circuit according to the first embodiment of the present invention.

Referring to FIG. 1 to FIG. 3, an overview of the pixel 180 and the pixel circuit 181 will be described. FIG. 2 is a schematic diagram showing an input signal to the pixel circuit 181 included in the pixel 180. FIG. 3 is a circuit diagram showing a configuration of the pixel circuit 181. As an example, FIG. 2 and FIG. 3 show a configuration of the pixel circuit 181 of the pixel 180 shown in FIG. 1. Configurations of the pixel 180 and the pixel circuit 181 are not limited to the configuration shown in FIG. 1 to FIG. 3. Configurations that are the same as or similar to those in FIG. 1 will be described as necessary.

The pixel circuit 181 is a circuit for driving the pixel 180. The pixel circuits of the sub-pixel R, the sub-pixel G, and the sub-pixel B included in the pixel 180 are the same as the pixel circuit 181, and differ in the colors emitted by light-emitting devices OLED. In the following explanation, a light-emitting device OLED that emits red light will be described as an example.

As shown in FIG. 2, the pixel circuit 181 is supplied with the image data signal SL(m), the first scan signal SC1(*n*), the second scan signal SC2(*n*), the third scan signal SC3(*n*), the fourth scan signal SC4(*n*), a reference voltage VREF, and an initialization voltage VINI. Further, as a power source for driving the pixel 180, the drive voltage VDDEL and the reference voltage VSSEL are supplied to the pixel circuit 181. For example, the reference voltage VREF, the initialization voltage VINI, the drive voltage VDDEL, and the reference voltage VSSEL may be constant voltages, and may be variable voltages that vary depending on the timings of the respective signals.

The reference voltage VREF is supplied to a reference voltage power supply line SVR, the initialization voltage VINI is supplied to an initialization voltage power supply line SVI, the drive voltage VDDEL is supplied to the drive power supply line PVDD, and the reference voltage VSSEL is supplied to the reference voltage line PVSS. For example, the reference voltage power supply line SVR, the initialization voltage power supply line SVI, the drive power supply line PVDD, and the reference voltage line PVSS are electrically connected to the connection wirings 342. Further, for example, each of the reference voltage power supply line SVR, the initialization voltage power supply line SVI, the drive power supply line PVDD, and the reference voltage line PVSS may be electrically connected to different connection wirings 342.

For example, the reference voltage VREF, the initialization voltage VINI, the drive voltage VDDEL, and the reference voltage VSSEL are supplied from an external device to the IC chip 110 via the FPC 200, the terminal portion 150, and the connection wiring 341. Further, for example, the reference voltage VREF, the initialization voltage VINI, the drive voltage VDDEL, and the reference voltage VSSEL are supplied from the IC chip 110 to the plurality of pixels 180 via the connection wiring 342, a pre-charge voltage power supply line SVP, the reference voltage power supply line SVR, the initialization voltage power supply line SVI, the drive power supply line PVDD, and the reference voltage line PVSS. In addition, although not shown, the reference voltage VREF, the initialization voltage VINI, the drive voltage VDDEL, and the reference voltage VSSEL may be connected from an external device to the plurality of pixels 180 via the FPC 200, the terminal portion 150, and the connection wiring 341, and may be connected to the reference voltage power supply line SVR, the initialization voltage power supply line SVI, the drive power supply line PVDD, and the reference voltage line PVSS without passing through the IC chip 110 and the connection wiring 342. For example, the reference voltage VREF, the initialization voltage VINI, and the reference voltage VSSEL are smaller than the drive voltage VDDEL.

As shown in FIG. 3, the pixel circuit 181 includes a first transistor T1, a second transistor T2, a third transistor T3, a fourth transistor T4, a fifth transistor T5, a sixth transistor T6, a capacitive element CD, a capacitive element CV, and the light-emitting device OLED. Each of these transistors includes a gate electrode and a pair of electrodes (a source electrode and a drain electrode) including a first electrode and a second electrode. Each of the capacitive element CD, the capacitive element CV, and the light-emitting device OLED has a pair of electrodes including a first electrode and a second electrode.

For example, the first transistor T1 is a selection transistor. The first transistor T1 has a function of supplying an image data signal SL(m) to a first node N1.

For example, the second transistor T2 is a driving transistor. A gate voltage is applied between a gate electrode 622 and a first electrode (source) 624 of the second transistor T2, the gate voltage being corrected for variation in a threshold voltage VTH based on the reference voltage VREF and the initialization voltage VINI. Further, the second transistor T2 controls an amount of current flowing from the driving power supply line PVDD to the light-emitting device OLED based on the gate voltage (voltage between the gate electrode 622 and the first electrode (source) 624) and the input image data signal SL(m) in which the variation in the threshold voltage VTH is corrected. That is, the second transistor T2 has a function of causing the light-emitting device OLED to emit light by supplying a drive voltage VDDEL to the light-emitting device OLED and supplying a current.

The third transistor T3 has a function of conducting the first node N1 and a second node N2 to provide the image data signal SL(m) to the second node N2.

The fourth transistor T4 has a function of conducting the second node N2 and the reference voltage power supply line SVR, supplying the reference voltage VREF to the second node N2, and initializing the second node N2.

The fifth transistor T5 has a function of conducting a third node N3 and the initialization voltage power supply line SVI to supply the initialization voltage VINI to the third node N3 and initializing the third node N3.

The sixth transistor T6 has a function of conducting a fourth node N4 and the reference voltage power supply line SVR, supplying the reference voltage VREF to the fourth node N4, and initializing the fourth node N4.

As will be described later, the capacitive element CV has a function of holding (storing) charges corresponding to the threshold voltage VTH of the second transistor T2.

The capacitive element CD has a function of holding (storing) charges corresponding to a data voltage (the voltage VSIGL (see FIG. 5) or higher and the voltage VSIGH (see FIG. 5) or lower) included in the image data signal SL(m) supplied to the first node N1.

The light-emitting device OLED has a diode characteristic and has a function of emitting light based on a current flowing through the light-emitting device OLED (that is, a drain current Ion of the second transistor T2).

The first transistor T1 includes a gate electrode 612, a first electrode 614, and a second electrode 616. The gate electrode 612 is electrically connected to the scan signal line 333. The first electrode 614 is electrically connected to the image data signal line 321. The second electrode 616 is electrically connected to the first node N1, a first electrode 634 of the third transistor T3, and a second electrode 54 of the capacitive element CD. As described above, the fourth scan signal SC4(*n*) is supplied to the scan signal line 333. Switching of the first transistor T1 is controlled using the fourth scan signal SC4(*n*). In other words, in the first transistor T1, a conduction state (ON state) and a non-conduction state (OFF state) are controlled by the fourth scan signal SC4(*n*). In the case where the signal supplied to the fourth scan signal SC4(*n*) is LO, the first transistor T1 becomes non-conductive. In the case where the signal supplied to the fourth scan signal SC4(*n*) is HI, the first transistor T1 becomes conductive.

The second transistor T2 includes the gate electrode 622, the first electrode 624, and a second electrode 626. The gate electrode 622 is electrically connected to the second node N2, a second electrode 636 of the third transistor T3, and a second electrode 646 of the fourth transistor T4. The first electrode 624 is electrically connected to the third node N3, a second electrode 656 of the fifth transistor T5, a first electrode 42 of the capacitive element CV, and a second electrode 34 of the light emitting device OLED. The second electrode 626 is electrically connected to the drive power supply line PVDD. The threshold voltage of the second transistor T2 is the threshold voltage VTH. In the second transistor T2, the conduction state (ON state) and the non-conduction state (OFF state) are controlled in accordance with a potential difference between the voltage supplied to the second node N2 and the voltage of the first electrode 624, a potential difference between the second electrode 626 and the first electrode 624, and the threshold voltage VTH. For example, in the case where the potential difference between the voltage supplied to the second node N2 and the voltage of the first electrode 624 is smaller than the threshold voltage VTH, and the potential difference between the second electrode 626 and the first electrode 624 is 0 V or less, the second transistor T2 becomes non-conductive. For example, in the case where the potential difference between the voltage supplied to the second node N2 and the voltage of the first electrode 624 is equal to or greater than the threshold voltage VTH, and the potential difference between the second electrode 626 and the first electrode 624 is 0 V or more, the second transistor T2 becomes conductive.

The third transistor T3 includes a gate electrode 632, the first electrode 634, and the second electrode 636. The gate electrode 632 is electrically connected to the scan signal line 330. As described above, the first scan signal SC1(*n*) is supplied to the scan signal line 330. The third transistor T3 is switched using the first scan signal SC1(*n*). In other words, the third transistor T3 is controlled to be in a conductive state (ON state) or a non-conductive state (OFF state) by the first scan signal SC1(*n*). In the case where the signal supplied to the first scan signal SC1(*n*) is HI, the third transistor T3 becomes conductive. In the case where the signal supplied to the first scan signal SC1(*n*) is LO, the third transistor T3 becomes non-conductive.

The fourth transistor T4 includes a gate electrode 642, a first electrode 644, and the second electrode 646. The gate electrode 642 is electrically connected to scan signal line 331. As described above, the second scan signal SC2(*n*) is supplied to the scan signal line 331. The first electrode 644 is electrically connected to a first electrode 664 of the sixth transistor T6 and to the reference voltage power supply line SVR. The reference voltage VREF is supplied to the reference voltage power supply line SVR. The fourth transistor T4 is switched using the second scan signal SC2(*n*). In other words, in the fourth transistor T4, the conduction state (ON state) and the non-conduction state (OFF state) are controlled by the second scan signal SC2(*n*). In the case where the signal supplied to the second scan signal SC2(*n*) is LO, the fourth transistor T4 becomes non-conductive, and in the case where the signal supplied to the scan signal line 330 is HI, the fourth transistor T4 becomes conductive.

The fifth transistor T5 includes a gate electrode 652, a first electrode 654, and the second electrode 656. The gate electrode 652 is electrically connected to the scan signal line 332. The first electrode 654 is electrically connected to the initialization voltage power supply line SVI. The third scan signal SC3(*n*) is supplied to the scan signal line 332. The fifth transistor T5 is switched using the third scan signal SC3(*n*). In other words, in the fifth transistor T5, the conduction state (ON state) and the non-conduction state (OFF state) are controlled by the third scan signal SC3(*n*). In the case where the signal supplied to the third scan signal SC3(*n*) is LO, the fifth transistor T5 becomes non-conductive, and in the case where the signal supplied to the third scan signal SC3(*n*) is HI, the fifth transistor T5 becomes conductive.

The sixth transistor T6 includes a gate electrode 662, the first electrode 664, and a second electrode 666. The gate electrode 662 is electrically connected to the scan signal line 331. The first electrode 664 is electrically connected to the reference voltage power supply line SVR. The second electrode 666 is electrically connected to the fourth node N4, a first electrode 52 of the capacitive element CD, and a second electrode 44 of the capacitive element CV. The second scan signal SC2(*n*) is supplied to the scan signal line 331. The sixth transistor T6 is switched using the second scan signal SC2(*n*). In other words, in the sixth transistor T6, the conduction state (ON state) and the non-conduction state (OFF state) are controlled by the second scan signal SC2(*n*). In the case where the signal supplied to the second scan signal SC2(*n*) is LO, the sixth transistor T6 becomes non-conductive, and in the case where the signal supplied to the second scan signal SC2(*n*) is HI, the sixth transistor T6 becomes conductive.

A first electrode 32 of the light-emitting device OLED is electrically connected to the reference voltage line PVSS. As described above, the reference voltage line PVSS is supplied with the reference voltage VSSEL. The first electrode 32 of the light-emitting device OLED is, for example, a cathode electrode, and the second electrode 34 of the light-emitting device OLED is, for example, an anode electrode.

For example, it is assumed that the conductive state of the transistor in the display device 10 indicates a state in which the source electrode and the drain electrode of the transistor are conductive and the transistor is turned on (ON), and the non-conductive state of the transistor in the display device 10 indicates a state in which the source electrode and the drain electrode of the transistor are non-conductive and the transistor is turned off (OFF). In addition, in each transistor, the source electrode and the drain electrode may be interchanged depending on a voltage or a potential supplied to each electrode. In addition, even when the transistor is in the OFF state, it can be easily understood by a person skilled in the art that a slight current flows, such as a leakage current.

Each of the transistors shown in FIG. 3 is an n-channel type field effect transistor, and includes a Group 14 element such as silicon or germanium, or an oxide exhibiting semiconductor characteristics in a channel region. For example, crystalline silicon can be used as the channel region having the Group 14 element. The crystalline silicon may be low-temperature polysilicon (LTPS) or single-crystal silicon. In addition, for example, a metal oxide having semiconductor characteristics can be used as an oxide exhibiting semiconductor characteristics. As an exemplary metal oxide having semiconductor properties, an oxide semiconductor containing two or more metals including indium (In) is used. As the metal oxide having semiconducting properties, in addition to indium, gallium (Ga), zinc (Zn), aluminum (Al), hafnium (Hf), yttrium (Y), zirconia (Zr), and lanthanoids may be used. Further, the metal oxide having semiconductor properties may be amorphous, may be crystalline, or may be a mixed phase of amorphous and crystalline.

For example, the transistors in the display device 10 are formed using thin film transistors (TFT). Channel regions of the transistors may be formed using single-crystal silicon, such as silicon wafers or SOI substrates. In addition, in the case where the display device 10 includes both the transistor including the Group 14 element in the channel region and the transistor including an oxide in the channel region that exhibits semiconducting properties, a method for manufacturing the display device 10 includes forming a semiconductor layer including the Group 14 element and forming a semiconductor layer including an oxide having the semiconductor characteristic (for example, an oxide semiconductor layer). The display device 10 may appropriately adapt the configuration of the transistor, connection of a storage capacitor, a power supply voltage, and the like according to the application and specifications.

For example, the leakage current of the transistor including the metal oxide having the semiconductor characteristics is extremely small. Therefore, if a transistor including a metal oxide having the semiconductor characteristics is used, a charge corresponding to a voltage (potential) written in the capacitor element is unlikely to escape from the capacitor element. As a result, by using the transistor including the metal oxide having the semiconductor characteristics, it is possible to hold the charge written in the capacitor for a long time. Also, under the same conditions of a gate-source voltage (potential difference between the gate electrode and a source electrode (Vgs)) and a source-drain voltage (for example, a potential difference between the source electrode and a drain electrode (Vds)), a drain current of the transistor including the metal oxide having semiconducting properties may be greater than a drain current of a transistor having crystalline silicon (for example, low-temperature polysilicon (LTPS)). As a result, under the same condition of the drain current, the gate-source voltage and the source-drain voltage of the transistor including the metal oxide having the semiconductor characteristics can be made smaller than those of the transistor having the crystalline silicon. Therefore, by using the transistor including the metal oxide having the semiconductor characteristics, power consumption of the display device 10 can be suppressed.

[1-5. Driving Method for Display Device 10]

A method for driving the display device 10 will be described with reference to FIG. 4 to FIG. 8. FIG. 4 to FIG. 8 are schematic diagrams showing timing charts of the display device 10. Configurations that are the same as or similar to those in FIG. 1 to FIG. 3 will be described as necessary.

In addition, a horizontal axis of the timing charts in the respective embodiments represents time (TIME). Further, in the image data signal SL(m) including the data signal VDATA in the respective embodiments, for example, the data signal VDATA supplied to the selected pixel (pixel circuit) is indicated by a diagonal line as a data voltage equal to or higher than the voltage VSIGL and equal to or lower than the voltage VSIGH, and the data signal VDATA supplied to a pixel (pixel circuit) other than the selected pixel (pixel circuit) is omitted and indicated by a solid line. In practice, the data signal VDATA supplied to the pixels (pixel circuits) other than the selected pixels (pixel circuits) is continuously or intermittently supplied to the image data signal SL(m) including the data signal VDATA in the respective embodiments.

Figure 4:
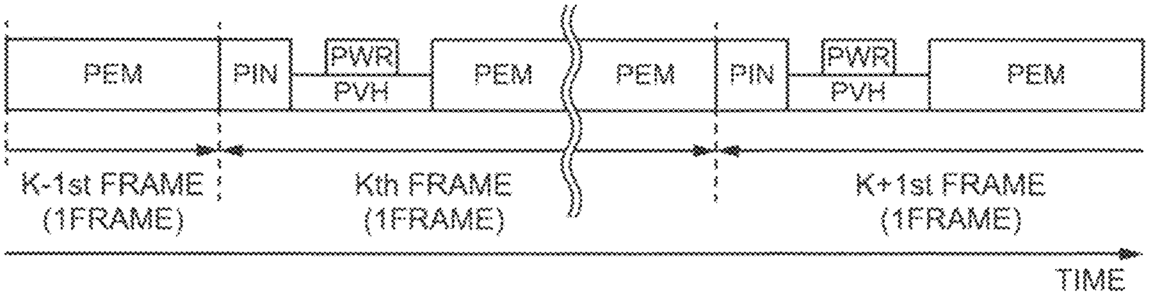
FIG. 4 is a timing chart of the display device according to the first embodiment of the present invention.

For example, the frequency at which the display device 10 is driven is 60 Hz, and one frame (1FRAME) is driven by 60 Hz. For example, FIG. 4 shows a current frame (KthFRAME), a part of a frame immediately before the current frame (K−1stFRAME), and a part of a frame immediately after the current frame (K+1stFRAME). In addition, FIG. 5 to FIG. 8 show an emission period PEM of the frame immediately before the current frame (K−1stFRAME), a period PIN, a period PWR, and a period PVH of the current frame (KthFRAME). FIG. 5 to FIG. 8 show one horizontal period (horizontal period HRP) for one pixel 180.

First, an outline of a driving method for the display device 10 will be described with reference to FIG. 4. As shown in FIG. 4, the driving methods of the display device 10 include at least an initialization period PIN (period PIN), a write period PWR (period PWR), and a threshold-obtaining and holding period PVH (period PVH) in one frame. In the pixel 180 included in the display device 10, the period PWR and the period PVH are executed after the period PIN. Further, after the emission period PEM of the frame immediately before the current frame, the period PIN, the period PWR, and the period PVH of the current frame are executed, and after the emission period PEM of the current frame, the period PIN, the period PWR, and the period PVH of the frame immediately after the current frame are executed.

The period PIN is a period in which the second node N2, the third node N3, and the fourth node N4 are initialized. The period PWR is a period in which the data signal VDATA is written to the pixel 180. The period PVH is a period in which the threshold voltage of the second transistor T2 is obtained by performing an operation in which the potential difference Vgs of the second transistor T2 becomes equal to the threshold voltage, and charges corresponding to the threshold voltage are held in the third node N3 (the first electrode 42 of the capacitive element CV). Further, the emission period PEM is a period in which the pixel 180 emits light based on the written (supplied) data signal VDATA and the acquired threshold voltage of the second transistor T2 (threshold voltage correction). As an example, the period PWR shown in FIG. 4 overlaps the period PVH and is performed during the period PVH. The period PWR is not limited to the example shown in FIG. 4. For example, the period PWR may be performed during the period PIN and the period PVH, and may be performed during the period of initializing the third node N3 and the fourth node N4 and the period PIN.

Next, a specific driving method for the pixel 180 of the display device 10 will be described with reference to FIG. 4 to FIG. 8.

The pixel 180 receives the first scan signal SC1(*n*), the second scan signal SC2(*n*), the third scan signal SC3(*n*), the fourth scan signal SC4(*n*), the image data signal SL(m) including the data signal VDATA, the initialization voltage VINI, and the reference voltage VREF. For example, the pixel 180 is selected according to the timings of the first scan signal SC1(*n*), the second scan signal SC2(*n*), the third scan signal SC3(*n*), and the fourth scan signal SC4(*n*). The image data signal SL(m), the initialization voltage VINI, and the reference voltage VREF are input to the selected pixel 180 in accordance with the timings of the respective signals. A similar operation is performed on all the pixels 180, and an image of the frame corresponding to 1 FRAME is displayed in the display region 22 of the display device 10 based on the image data signal SL(m) input to all the pixels 180.

For example, the voltages (potentials) supplied to the respective signals and the respective nodes in the respective periods of the respective frames of the timing charts shown in FIG. 4 to FIG. 8 are shown in Table 1.

TABLE 1

| | Setting Value [V] |
|---|---|
| VTH | 1 |
| VSIGL(black) | 0.2 |
| VSIGH(white) | 4.2 |
| HI | 10 |
| LO | −4 |
| VINI | −2 |
| VREF | 1.4 |
| VDDEL | 8 |
| VSSEL | 0 |

[1-5-1. First Example of Driving Method for Display Device 10]

Figure 5:
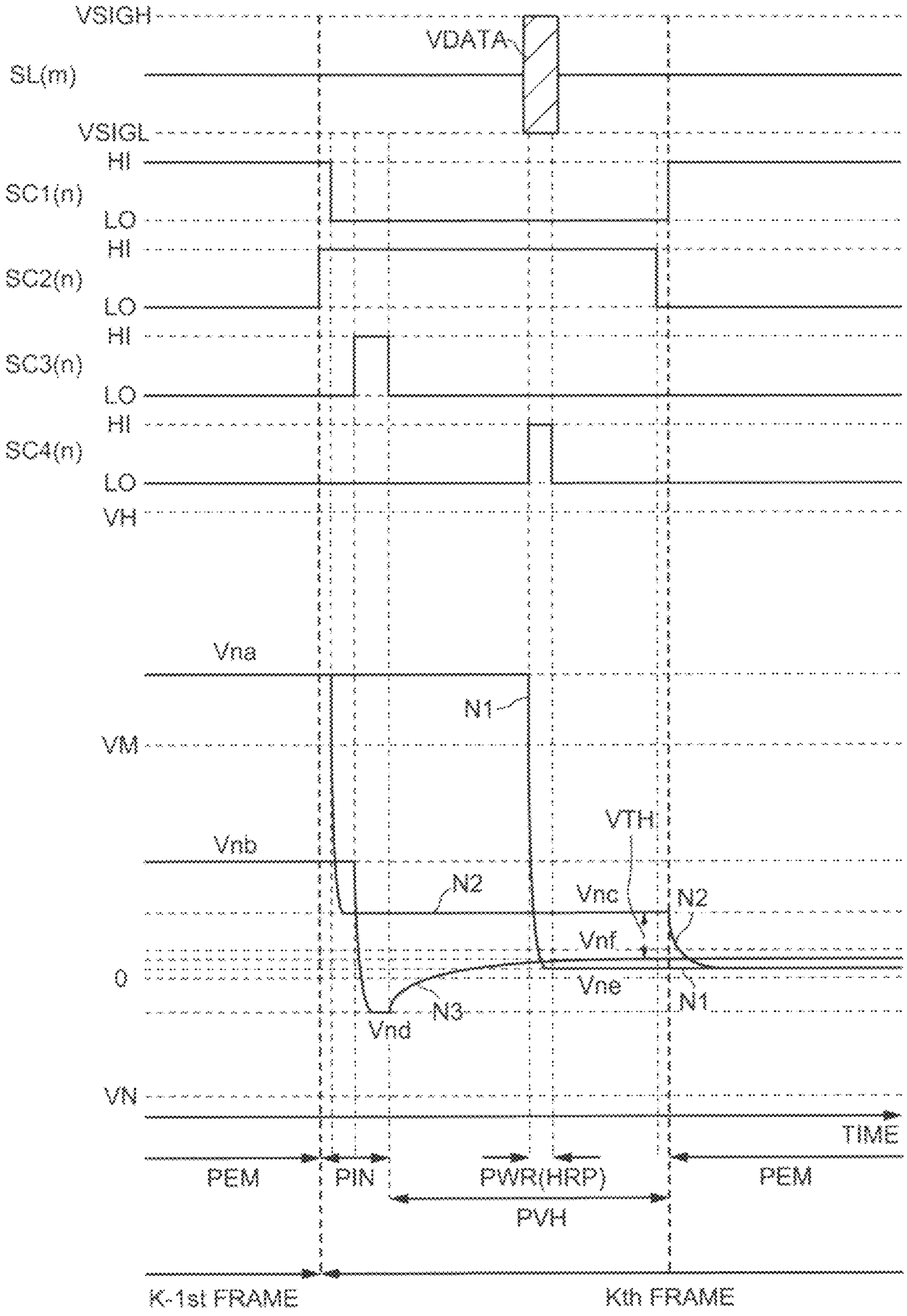
FIG. 5 is a timing chart of the display device according to the first embodiment of the present invention.

A first example of the driving method for the display device 10 will be described with reference to FIG. 5 and Table 1. The driving methods shown in the first embodiment include displaying a black image based on the voltage VSIGH of the data signal VDATA in the KthFRAME by the pixel 180 after the pixel 180 displays a white image based on the voltage VSIGH of the data signal VDATA in a frame (K−1stFRAME) immediately before the current frame (KthFRAME). In other words, the driving method shown in the first example includes displaying images of different colors in successive frames.

In accordance with each period (period PIN, period PWR (horizontal period HRP), and period PVH), the image data signal SL(m) including the data signal VDATA is input to each pixel 180. The data signal VDATA is analog data including a voltage equal to or higher than the voltage VSIGL and equal to or lower than the voltage VSIGH. For example, in the respective period PWR, a voltage equal to or higher than the voltage VSIGL and equal to or lower than the voltage VSIGH is selected by using a selection signal (not shown), and is supplied to the image data signal SL(m). For example, in a period (a period excluding the period PWR) in which data is not selected by using the selection signal, the data signal VDATA is applied with a voltage equal to or higher than the voltage VSIGL and equal to or lower than the voltage VSIGH based on the data signal VDATA to be written to the pixel circuit 181 in the corresponding row (n−* and n+*). As shown in Table 1, for example, the voltage VSIGL is 0.2 V, and the pixel 180 to which the voltage VSIGL is supplied does not emit light and becomes black. Further, for example, the voltage VSIGH is 4.2 V, and the pixel 180 to which the voltage VSIGH is supplied emits light and emits white color. For example, voltage VH (HI) is 10 V, voltage VL (LO) is −4 V, the reference voltage VREF is 1.4 V, the initialization voltage VINI is −2 V, voltage VM is 5 V, and voltage VN is −5 V.

The emission period PEM of the K−1stFRAME is a period in which the pixel 180 emits light according to the potential difference Vgs of the second transistor T2 (voltage supplied to the second node N2 (voltage V (N2))−voltage supplied to the third node N3 (voltage V (N3))). For example, the pixel 180 emits red light, and emits white light in three pixels using the pixel 180 emitting red light, the pixel 180 emitting blue light, and the pixel 180 emitting green light.

For example, in the emission period PEM of the K−1stFRAME, the image data signal SL(m) (data signal VDATA) is supplied with the voltage of the data signal VDATA supplied to pixels other than the selected pixel 180, the second scan signal SC2(*n*), the third scan signal SC3(*n*), and the fourth scan signal SC4(*n*) are supplied with LO, and the first scan signal SC1(*n*) is supplied with HI. The first transistor T1, the fourth transistor T4, the fifth transistor T5, and the sixth transistor T6 are in the OFF state, and the third transistor T3 is in the ON state. Further, for example, voltage Vna supplied to the first node N1 and the second node N2 is 6.3 V, voltage Vnb supplied to the third node N3 is 2.5 V, and the potential difference Vgs is 3.8 V. Therefore, the second transistor T2 can cause the current Ion to flow based on the potential difference Vgs and the potential difference Vds corresponding to the voltage VSIGH input in the horizontal period HRP of the K−1stFRAME. In addition, the second transistor T2 is in the ON state, the current Ion flows from the drive power supply line PVDD to the light-emitting device OLED and the reference voltage line PVSS, and the light-emitting device OLED emits light.

In an initial period of the period PIN of the KthFRAME following the light emission period PEM of the K−1stFRAME, The data signal VDATA is supplied (to pixels) other than the selected pixel 180. The first scan signal SC1(*n*) is supplied with LO from a state where HI is supplied. In the case where the first scan signal SC1(*n*) is supplied with LO, the second scan signal SC2(*n*) changes from a state in which LO is supplied to a state in which HI is supplied. The third scan signal SC3(*n*) and the fourth scan signal SC4(*n*) are supplied with LO. Therefore, the third transistor T3 is turned from the ON state to the OFF state, the fourth transistor T4 and the sixth transistor T6 are turned from the OFF state to the ON state, and the first transistor T1 and the fifth transistor T5 are maintained in the OFF state. Consequently, the voltage supplied to the first node N1 and the voltage supplied to the third node N3 maintain the voltage Vna, and the voltage supplied to the second node N2 gradually drops from the voltage Vna toward the voltage Vnc (reference voltage VREF, 1.4 V) and becomes the voltage Vnc. Further, although not shown, the voltage supplied to the fourth node N4 gradually drops toward the voltage Vnc (reference voltage VREF, 1.4 V) and becomes the voltage Vnc. The second transistor T2 is turned from the ON state to the OFF state in accordance with the potential difference Vgs, and the light-emitting device OLED does not emit light because the drain current Ion does not flow through the light-emitting device OLED.

In the period PIN following the initial period of the period PIN, the voltage of the data signal VDATA supplied to the pixels other than the selected pixel 180 is supplied, the second scan signal SC2(*n*) is maintained in the state where HI is supplied, and the first scan signal SC1(*n*) and the fourth scan signal SC4(*n*) are maintained in the state where LO is supplied. The third scan signal SC3(*n*) is supplied with HI from the state where LO is supplied. Therefore, the fifth transistor T5 changes from the OFF state to the ON state, and the second transistor T2 changes from the OFF state to the ON state. The sixth transistor T6 and the fourth transistor T4 remain in the ON state, and the first transistor T1 and the third transistor remain in the OFF state.

Consequently, the voltage supplied to the first node N1 maintains the voltage Vna, and the voltage supplied to the second node N2 and the voltage supplied to the fourth node N4 maintain the voltage Vnc. The voltage supplied to the third node N3 gradually drops from the voltage Vnb toward the voltage Vnd (initialization voltage VINI, −2 V) and becomes the voltage Vnd. The potential difference Vgs is 3.4 V (1.4 V−(−2 V)) and the potential difference Vds is 10 V (8 V−(−2 V)). Although the second transistor T2 is turned from the OFF state to the ON state, the fifth transistor T5 is in the ON state, and a current flows from the drive power supply line PVDD to the initialization voltage power supply line SVI, so that the light-emitting device OLED does not emit light. At this time, the capacitive element CD holds a charge corresponding to the potential difference between the voltage Vna supplied to the first node N1 and the voltage Vnc supplied to the fourth node N4 and maintains the potential difference, and the capacitive element CV holds a charge corresponding to the potential difference between the voltage Vnc supplied to the fourth node N4 and the voltage Vnd supplied to the third node N3 and maintains the potential difference. The voltage supplied to the fourth node N4 is the same as the voltage supplied to the second node N2, and the capacitive element CV maintains the potential difference Vgs (the potential difference between the voltage supplied to the gate electrode 622 and the voltage supplied to the first electrode 624 of the second transistor T2).

As described above, in the period PIN, the second node N2 and the fourth node N4 are initialized by the reference voltage VREF (1.4 V), and the third node N3 is initialized by the initialization voltage VINI (−2 V).

In the period PVH following the period PIN, the voltage of the data signal VDATA supplied to the pixels other than the selected pixel 180 is supplied, the second scan signal SC2(*n*) is maintained in the state where HI is supplied, and the first scan signal SC1(*n*) and the fourth scan signal SC4(*n*) are maintained in the state where LO is supplied. The third scan signal SC3(*n*) is supplied with LO from the state where HI is supplied. Therefore, the fifth transistor T5 is turned from the ON state to the OFF state, the second transistor T2, the sixth transistor T6, and the fourth transistor T4 are maintained in the ON state, and the first transistor T1 and the third transistor are maintained in the OFF state.

Consequently, the voltage supplied to the first node N1 maintains the voltage Vna, and the voltage supplied to the second node N2 and the voltage supplied to the fourth node N4 maintain the voltage Vnc. When the fifth transistor T5 is turned off, the voltage supplied to the third node N3 is released. Further, the drain current Ion of the second transistor T2 starts to charge the third node N3, and gradually increases from the voltage Vnd toward voltage Vnf. The voltage supplied to the third node N3 may be the voltage Vnf. The voltage Vnf (0.4 V) is a voltage at which the potential difference Vgs becomes the threshold voltage VTH (1 V) of the second transistor T2.

In the middle of the period PVH, a period PWR that is parallel to (overlaps) the period PVH is executed. In the period PWR, the image data signal SL(m) is supplied with the voltage VSIGL (0.2 V). The first scan signal SC1(*n*) and the third scan signal SC3(*n*) remain in a state in which LO is supplied, and the second scan signal SC2(*n*) remains a state in which HI is supplied. The fourth scan signal SC4(*n*) is supplied with HI from a state where LO is supplied. Therefore, the first transistor T1 is turned from the OFF state to the ON state, the fourth transistor T4 and the sixth transistor T6 are maintained in the ON state, and the third transistor T3 and the fifth transistor T5 are maintained in the OFF state. In addition, the period during which HI is supplied to the fourth scan signal SC4(*n*), that is, the period PWR (horizontal period HRP) may be longer than the period shown in FIG. 5. For example, the period during which HI is supplied to the fourth scan signal SC4(*n*) may be shorter than the period during which HI is supplied to the second scan signal SC2(*n*), may be longer than the period PIN, may be the same as the period PIN, and may be shorter than the period PIN.

Consequently, the voltage supplied to the first node N1 gradually drops toward the voltage Vne (voltage VSIGL (0.2 V)) to become the voltage Vne, and the voltage supplied to the second node N2 and the voltage supplied to the fourth node N4 maintain the voltage Vnc. The voltage supplied to the third node N3 gradually increases from the voltage Vnd toward the voltage Vnf. The voltage supplied to the third node N3 may be the voltage Vnf. At this time, the capacitive element CD holds a charge corresponding to a potential difference between the voltage Vne supplied to the first node N1 and the voltage Vnc supplied to the fourth node N4, and maintains the potential difference. That is, the capacitive element CD holds, with reference to the reference voltage VREF, charges corresponding to the potential difference with respect to the voltage of the data signal VDATA and maintains (holds) the voltage included in the data signal VDATA with reference to the reference voltage VREF.

As described above, in the period PWR, the data signal VDATA is written to the pixel 180. The capacitive element CD maintains (holds) the voltage included in the data signal VDATA.

In the period PVH after the period PWR, the image data signal SL(m) is supplied with the voltage of the data signal VDATA supplied to pixels other than the selected pixel 180, the fourth scan signal SC4(*n*) changes from the state supplied with HI to a state supplied with LO, and the first scan signal SC1(*n*) and the third scan signal SC3(*n*) remain the state in which LO is supplied. After a predetermined period of time has elapsed after the fourth scan signal SC4(*n*) is supplied with LO, the second scan signal SC2(*n*) changes from the state in which HI is supplied to the state in which LO is supplied. Therefore, the first transistor T1 is turned from the ON state to the OFF state, and the third transistor T3 and the fifth transistor T5 remain in the OFF state. After a predetermined period of time has elapsed after the first transistor T1 is turned off, the fourth transistor T4 and the sixth transistor T6 are turned OFF from the ON state.

Consequently, the voltage supplied to the first node N1 maintains the voltage Vne, and the voltage supplied to the second node N2 and the voltage supplied to the fourth node N4 maintain the voltage Vnc. The voltage supplied to the third node N3 gradually increases from the voltage Vnd toward the voltage Vnf and becomes the voltage Vnf. At this time, the potential difference Vgs is 1 V and is the same as the threshold voltage VTH (1 V), and the second transistor T2 is in the OFF state. Therefore, since the drain current Ion does not flow from the drive power supply line PVDD to the reference voltage line PVSS, the light emitting device OLED does not emit light. Further, as described above, the voltage supplied to the fourth node N4 is the same as the voltage supplied to the second node N2, and the capacitive element CV maintains the potential difference Vgs (the potential difference between the voltage supplied to the gate electrode 622 and the voltage supplied to the first electrode 624 of the second transistor T2) in order to hold the threshold voltage VTH.

As described above, in the period PVH, by the operation of making the potential difference Vgs of the second transistor T2 equal to the threshold voltage VTH, the threshold voltage VTH of the second transistor T2 is acquired, and a charge equivalent to the threshold voltage VTH is held in the capacitive element CV.

In the emission period PEM of the KthFRAME following the period PVH of the KthFRAME, the period in which the pixel 180 emits light is based on the voltage VSIGL supplied to the first node N1 and the potential difference Vsg between the voltage supplied to the second node N2 and the voltage supplied to the third node.

For example, in the light emission period PEM of the KthFRAME, the data signal VDATA supplied to pixels other than the selected pixel 180 is supplied. Further, the first scan signal SC1(*n*) is in the state in which LO is supplied to the state in which HI is supplied, and the second scan signal SC2(*n*), the third scan signal SC3(*n*), and the fourth scan signal SC4(*n*) remain in the state in which LO is supplied. Therefore, the first transistor T1, the second transistor T2, the fourth transistor T4, the fifth transistor T5, and the sixth transistor T6 remain in the OFF state, and the third transistor T3 changes from the OFF state to the ON state.

Consequently, the first node N1 is in conduction with the second node N2, the voltage supplied to the second node N2 gradually drops from the voltage Vnc toward the voltage Vne (0.2 V) to become the voltage Vnf, the voltage supplied to the first node N1 maintains the voltage Vne (0.2 V), and the voltage supplied to the third node N3 maintains the voltage Vnf (0.4 V).

In this case, the potential difference Vgs becomes a sum of the potential difference held in the capacitive element CD and the potential difference held in the capacitive element CV (voltage included in the data signal VDATA (voltage VSIGL (0.2 V)−reference voltage VREF (1.4 V)+threshold voltage VTH (1 V)=−0.2 V). That is, in the emission period PEM of the KthFRAME, the pixel 180 can display images based on the data signal VDATA and the corrected thresholds.

Specifically, since the potential difference Vds is 7.6 V and the potential difference Vgs (−0.2 V) is lower (smaller) than the threshold voltage VTH, the second transistor T2 is in the OFF state, and no current flows from the drive power supply line PVDD to the reference voltage line PVSS, so that the light-emitting device OLED does not emit light. As a result, for example, the pixel 180 emitting red becomes black. Also, similar to the pixel 180 that emits red light, the pixel 180 that emits blue light and the pixel 180 that emits green light do not emit light, and therefore, the three pixels that use the pixel 180 that emits red light, the pixel 180 that emits blue light, and the pixel 180 that emits green light become black.

The display device 10 includes the capacitive element CD electrically connected between the first node N1 or the second node N2 and the fourth node N4, the capacitive element CV electrically connected between the fourth node N4 and the third node N3, the fourth transistor T4 for supplying the reference voltage VREF to the second node N2, the fifth transistor T5 for supplying the initialization voltage VINI to the third node N3, the sixth transistor T6 for supplying the reference voltage VREF to the fourth node N4, and the first transistor T1 for supplying the data signal VDATA equal to or higher than the voltage VSIGL and equal to or lower than the voltage VSIGH to the first node T1. Further, the driving method for the display device 10 includes a configuration capable of independently controlling the supply of the reference voltage VREF to the second node N2 by the fourth transistor T4, the supply of the initialization voltage VINI to the third node N3 by the fifth transistor T5, the supply of the reference voltage VREF to the fourth node N4 by the sixth transistor T6, and the supply of the data signal VDATA equal to or higher than the voltage VSIGL and equal to or lower than the voltage VSIGH to the first node N1 by the first transistor T1. That is, using both the capacitive element CD and the capacitive element CV, the display device 10 is capable of performing in parallel the following operations: supplying the reference voltage VREF to the second node N2 via the fourth transistor T4, supplying the initialization voltage VINI to the third node N3 via the fifth transistor T5, supplying the reference voltage VREF to the fourth node N4 via the sixth transistor T6, and supplying the data signal VDATA to the first node N1 via the first transistor T1.

Consequently, for example, the display device 10 can generate the potential difference Vgs of the second transistor T2 by writing the data signal VDATA to the pixel 180, holding the voltage included in the data signal VDATA by the capacitive element CD, holding the potential difference (charge) corresponding to the threshold voltage VTH by the capacitive element CV, and coupling the capacitive element CD and the capacitive element CV. The potential difference Vgs is a voltage based on the data signal VDATA and the corrected threshold voltage VTH, and the pixel 180 is capable of displaying images according to the data signal VDATA and the voltage based on the corrected threshold voltage VTH. At this time, the period PWR corresponding to the period in which the data signal VDATA is written is shorter than the period PVH corresponding to the period in which the threshold voltage VTH is acquired and the potential difference (charges) corresponding to the threshold voltage VTH is held.

On the other hand, in the case where the display device including one storage capacitor stores a voltage corresponding to the data voltage whose threshold voltage is compensated, both the compensation of the threshold voltage and the writing of the data voltage are executed within the program period. That is, the display device including one storage capacitor performs charging and discharging of the storage capacitor corresponding to the compensation of the threshold voltage and charging and discharging of the storage capacitor corresponding to the writing of the data voltage within the program period. As a result, in the display device including one storage capacitor, since the time required for writing the data voltage depends on the time required for compensating the threshold voltage, the time required for writing the data voltage becomes long.

As described above, the display device 10 can independently control the respective nodes, and the period PWR can be shorter than the period PVH. Therefore, the display device 10 can shorten the time required to write the data signal VDATA and increase the writing speed of the data to the first node N1.

In addition, in the display device 10, the third node N3, the first electrode 42 of the capacitive element CV, and the second electrode 34 of the light-emitting device OLED are directly connected to each other. Consequently, while the first node N1 is in conduction with the second node N2, the potential of the third node N3 after the threshold voltage VTH is acquired becomes a potential after parasitic capacitance added to the light-emitting device OLED is also charged. Therefore, there is no redistribution of charges between the capacitive element CD, the capacitive element CV, and the parasitic capacitance added to the light-emitting device OLED. Therefore, since the voltage contained in the data signal VDATA supplied to the first node N1 and the second node N2 is not affected by the charge redistribution due to the factors described above, the display device 10 can suppress a decrease in the voltage included in the data signal VDATA supplied to the first node N1 and the second node N2 due to the charge redistribution. In other words, the display device 10 can efficiently hold the voltages included in the data signal VDATA supplied to the first node N1 and the second node N2.

In addition, the display device 10 can independently control the period PWR, and can execute the period PWR in parallel with the period PIN and the period PVH during the period PIN and the period PVH. As a result, the display device 10 is a display device that is highly flexible in the period PWR. Therefore, the display device 10 is a highly versatile display device including a configuration in which the period PWR can be adjusted according to the application and specifications of the display device.

[1-5-2. Second Example of Driving Method for Display Device 10]

Figure 6:
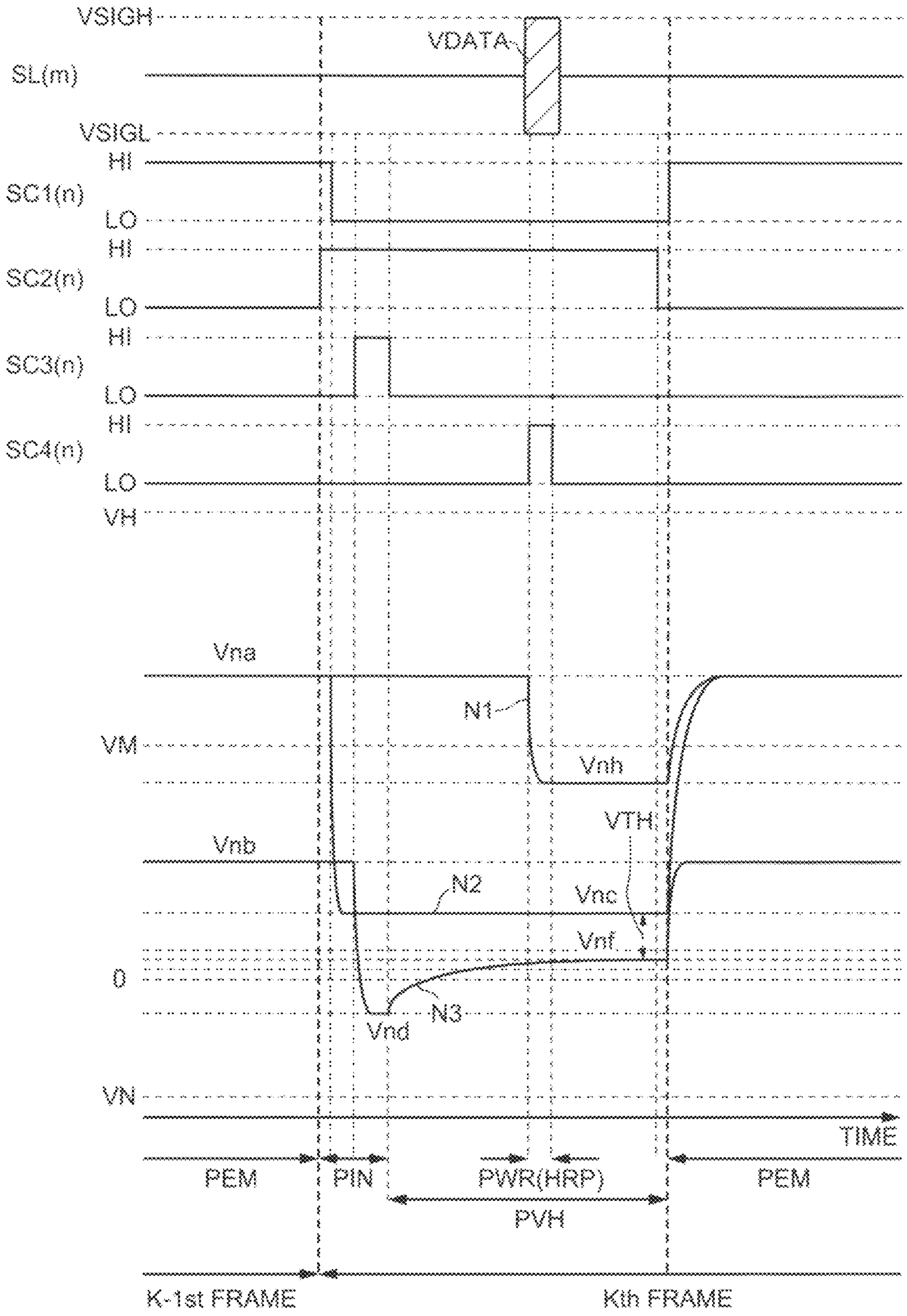
FIG. 6 is a timing chart of the display device according to the first embodiment of the present invention.

A second example of the driving method for the display device 10 will be described with reference to FIG. 6. The driving method shown in the second example includes that the pixel 180 displays a white image based on the voltage VSIGH included in the data signal VDATA in the KthFRAME after the pixel 180 displays the white image based on the voltage VSIGH included in the data signal VDATA in the frame (K−1stFRAME) immediately before the current frame (KthFRAME). In other words, the driving method shown in the second example includes displaying images of the same color (white) in consecutive frames. Configurations that are the same as or similar to those in FIG. 1 to FIG. 5 will be described as necessary.

The configurations of the first scan signal SC1(*n*), the second scan signal SC2(*n*), the third scan signal SC3(*n*), and the fourth scan signal SC4(*n*)) are the same as those described in “1-5-1. First Example of Driving Method for Display Device 10”. Further, after the period PWR of the KthFRAME, the period PVH after the period PWR of the KthFRAME and the emission period PEM of the KthFRAME are excluded from the first node N1 and the like are the same as those described in “1-5-1. First Example of Driving Method for Display Device 10”. Further, the voltage (potential) of the second node N2 and the third node N3 in the period excluding the emission period PEM of the KthFRAME, the voltage (potential) of the fourth node N4, and the like are the same as the configurations described in “1-5-1. First Example of Driving Method for Display Device 10”. Further, the operation and the like of each transistor in each period are the same as those described in “1-5-1. First Example of Driving Method for Display Device 10”. Therefore, configurations and the like similar to those described in “1-5-1. First Example of Driving Method for Display Device 10” will be described as necessary. In addition, in the image data signal SL(m), in the period PWR of the KthFRAME, the data signal VDATA of the VSIGH corresponding to white is supplied, and in a period other than the period PWR of the KthFRAME, the same data signal VDATA as that described in “1-5-1. First Example of Driving Method for Display Device 10” is supplied.

In the light emission period PEM of the K−1stFRAME, similarly to the configuration described in “1-5-1. First Example of Driving Method for Display Device 10”, the drain current Ion flows from the driving power supply line PVDD to the light-emitting device OLED and the reference voltage line PVSS, and the light-emitting device OLED emits light.

In addition, in the initial period and the period PIN of the KthFRAME following the emission period PEM of the K−1stFRAME, the second node N2 and the fourth node N4 are initialized by the reference voltage VREF (1.4 V), and the third node N3 is initialized by the initialization voltage VINI (−2 V), similar to the configuration described in “1-5-1. First Example of Driving Method for Display Device 10”.

Further, in the period PVH following the period PIN, similar to the configuration described in “1-5-1. First Example of Driving Method for Display Device 10”, the voltage supplied to the first node N1 maintains the voltage Vna, and the voltage supplied to the second node N2 and the voltage supplied to the fourth node N4 maintain the voltage Vnc. The voltage supplied to the third node N3 gradually increases from the voltage Vnd toward the voltage Vnf.

In the middle of the period PVH, the period PWR that is parallel to (overlaps) the period PVH is executed. In the period PWR, the image data signal SL(m) is supplied with the voltage VSIGH (4.2 V). The voltage supplied to the first node N1 gradually drops to the voltage Vnh (voltage VSIGH (4.2 V)). The voltage supplied to the second node N2 and the voltage supplied to the fourth node N4 maintain the voltage Vnc. The voltage supplied to the third node N3 gradually increases from the voltage Vnd toward the voltage Vnf. At this time, with reference to the reference voltage VREF, the capacitive element CD holds charges corresponding to the potential difference with respect to the voltage of the data signal VDATA and maintains (holds) the voltage included in the data signal VDATA with reference to the reference voltage VREF.

As described above, in the period PWR, the data signal VDATA is written to the pixel 180. The capacitive element CD maintains (holds) the voltage included in the data signal VDATA.

In the period PVH after the period PWR, the voltage supplied to the first node N1 maintains the voltage Vnh, and the voltage supplied to the second node N2 and the voltage supplied to the fourth node N4 maintain the voltage Vnc. The voltage supplied to the third node N3 gradually increases from the voltage Vnd toward the voltage Vnf and becomes the voltage Vnf. At this time, similar to the configuration described in "1-5-1. First Example of Driving Method for Display Device 10", the second transistor T2 is in the OFF state, and since the drain current Ion does not flow from the driving power supply line PVDD to the reference voltage line PVSS, the light-emitting device OLED does not emit light, and the capacitive element CV maintains the potential difference Vgs and holds the threshold voltage VTH.

As described above, in the period PVH, the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the emission period PEM of the KthFRAME, the first node N1 conducts with the second node N2, and the voltage of the second node N2 gradually increases from the voltage Vnc toward the voltage Vnh (4.2 V). Consequently, the second transistor T2 becomes conductive, the drain current Ion flows from the drive power supply line PVDD to the reference voltage line PVSS, and the voltage of the third node N3 increases so as to follow the increase in the voltage of the second node N2. Due to the increase in the voltage of the third node N3, the voltage of the second node N2 and the voltage of the first node N1 connected to the second node N2 further increase, the voltage supplied to the first node N1 and the second node N2 becomes the voltage Vna, and the voltage supplied to the third node N3 becomes the voltage Vnb.

In this case, the potential difference Vgs is a sum of the potential difference held in the capacitive element CD and the potential difference held in the capacitive element CV (voltage included in the data signal VDATA (voltage VSIGH, 4.2 V)−reference voltage VREF (1.4 V)+threshold voltage VTH (1V)=3.8V). That is, in the emission period PEM of the KthFRAME, the pixel 180 can display images based on the data signal VDATA and the corrected thresholds.

Specifically, the potential difference Vds is 7.4 V, and the potential difference Vgs (3.8 V) is larger than the threshold voltage VTH (1 V). Therefore, the second transistor T2 is in the ON state, and the drain current Ion flows from the drive power supply line PVDD to the reference voltage line PVSS, so that the light-emitting device OLED emits light. For example, the pixel 180 is red, and white light is emitted by three pixels using the pixel 180 emitting red light, the pixel 180 emitting blue light, and the pixel 180 emitting green light.

The second example of the driving method for the display device 10 has the same effects as those described in "1-5-1. First Example of Driving Method for Display Device 10".

[1-5-3. Third Example of Driving Method for Display Device 10]

Figure 7:
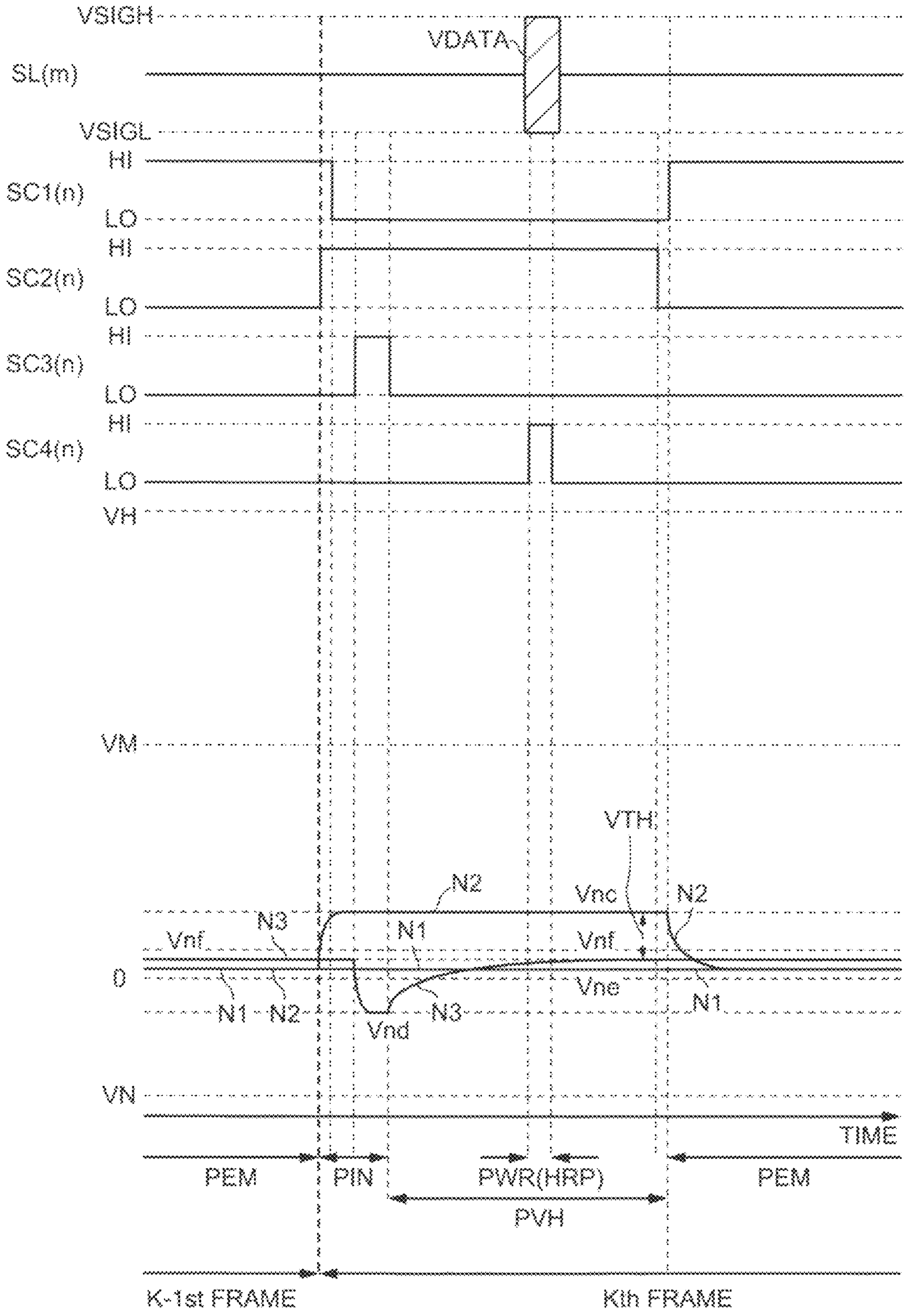
FIG. 7 is a timing chart of the display device according to the first embodiment of the present invention.

A third example of the driving method for the display device 10 will be described with reference to FIG. 7. The driving method shown in the third example includes the pixel 180 displaying a black image based on the voltage VSIGH included in the data signal VDATA even in the KthFRAME after the pixel 180 displays the black image based on the voltage VSIGL included in the data signal VDATA in the frame (K−1stFRAME) immediately before the current frame (KthFRAME). In other words, the driving method shown in the third example includes displaying images of the same color (black) in consecutive frames. Configurations that are the same as or similar to those in FIG. 1 to FIG. 6 will be described as necessary.

The configurations of the first scan signal SC1(*n*), the second scan signal SC2(*n*), the third scan signal SC3(*n*), and the fourth scan signal SC4(*n*)), and the image data signal SL(m) are the same as those described in "1-5-1. First Example of Driving Method for Display Device 10". In addition, the period PWR after the period PVH of the KthFRAME and the emission period PEM of the KthFRAME are excluded from the first node N1 and the like are the same as those described in "1-5-1. First Example of Driving Method for Display Device 10". Further, the second node N2 in the period PVH of the KthFRAME, the period PWR of the KthFRAME and the emission period PEM of the KthFRAME, the voltage (potential) of the third node N3, the voltage (potential) of the fourth node N4, and the like are the same as those described in "1-5-1. First Example of Driving Method for Display Device 10". Further, the operation and the like of each transistor in each period are the same as those described in "1-5-1. First Example of Driving Method for Display Device 10". Therefore, configurations and the like similar to those described in "1-5-1. First Example of Driving Method for Display Device 10" will be described as necessary.

In the emission period PEM of the K−1stFRAME, the voltage supplied to the first node N1 and the second node N2 is the voltage Vne, the voltage supplied to the third node N3 is the voltage Vnf, and the potential difference Vgs is −0.2 V. Therefore, the second transistor T2 is in the OFF state, the drain current Ion does not flow from the drive power supply line PVDD to the light-emitting devices OLED and the reference voltage line PVSS, and the pixel 180 emitting red light turns black. Similar to the pixel 180 that emits red light, the pixel 180 that emits blue light and the pixel 180 that emits green light do not emit light, and therefore, the three pixels using the pixel 180 that emits red light, the pixel 180 that emits blue light, and the pixel 180 that emits green light become black.

In the initial period of the period PIN of KthFRAME following the emission period PEM of the K−1stFRAME, the voltage supplied to the first node N1 maintains the voltage Vne. The voltage supplied to the second node N2 gradually increases from the voltage Vne toward the voltage Vnc (reference voltage VREF, 1.4 V) and becomes the voltage Vnc. The voltage supplied to the third node N3 maintains the voltage Vnf. Further, although not shown, the voltage supplied to the fourth node N4 gradually increases toward the voltage Vnc (reference voltage VREF, 1.4 V) and becomes the voltage Vnc. The second transistor T2 is in the OFF state, and the light-emitting device OLED does not emit light because the drain current Ion does not flow through the light-emitting device OLED.

In the period PIN following the initial period of the period PIN, the voltage supplied to the first node N1 maintains the voltage Vne, and the voltage supplied to the second node N2 and the voltage supplied to the fourth node N4 maintain the voltage Vnc. The voltage supplied to the third node N3 gradually drops from the voltage Vnf toward the voltage Vnd (initialization voltage VINI, −2 V) and becomes the voltage Vnd. The potential difference Vgs is 3.4 V (1.4 V−(−2 V)) and the potential difference Vds is 10 V (8 V−(−2 V)). Similar to the configuration described in "1-5-1. First Example of Driving Method for Display Device 10", although the second transistor T2 is turned from the OFF state to the ON state, the fifth transistor T5 is in the ON state, and current flows from the drive power supply line PVDD to the initialization voltage power supply line SVI, so that the light-emitting device OLED does not emit light. In this case, the capacitive element CD holds charges corresponding to the potential difference between the voltage Vne supplied to the first node N1 and the voltage Vnc supplied to the fourth node N4, and maintains the potential difference, and the capacitive element CV maintains the potential difference Vgs.

As described above, in the same manner as in the configuration described in "1-5-1. First Example of Driving Method for Display Device 10", in the period PIN, the second node N2 and the fourth node N4 are initialized by the reference voltage VREF (1.4 V), and the third node N3 is initialized by the initialization voltage VINI (−2 V).

In the period PVH following the period PIN, the voltage supplied to the first node N1 maintains the voltage Vne, the voltage supplied to the second node N2 and the voltage supplied to the fourth node N4 maintain the voltage Vnc, and the voltage supplied to the third node N3 gradually increases from the voltage Vnd toward the voltage Vnf.

In the middle of the period PVH, in the period PWR that is parallel to (overlaps) the period PVH, the voltage supplied to the first node N1 is the voltage Vne (voltage VSIGL (0.2 V)) and does not change, and the voltage supplied to the second node N2 and the voltage supplied to the fourth node N4 maintain the voltage Vnc. The voltage supplied to the third node N3 gradually increases from the voltage Vnd toward the voltage Vnf. In this case, similar to the configuration described in "1-5-1. First Example of Driving Method for Display Device 10", the capacitive element CD holds charges corresponding to the potential difference with respect to the voltage of the data signal VDATA with reference to the reference voltage VREF and maintains (holds) the voltage of the data signal VDATA with reference to the reference voltage VREF.

As described above, in the period PWR, the data signal VDATA is written to the pixel 180 in the same manner as in the configuration described in "1-5-1. First Example of Driving Method for Display Device 10". The capacitive element CD maintains (holds) the voltage included in the data signal VDATA.

In the period PVH after the period PWR, similarly to the configuration described in "1-5-1. First Example of Driving Method for Display Device 10", the voltage supplied to the first node N1 maintains the voltage Vne, the voltage supplied to the second node N2 and the voltage supplied to the fourth node N4 maintain the voltage Vnc, and the voltage supplied to the third node N3 gradually rises from the voltage Vnd toward the voltage Vnf and becomes the voltage Vnf. Further, since the second transistor T2 is in the OFF state and the drain current Ion does not flow from the drive power supply line PVDD to the reference voltage line PVSS, the light emitting device OLED does not emit light. The capacitive element CV maintains the potential difference Vgs to hold the threshold voltage VTH.

As described above, in the same manner as in the configuration described in "1-5-1. First Example of Driving Method for Display Device 10", in the period PVH, the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the emission period PEM of the KthFRAME following the period PVH of the KthFRAME, similar to the configuration described in "1-5-1. First Example of Driving Method for Display Device 10", the first node N1 is in conduction with the second node N2, the voltage supplied to the second node N2 turns to the voltage Vne, and the voltage supplied to the third node N3 turns to the voltage Vnf. As a result, since the pixel 180 emitting red light, the pixel 180 emitting blue light, and the pixel 180 emitting green light do not emit light, three pixels using the pixel 180 emitting red light, the pixel 180 emitting blue light, and the pixel 180 emitting green light become black.

The third example of the driving method for the display device 10 has the same effects as those described in "1-5-1. First Example of Driving Method for Display Device 10".

[1-5-4. Fourth Example of Driving Method for Display Device 10]

Figure 8:
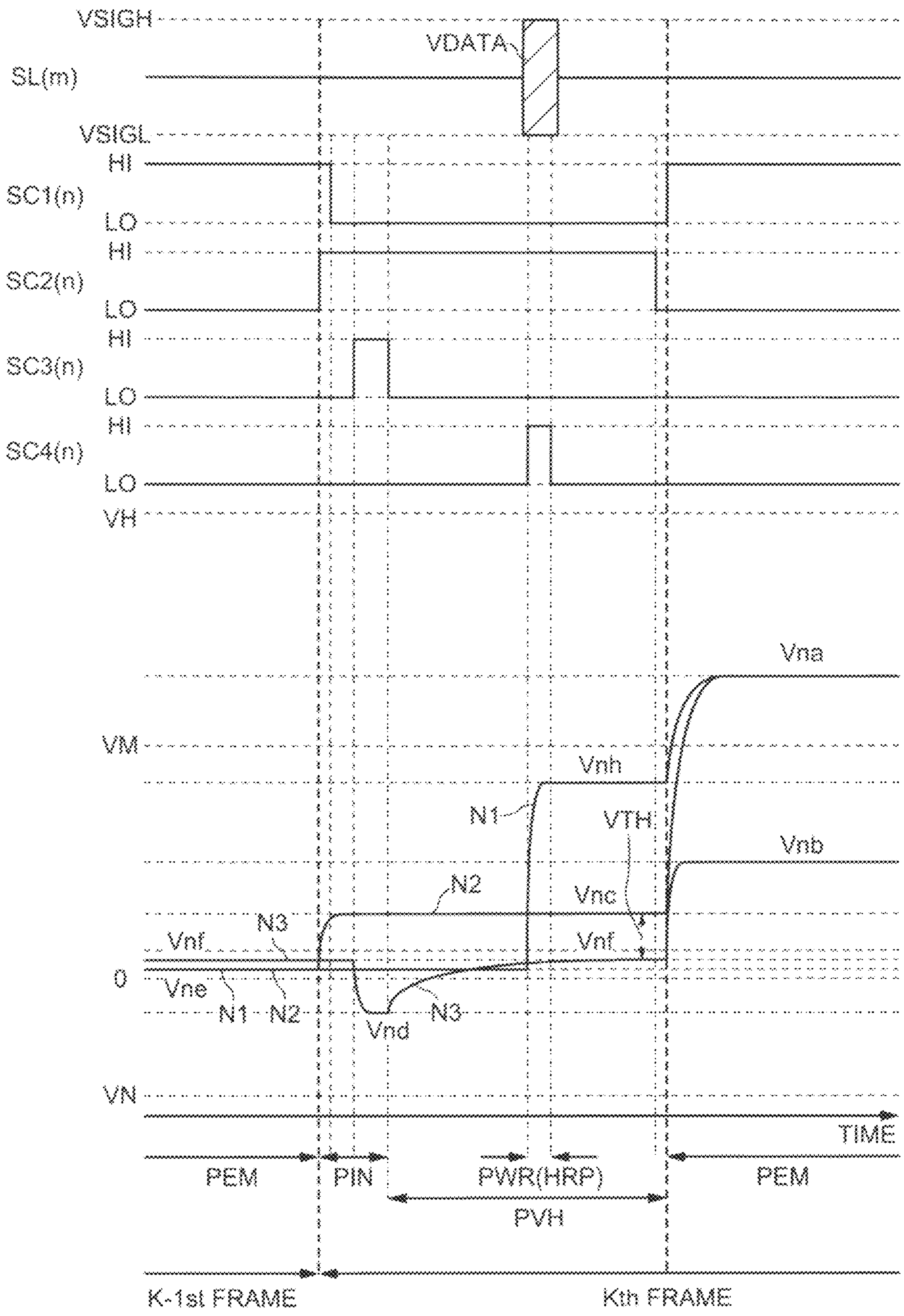
FIG. 8 is a timing chart of the display device according to the first embodiment of the present invention.

A fourth example of the driving method for the display device 10 will be described with reference to FIG. 8. The driving method shown in the fourth example includes the pixel 180 displaying a white image based on the voltage VSIGH of the data signal VDATA in the KthFRAME after the pixel 180 displays the black image based on the voltage VSIGL of the data signal VDATA in the frame (K−1stFRAME) immediately before the current frame (KthFRAME). In other words, the driving method shown in the fourth example includes displaying images of different colors in successive frames. Configurations that are the same as or similar to those in FIG. 1 to FIG. 11 will be described as necessary.

The configurations of the first scan signal SC1(*n*), the second scan signal SC2(*n*), the third scan signal SC3(*n*), and the fourth scan signal SC4(*n*), and the image data signal SL(m) are the same as those described in "1-5-1. First Example of Driving Method for Display Device 10". Further, the voltage (potential) of the second node N2, the third node N3, the voltage (potential) of the fourth node N4, and the like in the emission period PEM of the K−1stFRAME to the period PVH of the KthFRAME and the period PWR executed in parallel with the period PVH of the KthFRAME are the same as those described in "1-5-3. Third Example of Driving Method for Display Device 10". Further, the first node N1 in the emission period PEM of the K−1 stFRAME, the period PIN of the KthFRAME, the period PVH between the period PIN and the period PWR, and the like are the same as the configurations described in "1-5-3. Third Example of Driving Method for Display Device 10". Further, the voltage (potential) of the first node N1, the second node N2, the third node N3 in the period PVH after the period PWR of the KthFRAME to the emission period PEM of the KthFRAME, the voltage (potential) of the fourth node N4, and the like are the same as those described in "1-5-2. Second Example of Driving Method for Display Device 10". Further, the operation and the like of each transistor in each period are the same as those described in "1-5-1. First Example of Driving Method for Display Device 10". Therefore, configurations and the like similar to those described in "1-5-1. First Example of Driving Method for Display Device 10" to "1-5-3. Third Example of Driving Method for Display Device 10" will be described as necessary.

In the emission period PEM of the K−1stFRAME, the pixel 180 is black in the same manner as described in "1-5-3. Third Example of Driving Method for Display Device 10".

In the period PIN of the KthFRAME, similar to "1-5-3. Third Example of Driving Method for Display Device 10", the light-emitting device OLED does not emit light, and the capacitive element CD holds a charge corresponding to a potential difference between the voltage Vne supplied to the first node N1 and the voltage Vnc supplied to the fourth node N4, and maintains the potential difference, and the capacitive element CV maintains the potential difference Vgs. In addition, in the period PIN, the second node N2 and the fourth node N4 are initialized by the reference voltage VREF (1.4 V), and the third node N3 is initialized by the initialization voltage VINI (−2 V).

In the period PVH between the period PIN and the period PWR of the KthFRAME, in the same manner as in "1-5-3. Third Example of Driving Method for Display Device 10", the voltage supplied to the first node N1 is maintained at the voltage Vne, the voltage supplied to the second node N2 and the voltage supplied to the fourth node N4 are maintained at the voltage Vnc, and the voltage supplied to the third node N3 gradually increases from the voltage Vnd toward the voltage Vnf.

In the period PWR of the KthFRAME, the voltage supplied to the first node N1 gradually increases from the voltage Vne toward the voltage Vnh (voltage VSIGH (4.2V)) and becomes the voltage Vnh. The voltage supplied to the second node N2 and the voltage supplied to the fourth node N4 maintain the voltage Vnc, and the voltage supplied to the third node N3 gradually increases from the voltage Vnd toward the voltage Vnf.

In the period PVH after the period PWR of the KthFRAME, in the same manner as in "1-5-2. Second Example of Driving Method for Display Device 10", the voltage supplied to the first node N1 maintains the voltage Vnh, the voltage supplied to the second node N2 and the voltage supplied to the fourth node N4 maintain the voltage Vnc, and the voltage supplied to the third node N3 becomes the voltage Vnf. Further, the light-emitting device OLED does not emit light, and the capacitive element CV maintains the potential difference Vgs and maintains the threshold voltage VTH. Consequently, in the period PVH, by making the potential difference Vgs of the second transistor T2 equal to the threshold voltage VTH, the threshold voltage VTH of the second transistor T2 is acquired, and a charge equivalent to the threshold voltage VTH is held in the capacitive element CV.

In the emission period PEM of the KthFRAME following the period PVH after the period PWR of the KthFRAME, as in "1-5-2. Second Example of Driving Method for Display Device 10", the first node N1 is conducted to the second node N2, the voltage supplied to the first node N1 and the voltage supplied to the second node N2 become the voltage Vna, and the voltage supplied to the third node N3 becomes the voltage Vnb. The potential difference Vgs is a sum (3.8 V) of the potential difference held in the capacitive element CD and the potential difference held in the capacitive element CV. Therefore, since the drain current Ion flows from the drive power supply line PVDD to the reference voltage line PVSS, the light emitting device OLED emits light. For example, three pixels using the pixel 180 that emit red light, the pixel 180 that emits blue light, and the pixel 180 that emits green light emit white light.

The fourth example of the driving method for the display device 10 has the same effects as those described in "1-5-1. First Example of Driving Method for Display Device 10".

[1-6. End Face Structure of Pixel 180]

Figure 9:
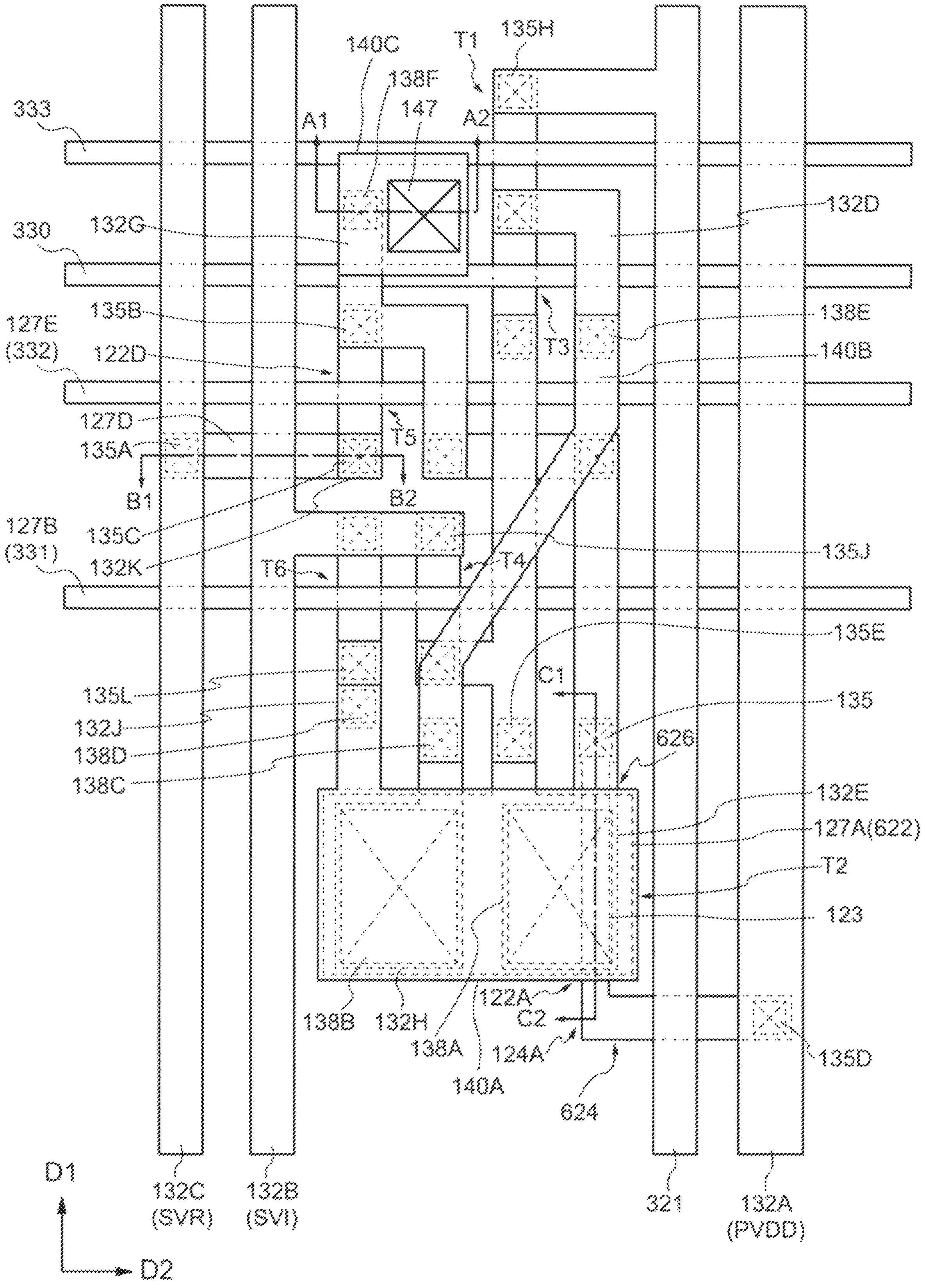
FIG. 9 is a layout diagram of a pixel according to the first embodiment of the present invention.
Figure 10:
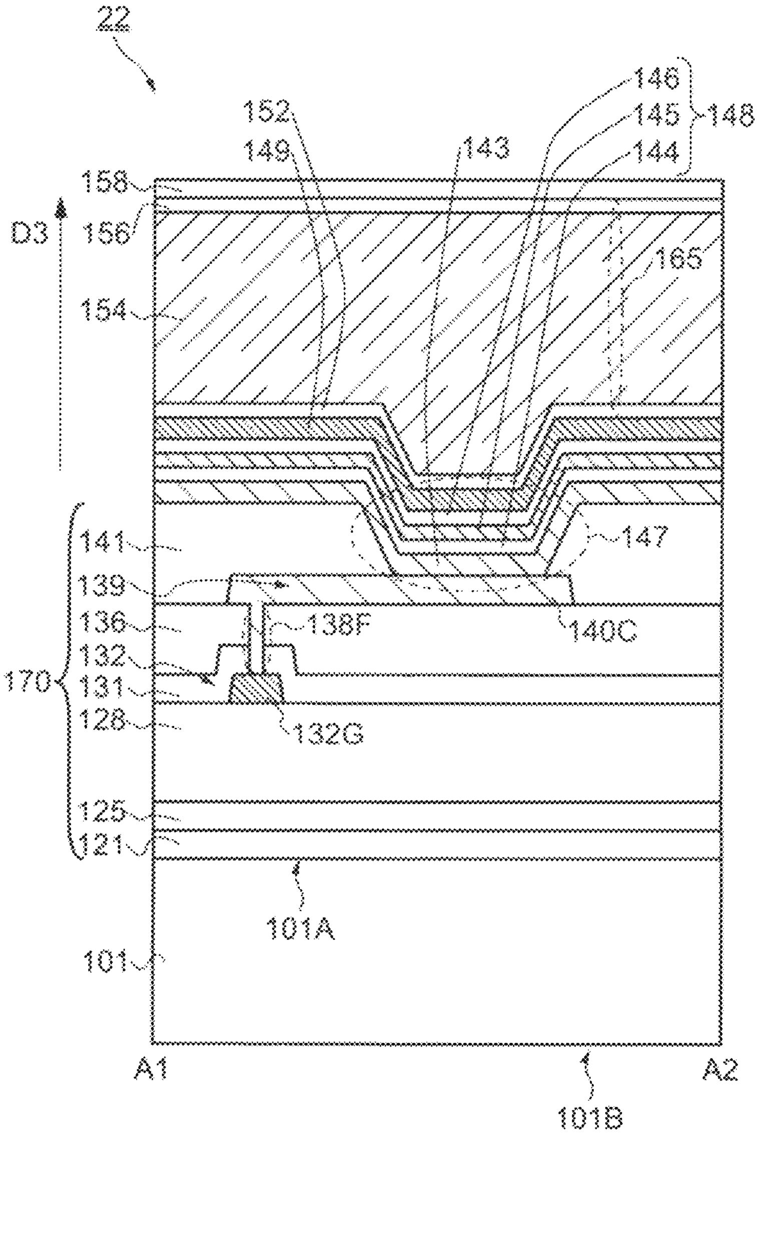
FIG. 10 is an end view showing an end face cut along A1-A2 in the layout shown in FIG. 9.
Figure 11:
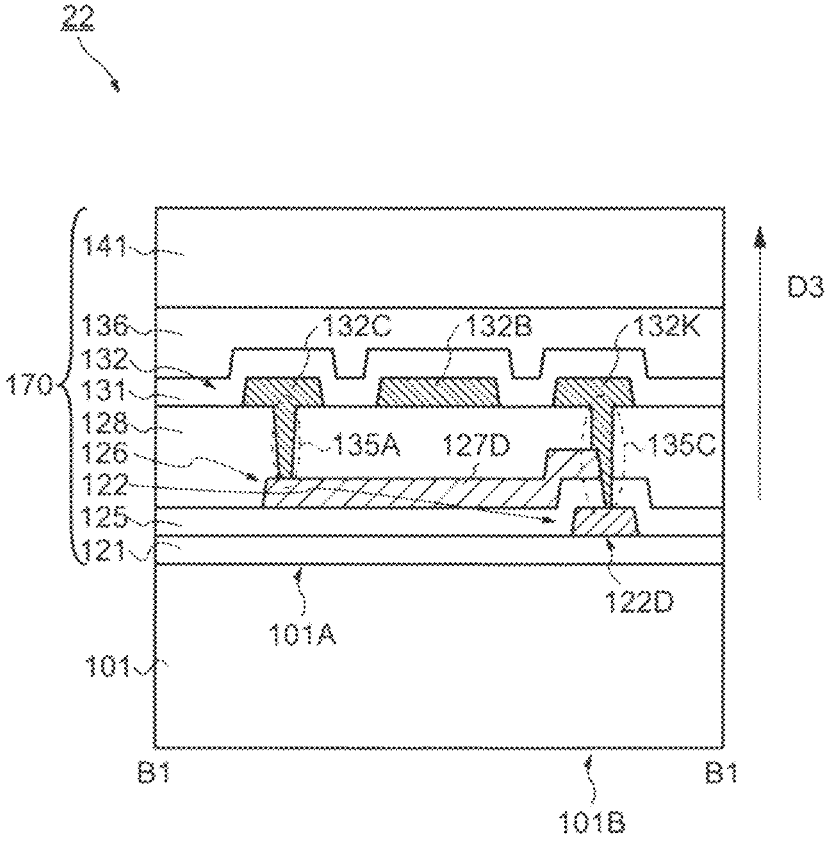
FIG. 11 is an end view showing an end face cut along B1-B2 in the layout shown in FIG. 9.
Figure 12:
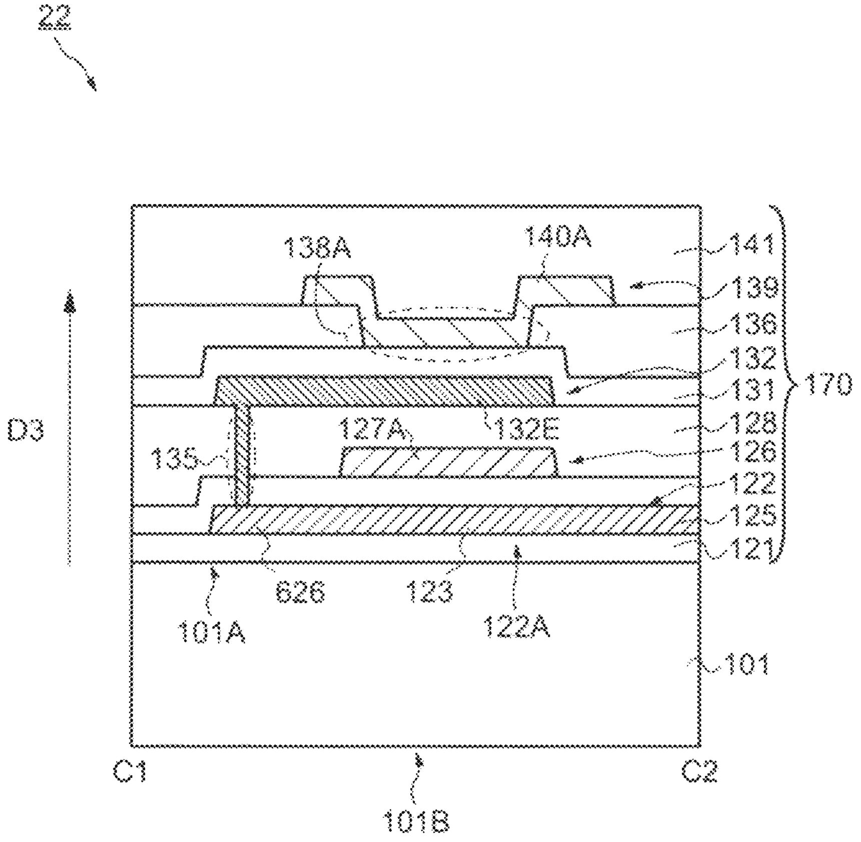
FIG. 12 is an end view showing an end face cut along C1-C2 in the layout shown in FIG. 9.

With reference to FIG. 9 to FIG. 12, an end surface structure of the pixel 180 will be described. FIG. 9 is a layout diagram of the pixel 180. FIG. 10 is an end view showing an end face cut along A1-A2 in the layout shown in FIG. 9. FIG. 11 is an end view showing an end face cut along B1-B2 in the layout shown in FIG. 9. FIG. 12 is an end view showing an end face cut along C1-C2 in the layout shown in FIG. 9. The layout of the pixels 180 shown in FIG. 9 and the end faces of the pixels 180 shown in FIG. 10 to FIG. 12 are examples, and the planar layout and the end faces of the pixels 180 are not limited to the examples shown in FIG. 9 to FIG. 12. Configurations that are the same as or similar to those in FIG. 1 to FIG. 8 will be described as necessary.

In addition, in the end faces of the pixels 180 shown in FIG. 11 and FIG. 12, a configuration of a layer above the insulating layer 141 (a side opposite to a substrate 101) is omitted along a direction D3.

Further, the end face of the pixel 180 shown in FIG. 10 is an end face along a first wiring 132G, a second contact hole opening 138F, a second wiring 140C, and a contact hole opening 147 for the anode electrode, an anode electrode 143, and the functional layer 148 as an exemplary end face of the pixel 180. The end face of the pixel 180 shown in FIG. 11 is an end face along a first wiring 132C, a first contact hole opening 135A, a gate wiring 127D, a first wiring 132B, a first wiring 132K, a first contact hole opening 135C, and a semiconductor layer 122D, as an exemplary end face of the pixel 180. The end face of the pixel 180 shown in FIG. 12 is an end face along a first wiring 132E, a first contact hole opening 135, a semiconductor layer 122A, a second wiring 140A, a gate wiring 127E, and an organic insulating film opening 138A for the capacitor CS, as an exemplary end face of the pixel 180.

The substrate 101 includes a first surface 101A and a second surface 101B opposed to the first surface 101A. A semiconductor layer 122 is arranged on the first surface 101A of the substrate 101 via the base layer 121. The semiconductor layer 122 includes a semiconductor layer 122A, and the semiconductor layer 122A includes a channel region 123 and an impurity region 124A. The semiconductor layer 122 includes the semiconductor layer 122D. For example, the impurity region is referred to as a source region or a drain region. Further, for example, the second transistor T2 includes the semiconductor layer 122A, and the first electrode 624 and the second electrode 626 include an impurity region 124A. In other words, the semiconductor layer 122A includes a channel region of the second transistor T2. Similar to the semiconductor layer 122A, for example, the fourth transistor T4 includes the semiconductor layer 122D, and the first electrode 644 and the second electrode 646 include an impurity region. In other words, the semiconductor layer 122D includes a channel region of the fourth transistor T4.

A gate insulating layer 125, a conductive layer 126, an insulating layer 128, and a conductive layer 132 are provided in this order on the semiconductor layer 122. The conductive layer 126 includes a gate wiring 127A (gate electrode 622) and the gate wiring 127D. The conductive layer 132 includes the first wiring 132B (initialization voltage power supply line SVI), the first wiring 132C (reference voltage power supply line SVR), a first wiring 132E (first electrode 42), the first wiring 132G, and the first wiring 132K. In addition, a region where the conductive layer 126 and the semiconductor layer 122 overlap each other is a channel region. In other words, a region where the gate electrode and the semiconductor layer of each transistor overlap each other is the channel region.

Each of the transistors of the pixel 180 is formed using the semiconductor layer 122 (the channel region 123 and the impurity region 124A), the gate insulating layer 125, and the conductive layer 126 (for example, the gate wiring 127A).

The first contact hole openings 135, 135A, and 135C that reach the semiconductor layer 122 are arranged in the gate insulating layer 125 and the insulating layer 128. The first contact hole opening 135 exposes the semiconductor layer 122A (for example, the second electrode 626). For example, the first wiring 132E is electrically connected to the semiconductor layer 122A by the first contact hole opening 135. Further, the first contact hole opening 135A exposes the conductive layer 126 (the gate wiring 127D), and the first contact hole opening 135C exposes the conductive layer 126 (the gate wiring 127D) and the semiconductor layer 122 (the semiconductor layer 122D). The first wiring 132C is electrically connected to the gate wiring 127D by the first contact hole opening 135A, and the first wiring 132K is electrically connected to the gate wiring 127D and the semiconductor layer 122D by the first contact hole opening 135C. That is, an opening (not shown) reaching the conductive layer 126 or the semiconductor layer 122 may be provided in the insulating layer 128.

An insulating layer 131 is provided to cover the conductive layer 132 and the insulating layer 131 where the conductive layer 132 is not exposed. An insulating layer 136 is provided to cover the insulating layer 131.

A second contact hole opening is arranged in the insulating layer 131 and the insulating layer 136. For example, the second contact hole opening includes the second contact hole opening 138F. The organic insulating film opening 138A for the capacitor CS is arranged in the insulating layer 136. A conductive layer 139 is arranged on the insulating layer 136 in the organic insulating film opening 138A and the second contact hole opening 138F for the capacitor CS. The conductive layer 139 includes the second wiring 140A (the first electrode 52 and the second electrode 44) and the second wiring 140C (the second electrode 34). The second contact hole opening 138F exposes the conductive layers 132 (for example, the first wiring 132G). The second contact hole opening 138F electrically connects the second wiring 140C (the second electrode 34) and the first wiring 132G. The organic insulating film opening 138A for the capacitor exposes the insulating layer 131. For example, the capacitive element CV is formed using the insulating layer 131 as a dielectric and using the first wiring 132E (the first electrode 42) and the second wiring 140A (the first electrode 52 and the second electrode 44), and the capacitive element CD is formed using the insulating layer 131 as a dielectric and using a first wiring 132H (the second electrode 54) and the second wiring 140A (the first electrode 52 and the second electrode 44). For example, the second wiring 140A also serves as a pixel electrode. Further, although not shown, for example, the second contact hole opening portion 138 exposes a part of a plurality of terminals (not shown) included in the terminal portion 150. Part of the exposed terminals are electrically connected to the FPC 200 using a conductive film such as an anisotropic conductive film (not shown). Further, pixel electrodes are provided independently for each pixel.

An insulating layer 141 is provided to cover the conductive layer 139.

An underlayer 121, the semiconductor layer 122, the gate insulating layer 125, the conductive layer 126, the insulating layer 128, the conductive layer 132, the insulating layer 131, the insulating layer 136, the conductive layer 139, and the insulating layer 141 are collectively referred to as an array section 170.

Next, a layer on the insulating layer 141 will be described. The contact hole opening 147 for the anode electrode is arranged in the insulating layer 141. The contact hole opening 147 for the anode electrode exposes the conductive layers 139 (for example, the second wiring 140A).

The anode electrode 143 is provided to cover the exposed conductive layer 139, the contact hole opening 147 for the anode electrode, and the insulating layer 141. A functional layer 148 is arranged over the anode electrode 143. A common electrode 149 is arranged on the functional layer 148 so as to cover the functional layer 148. The common electrode 149 is electrically connected to a cathode electrode (the first electrode 32 of the light emitting device OLED). Here, the light-emitting device OLED includes the anode electrode 143, the functional layer 148, and the common electrode 149 (cathode electrode).

The configuration of the functional layer 148 can be selected as appropriate. For example, the functional layer 148 may be formed by combining a carrier injection layer, a carrier transport layer, a light emitting layer, a carrier blocking layer, an exciton blocking layer, and the like. For example, the functional layer 148 shown in FIG. 9 includes a first layer 144, a second layer 145, and a third layer 146. For example, the first layer 144 is a carrier (hole) injection and transport layer, the second layer 145 is an emitting layer, and the third layer 146 is a carrier (electron) injection and transport layer. For example, the functional layer 148 is provided independently for each pixel in the same manner as the pixels.

A sealing film 165 is arranged on the common electrode 149. For example, the sealing film 165 includes a first inorganic insulating layer 152, an organic insulating layer 154, and a second inorganic insulating layer 156. The first inorganic insulating layer 152 and the second inorganic insulating layer 156 are formed so as to cover at least the display region 22. A cover film 158 is arranged over the second inorganic insulating layer 156.

For example, the first layer 144, the second layer 145 (light-emitting layer) and the third layer 146 included in the functional layer 148, and the common electrode 149 are not arranged on the IC chip 110 and the control circuit 120. The sealing film 165 and the cover film 158 are arranged above the IC chip 110 and the control circuit 120. The sealing film 165 and the cover film 158 prevent impurities (water, oxygen, and the like) from entering the light-emitting device OLED and the transistors from the outside of the display device 10.

A general metal material is used as the conductive layer 126, the conductive layer 132, the conductive layer 139, and the common electrode 149. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and alloys or compounds thereof are used as common metallic materials.

For example, the semiconductor layer 122 may include crystalline silicon and may include a metal oxide.

A general insulating material can be used as a material for forming the base layer 121, the gate insulating layer 125, the insulating layer 131, the first inorganic insulating layer 152, and the second inorganic insulating layer 156. For example, inorganic insulating layers such as silicon oxide ($SiO_x$), silicon oxynitride ($SiO_xN_y$), silicon nitride ($SiN_x$), and silicon nitride oxide ($SiN_xO_y$) are used as the insulating layers.

For example, an organic compound material having excellent surface flatness can be used as a material for forming the insulating layer 128, the insulating layer 136, the insulating layer 141, and the organic insulating layer 154. The insulating layer 128, the insulating layer 136, and the insulating layer 141 may be referred to as an organic insulating layer.

[1-7. Method for Manufacturing Display Device 10]

Figure 13:
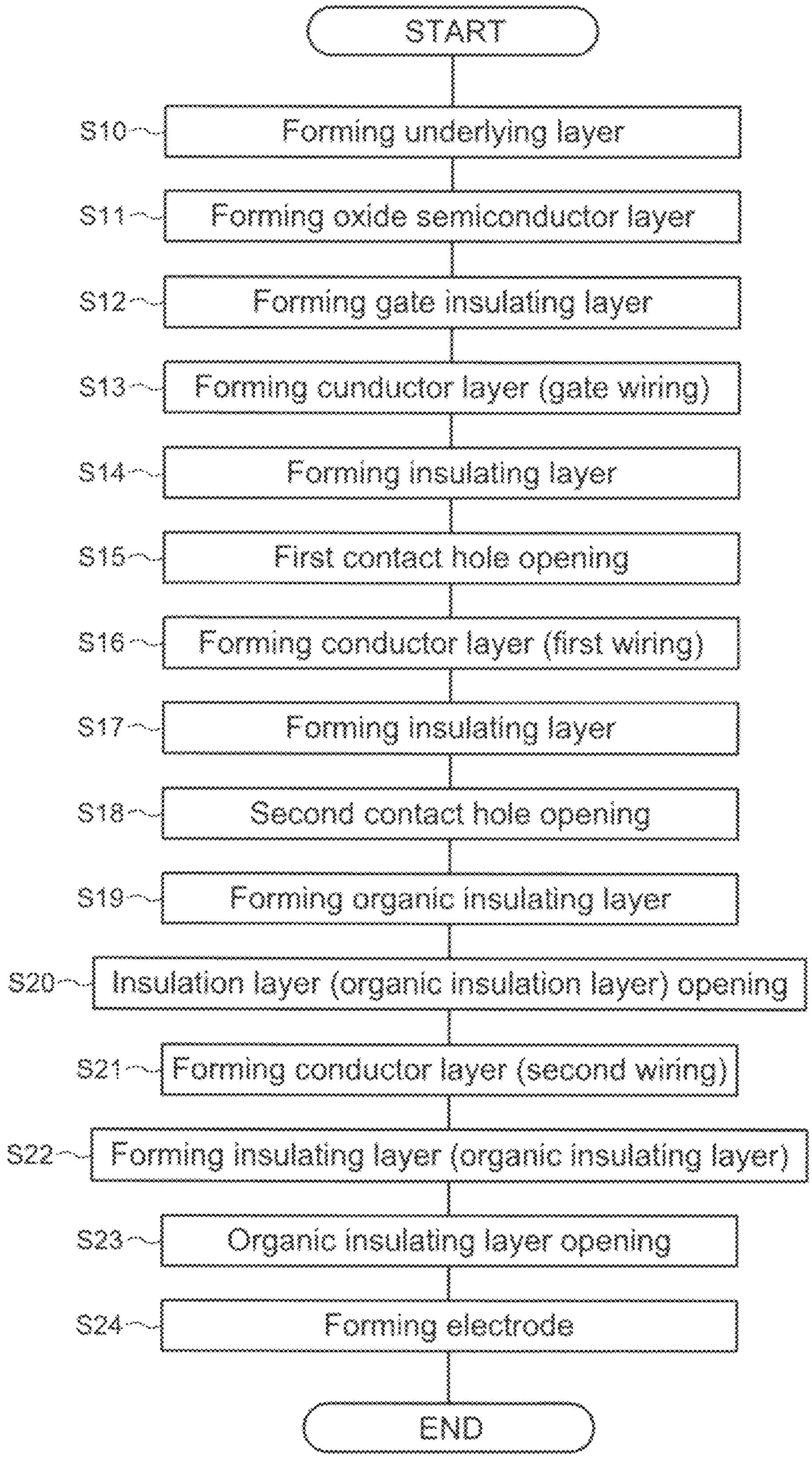
FIG. 13 is a sequence diagram showing a method for manufacturing the display device according to the first embodiment of the present invention.

A method for manufacturing the display device 10 (pixel 180) will be described with reference to FIG. 9, FIG. 13, and FIG. 16. FIG. 13 is a sequence diagram showing a manufacturing method of the display device 10. Configurations that are the same as or similar to those in FIG. 1 to FIG. 12 will be described as necessary. The manufacturing method shown in FIG. 13 includes, for example, that the semiconductor layer is an oxide semiconductor layer formed using an oxide semiconductor.

As shown in FIG. 13, when the manufacturing of the display device 10 (pixel 180) is started, the base layer 121 is formed on the first surface 101A of the substrate 101.

Figure 14:
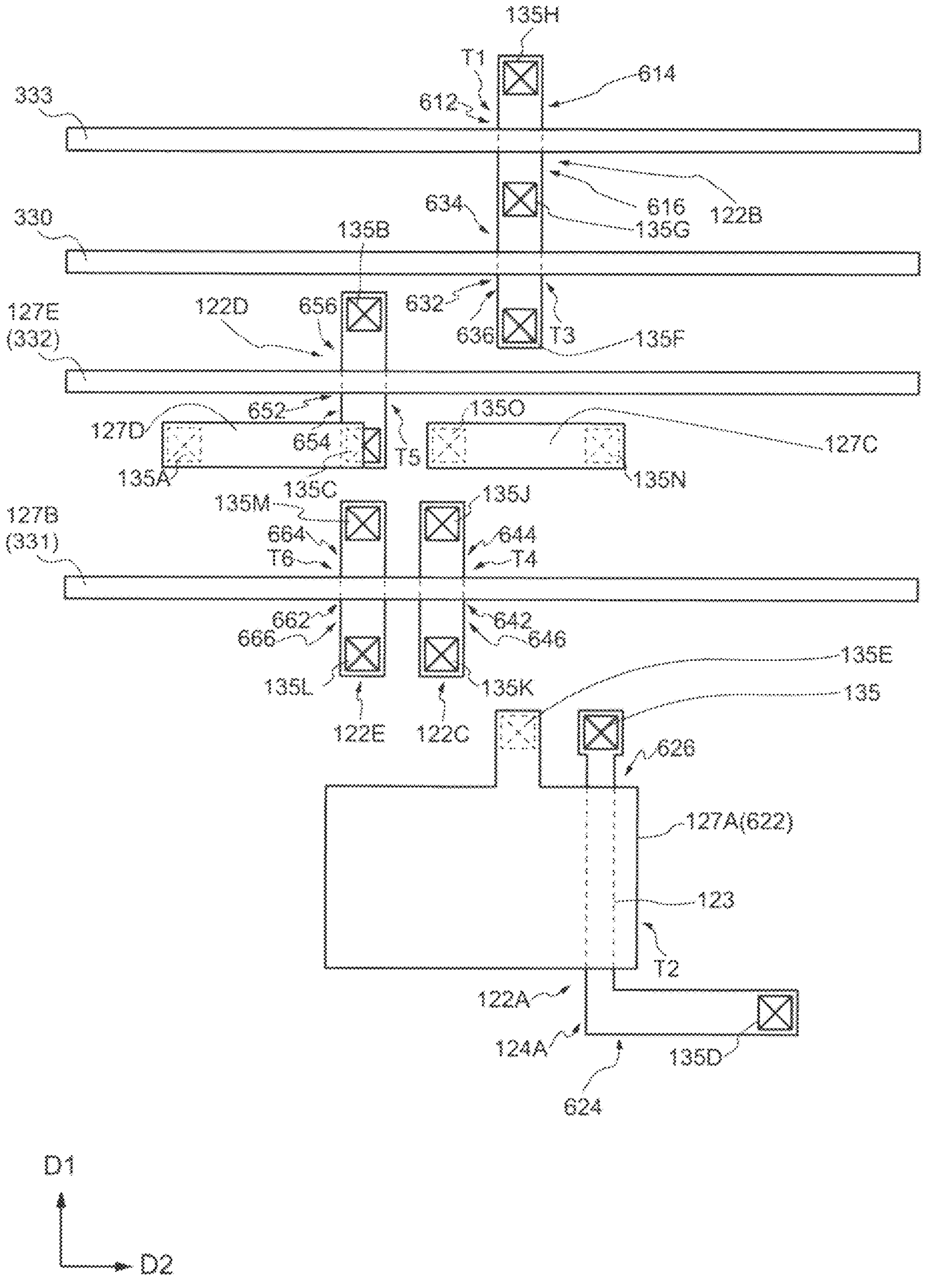
FIG. 14 is a layout diagram of the pixel according to the first embodiment of the present invention.

As shown in FIG. 13 or FIG. 14, the semiconductor layer 122 is formed on the base layer 121 (step 10 (S10) in FIG. 13). The semiconductor layer 122 includes semiconductor layers 122A, 122B, 122C, 122D, and 122E. The semiconductor layer 122A is a semiconductor layer of the second transistor T2. The semiconductor layer 122B also serves as a semiconductor layer of the first transistor T1 and a semiconductor layer of the third transistor T3. The semiconductor layer 122C is a semiconductor layer of the fourth transistor T4. The semiconductor layer 122D is a semiconductor layer of the fifth transistor T5. The semiconductor layer 122E is a semiconductor layer of the sixth transistor T6. In other words, the semiconductor layer 122B includes a channel region of the first transistor T1 and a channel region of the third transistor T3, the semiconductor layer 122C includes a channel region of the fourth transistor T4, the semiconductor layer 122D includes a channel region of the fifth transistor T5, and the semiconductor layer 122E includes a channel region of the sixth transistor T6.

The gate insulating layer 125 (see FIG. 10 to FIG. 12) is formed on the semiconductor layer 122 and on the base layer 121 on which the semiconductor layer 122 is not formed (step 12 (S12) in FIG. 13).

Figure 15:
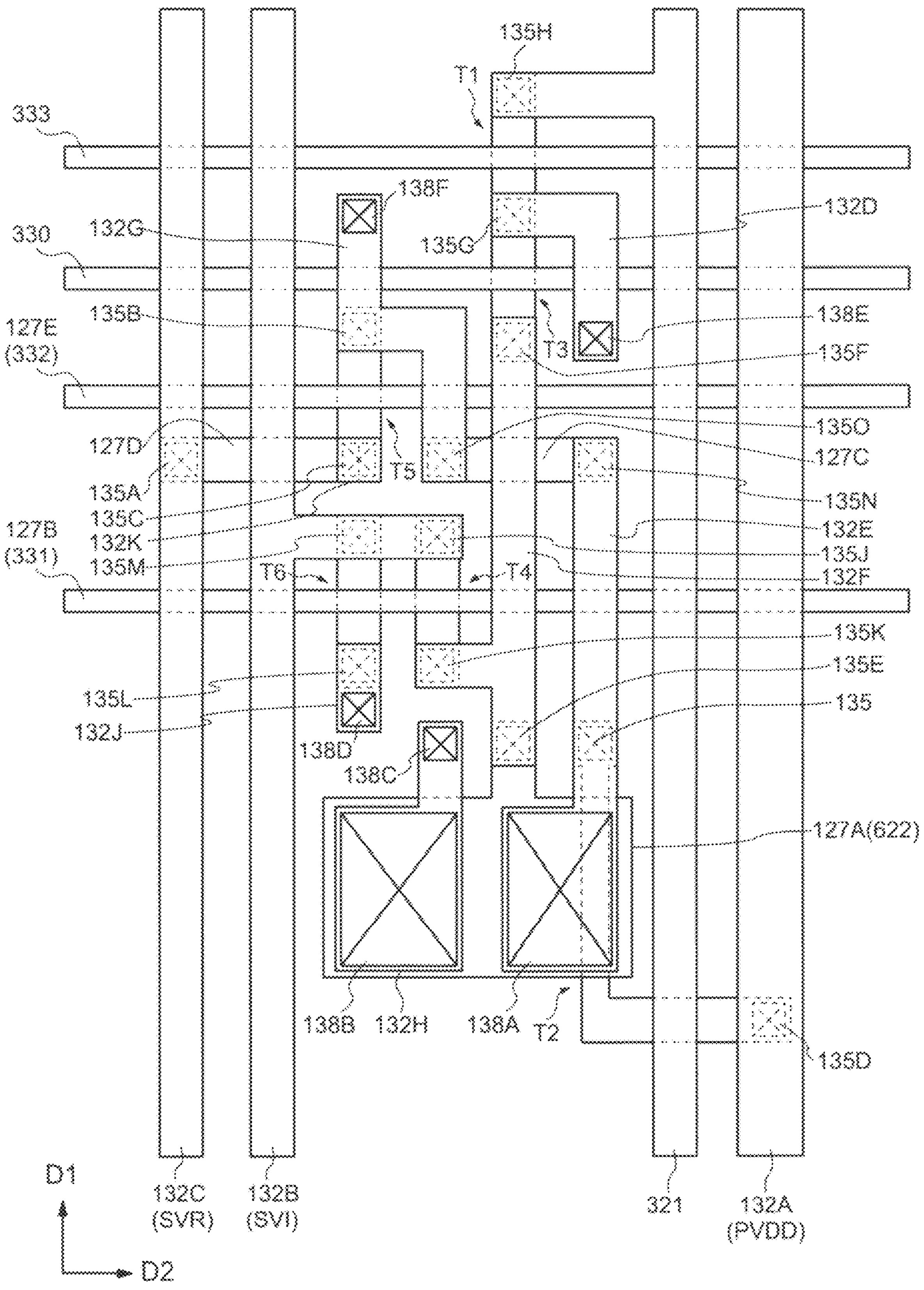
FIG. 15 is a layout diagram of the pixel according to the first embodiment of the present invention.

The conductive layer 126 (see FIG. 10 to FIG. 12) is formed over the gate insulating layer 125 (step 13 (S13) of FIG. 13). As shown in FIG. 13 or FIG. 15, the conductive layers 126 include the gate wiring 127A (gate electrode 622), a gate wiring 127B (scan signal line 331), a gate wiring 127C, the gate wiring 127D, the gate wiring 127E (scan signal line 332), the scan signal line 330, and the scan signal line 333. The gate wiring 127B (scan signal line 331) includes gate electrodes 642 and 662, and the gate wiring 127E (scan signal line 332) includes a gate electrode 652. The scan signal line 330 includes the gate electrode 632, and the scan signal line 333 includes the gate electrode 612.

A region where the gate electrode 622 and the semiconductor layer 122A of the second transistor T2 overlap each other is the channel region 123, and the channel region 123 corresponds to a channel length of the second transistor T2. Similar to the second transistor T2, a region where the gate electrode 612 and the semiconductor layer 122B of the first transistor T1 overlap each other is the channel region of the first transistor T1 and corresponds to a channel length. Similar to the second transistor T2, the transistor other than the second transistor T2 and the first transistor T1 has a region where the gate electrode and the semiconductor layer overlap each other, which is the channel region of the transistor and corresponds to a channel length.

As shown in FIG. 14, in a plan view, the channel region 123 of the second transistor T2 is larger (longer) than the channel region of the first transistor T1, the channel region of the third transistor T3, the channel region of the fourth transistor T4, the channel region of the fifth transistor T5, and the channel region of the sixth transistor T6. That is, the channel length of the second transistor T2 is longer than the channel length of the first transistor T1, the channel length of the third transistor T3, the channel length of the fourth transistor T4, the channel length of the fifth transistor T5, and the channel length of the sixth transistor T6. Since the second transistor T2 operates in a saturated range, resistance of the second transistor T2 to hot carriers needs to be higher than resistance of the rest of the transistors in the pixel 180 to hot carriers. Consequently, the channel length of the second transistor T2 is longer than the channel length of the remaining transistors in the pixel 180.

The insulating layer 128 (see FIG. 10 to FIG. 12) is formed over the conductive layer 126 and over the gate insulating layer 125 where the conductive layer 126 is not formed (step 14 (S14) of FIG. 13).

As shown in FIG. 13 or FIG. 14, first contact hole openings 135, 135A, 135B, 135C, 135D, 135E, 135F, 135G, 135H, 135J, 135K, 135L, 135M, 135N, and 135O are opened (step 15 (S15) in FIG. 13). Each opening opens the gate insulating layer 125 and the insulating layer 128, and exposes a wiring, a semiconductor layer, or an electrode corresponding to each opening. For example, the first contact hole opening 135 exposes the semiconductor layer 122A, and the first contact hole opening 135A exposes the gate wiring 127D. Other openings also expose corresponding wires, semiconductor layers or electrodes.

The conductive layer 132 (see FIG. 10 to FIG. 12) is formed over the insulating layer 128 (step 16 (S16) of FIG. 13). As shown in FIG. 13 or FIG. 15, the conductive layer 132 includes a first wiring 132A (drive power supply line PVDD), the first wiring 132B (initialization voltage power supply line SVI), the first wiring 132C (reference voltage power supply line SVR), a first wiring 132D, the first wiring 132E (first electrode 42), a first wiring 132F, the first wiring 132H (second electrode 54), a first wiring 132J, the first wiring 132K, and the image data signal line 321.

As shown in FIG. 15, in a plan view, for example, the first wiring 132A is electrically connected to the second transistor T2 via the first contact hole opening 135D, and the first wiring 132B is electrically connected to the fourth transistor T4 and the sixth transistor T6 via the first contact hole openings 135M and 135J. The first wiring 132C is electrically connected to the fifth transistor T5 via the first contact hole opening 135A, the gate wiring 127D, and the first contact hole opening 135C. The first wiring 132D is electrically connected to the first transistor T1 and the third transistor T3 via the first contact hole opening 135G. The other first wiring is also electrically connected to the gate wiring or the transistor via the corresponding opening.

In addition, as shown in FIG. 15, the first electrode 42, the gate electrode 622, and the semiconductor layer 122A (channel region 123) overlap each other. That is, the second transistor T2 (the channel region and the gate electrode 622) overlaps the first electrode 42 of the capacitive element CV. The first electrode 42 and the first wiring 132H (the second electrode 54) are arranged adjacently on the gate electrode 622.

The insulating layer 131 (see FIG. 10 to FIG. 12) is formed over the conductive layer 132 and over the insulating layer 128 where the conductive layer 132 is not formed (step 17 (S17) of FIG. 13).

As shown in FIG. 13 or FIG. 15, second contact hole openings 138C, 138C, 138D, 138E, and 138F are opened (step 18 (S18) in FIG. 13). Each opening opens the insulating layer 131 to expose a wiring, a semiconductor layer, or an electrode corresponding to each opening.

The insulating layer 136 (organic insulating layer) (see FIG. 10 to FIG. 12) is formed on the insulating layer 131 (step 19 (S19) in FIG. 13).

As shown in FIG. 13 or FIG. 15, the insulating layer 136 (organic insulating layer) is opened (step 20 (S20) in FIG. 13). In the opening of S20, organic insulating film openings 138A and 138B for the capacitor are opened. In addition, in the opening of S20, the second contact hole openings 138C, 138C, 138D, 138E, and 138F are opened in the same manner as in the opening of S18. That is, the second contact hole openings 138C, 138C, 138D, 138E, and 138F are opened twice. Each opening opens the insulating layer 136 to expose an insulating layer, a wiring, or an electrode corresponding to each opening. For example, the organic insulating film opening 138A for the capacitor removes only the insulating layer 136 on the first wiring 132E (the first electrode 42) to expose the insulating layer 131. On the other hand, the second contact hole opening portion 138F removes only the insulating layer 136 on the first wiring 132G to expose the first wiring 132G. Other openings also expose corresponding insulating layers, wires or electrodes.

The conductive layer 139 (see FIG. 10 to FIG. 12) is formed on the insulating layer 136, on the insulating layer 131 exposed by the organic insulating film opening 138A for the capacitor, and on the insulating layer 131 exposed by the organic insulating film opening 138B for the capacitor (step 21 (S21) in FIG. 13). As shown in FIG. 10, FIG. 12, or FIG. 16, the conductive layer 139 includes the second wiring 140A (the first electrode 52 and the second electrode 44), a second wiring 140B, and the second wiring 140C (second electrode).

Figure 16:
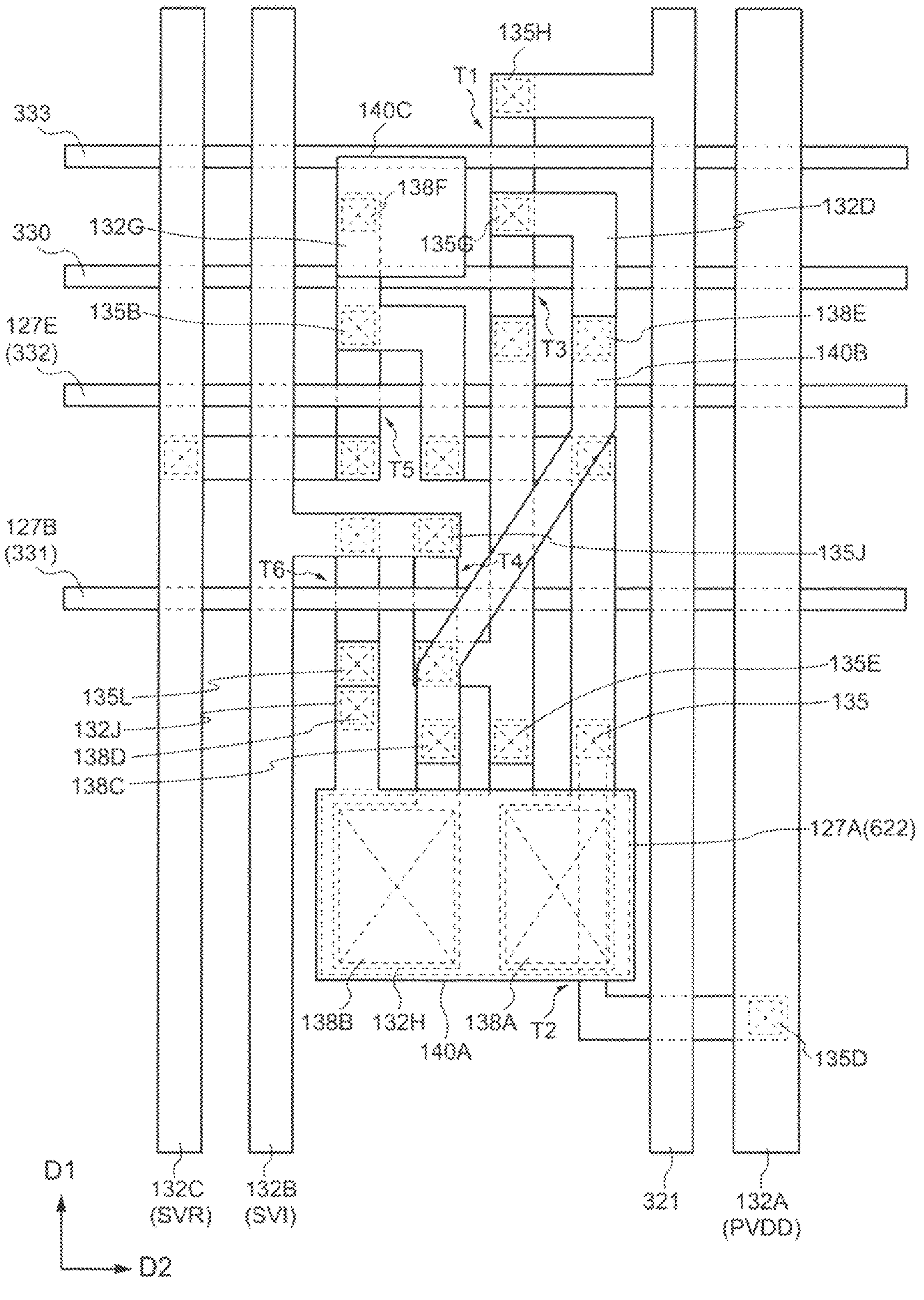
FIG. 16 is a layout diagram of the pixel according to the first embodiment of the present invention.

As shown in FIG. 16, in a plan view, the second wiring 140A (the first electrode 52 and the second electrode 44) is electrically connected to the first wiring 132J and the sixth transistor T6 via the second contact hole opening 138D and the first contact hole opening 135L. The second wiring 140B is electrically connected to the first wiring 132D, the first wiring 132H (second electrode 54), the first transistor T1, and the third transistor T3 via the second contact hole openings 138C and 138E and the first contact hole opening 135G. The second wiring 140C is electrically connected to the first wiring 132G, the gate wiring 127C, the fifth transistor T5, and the first wiring 132E (the first electrode 42) via the second contact hole opening 138F, and the first contact hole openings 135B, 135O, and 135N.

In addition, as shown in FIG. 16, the second wiring 140A (the first electrode 52 and the second electrode 44), the first wiring 132E (the first electrode 42), the gate electrode 622, and the semiconductor layer 122A (the channel region 123) overlap each other. That is, the second transistor T2 overlaps the capacitive element CV. Further, the first electrode 42 and the first wiring 132H (the second electrode 54) are arranged adjacently to each other on the gate electrode 622. That is, the capacitive element CV and the capacitive element CD are arranged adjacently.

The insulating layer 141 (organic insulating layer) (see FIG. 10 to FIG. 12) is formed on the conductive layer 139 and on the insulating layer 136 on which the conductive layer 139 is not formed (step 22 (S22) in FIG. 13).

As shown in FIG. 9, the insulating layer 141 (organic insulating layer) is opened (step 23 (S23) in FIG. 13). In the opening of S23, the contact hole opening 147 for the anode electrode is opened. The contact hole opening 147 for the anode electrode removes the insulating layer 141 on the second wiring 140A to expose the second wiring 140A. The contact hole opening 147 for the anode electrode may be referred to as an organic insulating layer opening. In addition, as shown in FIG. 9, the contact hole opening 147 for the anode electrode overlaps the second wiring 140C in a plan view.

The anode electrode 143 is arranged over the exposed second wiring 140C, over the contact hole opening 147 for the anode electrode, and over the insulating layer 141. In addition, the functional layer 148 is arranged on the anode electrode 143 (see FIG. 10). The common electrode 149 is arranged on the functional layer 148 (step 24 (S24) in FIG. 13). In addition, for example, the anode electrode 143 and the functional layer 148 are provided for each pixel, and the common electrode 149 is provided so as to overlap the display region 22.

After S24, the sealing film 165 and the covering film 158 are arranged on the common electrode 149 in this order (see FIG. 10).

As shown in FIG. 13, the manufacturing of the display device 10 (pixel 180) is completed as described above.

2. Second Embodiment

Figure 17:
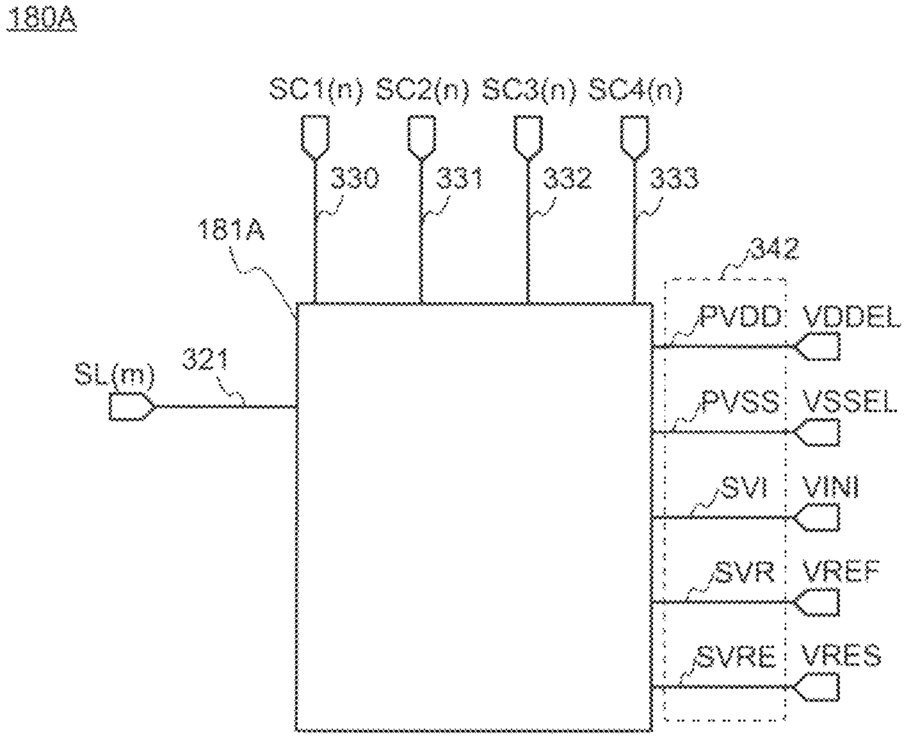
FIG. 17 is a schematic diagram showing an input signal to a pixel circuit according to a second embodiment of the present invention.
Figure 18:
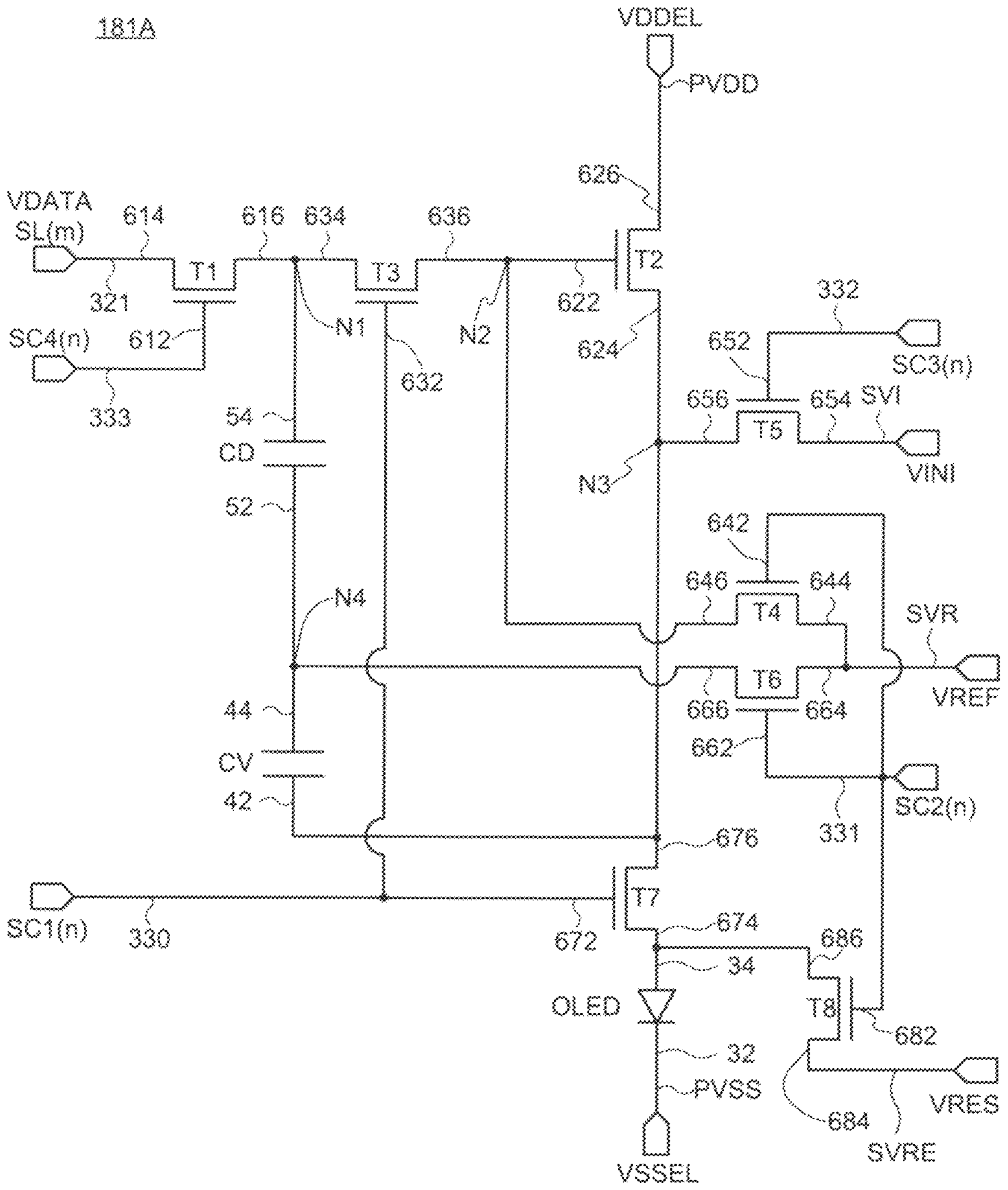
FIG. 18 is a circuit diagram showing a configuration of the pixel circuit according to the second embodiment of the present invention.

Referring to FIG. 1, FIG. 4, FIG. 17 and FIG. 18, an overview of a display device according to a second embodiment will be described. FIG. 17 is a schematic diagram showing an input signal to a pixel 180A according to a second embodiment, and FIG. 18 is a circuit diagram showing a configuration of a pixel circuit 181A.

The display device according to the second embodiment includes the pixel 180A and the pixel circuit 181A. Configurations of the pixel 180A and the pixel circuit 181A differ from the configurations of the pixel 180 and the pixel circuit 181 of the display device 10 according to the first embodiment. Specifically, the display device according to the second embodiment has a configuration and a function in which a reset voltage power supply line SVRE to which a seventh transistor T7, an eighth transistor T8, and a reset voltage VRES are supplied is added to the configurations of the pixel 180 and the pixel circuit 181. Other configurations and functions are the same as those of the display device 10 according to the first embodiment. In describing the configuration and function of the second embodiment, the same configuration and function as those of the display device 10 according to the first embodiment will be described as necessary. Configurations that are the same as or similar to those in FIG. 1 to FIG. 16 will be described as necessary.

[2-1. Configuration of Pixel 180A]

Referring to FIG. 17 and FIG. 18, an overview of the pixel 180A and the pixel circuit 181A will be described.

The pixel circuit 181A is connected to the reset voltage power supply line SVRE.

The reset voltage VRES is supplied to the reset voltage power supply line SVRE. For example, the reset voltage power supply line SVRE is electrically connected to the connection wiring 342 that differs from the drive power supply line PVDD and the reference voltage line PVSS among the connection wirings 342 (see FIG. 1). The reset voltage power supply line SVRE may be one of the connection wirings 342. For example, the reset voltage VRES may be supplied from an external device to the IC chip 110 (see FIG. 1) as in the initialization voltage VINI, and may be supplied from the IC chip 110 to the plurality of pixels 180A via the connection wiring 342 and the reset voltage power supply line SVRE. In addition, although not shown, the reset voltage VRES may be connected to the reset voltage power supply line SVRE from an external device through the FPC 200, the terminal portion 150, and the connection wiring 341 without passing through the IC chip 110 and the connection wiring 342, and may be supplied to a plurality of pixels 180A, similar to the initialization voltage VINI.

The first electrode 624 of the second transistor T2 is separated from the second electrode 34 of the light emitting device OLED, and is electrically connected to a second electrode 676 of the seventh transistor T7. The rest of the configuration of the second transistor T2 is the same as the configuration of the pixel 180 and the pixel circuit 181.

The seventh transistor T7 has a function of conducting the third node N3 and the second electrode 34 of the light emitting device OLED. The seventh transistor T7 includes a gate electrode 672, a first electrode 674, and the second electrode 676. The gate electrode 672 is electrically connected to the scan signal line 330 and the gate electrode 632 of the third transistor T3. The first electrode 674 is electrically connected to the second electrode 34 of the light emitting device OLED and a second electrode 686 of the eighth transistor T8. The second electrode 676 is electrically connected to the third node N3, the second electrode 656 of the fifth transistor T5, and the first electrode 42 of the capacitive element CV. Similar to the configurations of the pixel 180 and the pixel circuit 181, the first scan signal SC1(*n*) is supplied to the scan signal line 330. The seventh transistor T7 is switched using the first scan signal SC1(*n*). In other words, in the seventh transistor T7, the conduction state (ON state) and the non-conduction state (OFF state) are controlled by the first scan signal SC1(*n*). In the case where the signal supplied to the first scan signal SC1(*n*) is LO, the seventh transistor T7 becomes non-conductive. In the case where the signal supplied to the first scan signal SC1(*n*) is HI, the seventh transistor T7 becomes conductive.

The eighth transistor T8 has a function of bringing the second electrode 34 of the light-emitting device OLED and the reset voltage power supply line SVRE into conduction, supplying the reset voltage VRES to the second electrode 34 of the light-emitting device OLED, and resetting the light-emitting device OLED. In addition, the reset may be referred to as initialization. The eighth transistor T8 includes a gate electrode 682, a first electrode 684, and the second electrode 686. The gate electrode 682 is electrically connected to the scan signal line 331, the gate electrode 642 of the fourth transistor T4, and the gate electrode 662 of the sixth transistor T6. The first electrode 684 is electrically connected to the reset voltage power supply line SVRE. Similar to the configurations of the pixel 180 and the pixel circuit 181, the second scan signal SC2(*n*) is supplied to the scan signal line 331. The eighth transistor T8 is switched using the second scan signal SC2(*n*). In other words, in the eighth transistor T8, the conduction state (ON state) and the non-conduction state (OFF state) are controlled by the second scan signal SC2(*n*). In the case where the signal supplied to the second scan signal SC2(*n*) is LO, the eighth transistor T8 becomes non-conductive. In the case where the signal supplied to the second scan signal SC2(*n*) is HI, the eighth transistor T8 becomes conductive.

The configurations and the functions of the pixel circuit 181A other than the configuration and the function described in "2-1. Configuration of Pixel 180A" are the same as those of the pixel circuit 181.

[2-2. Driving Method for Pixel Circuit 181A]

A method for driving the display device according to the second embodiment will be described. The method for driving the pixel circuit 181A includes the following (1) to (4) as compared with the configurations described in "1-5-1. First Example of Driving Method for Display Device 10" to "1-5-4. Fourth Example of Driving Method for Display Device 10".

(1) In the case where HI is supplied to the first scan signal SC1(*n*), the seventh transistor T7 is in the ON state, the third node N3 is electrically connected to the second electrode 34 of the light-emitting device OLED, and the light-emitting device OLED emits light or becomes non-light-emitting (black) in accordance with the voltage supplied to the third node N3.

(2) In the case where LO is supplied to the first scan signal SC1(*n*), the seventh transistor T7 is in the OFF state, the third node N3 is not electrically connected to the second electrode 34 of the light emitting device OLED, and the voltage supplied to the third node N3 is not supplied to the second electrode 34.

(3) In the case where HI is supplied to the second scan signal SC2(*n*), the eighth transistor T8 is in the ON state, the second electrode 34 of the light-emitting device OLED is electrically connected to the reset voltage power supply line SVRE, and the reset voltage VRES is supplied to the second electrode 34 of the light-emitting device OLED. Consequently, the light emitting device OLED is reset. For example, since the reset voltage VRES is 0 V and the potential difference between the voltage supplied to the second electrode 34 of the light-emitting device OLED and the voltage supplied to the first electrode 32 of the light-emitting device OLED is 0 V, the light-emitting device OLED does not emit light.

(4) In the case where LO is supplied to the second scan signal SC2(*n*), the eighth transistor T8 is in the OFF state, the second electrode 34 of the light-emitting device OLED is not electrically connected to the reset voltage power supply line SVRE, and the reset voltage VRES is not supplied to the second electrode 34 of the light-emitting device OLED.

Configurations and functions other than those related to (1) to (4) described above in the driving method for the pixel circuit 181A are the same as those described in "1-5-1. First Example of Driving Method for Display Device 10" to "1-5-4. Fourth Example of Driving Method for Display Device 10".

The driving method for the pixel circuit 181A including the configuration described above is a driving method capable of speeding up the driving as in "1-5-1. First Example of Driving Method for Display Device 10" to "1-5-4. Fourth Example of Driving Method for Display Device 10", and is a driving method capable of executing the period PWR in parallel with the period PIN and the period PVH within the period PVH, and is a driving method having a higher degree of flexibility in the period PWR and higher versatility.

3. Third Embodiment

Figure 19:
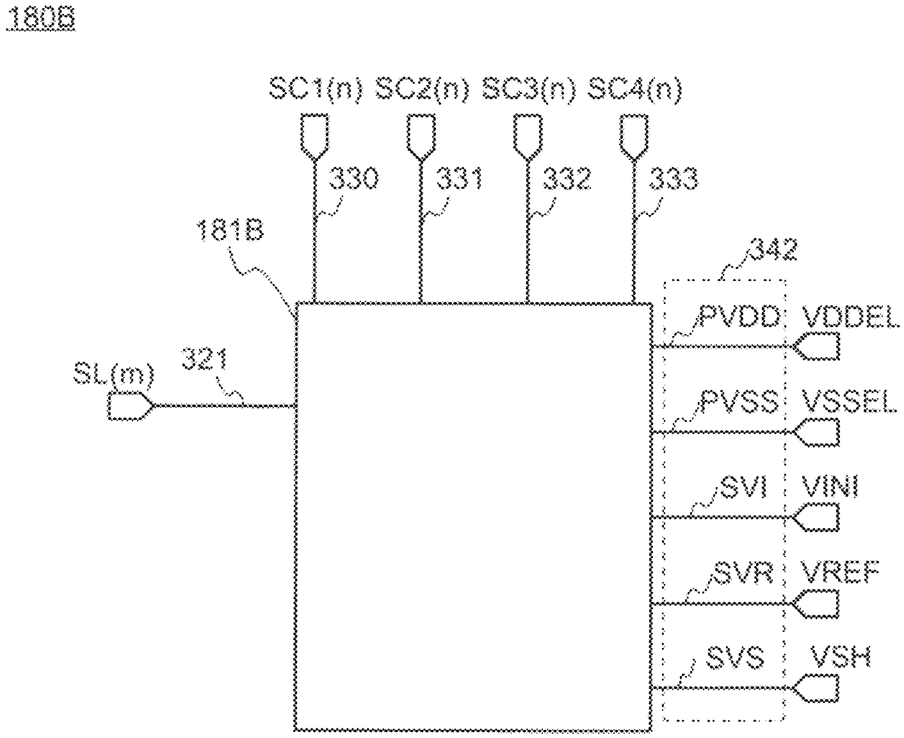
FIG. 19 is a schematic diagram showing an input signal to a pixel circuit according to a third embodiment of the present invention.
Figure 20:
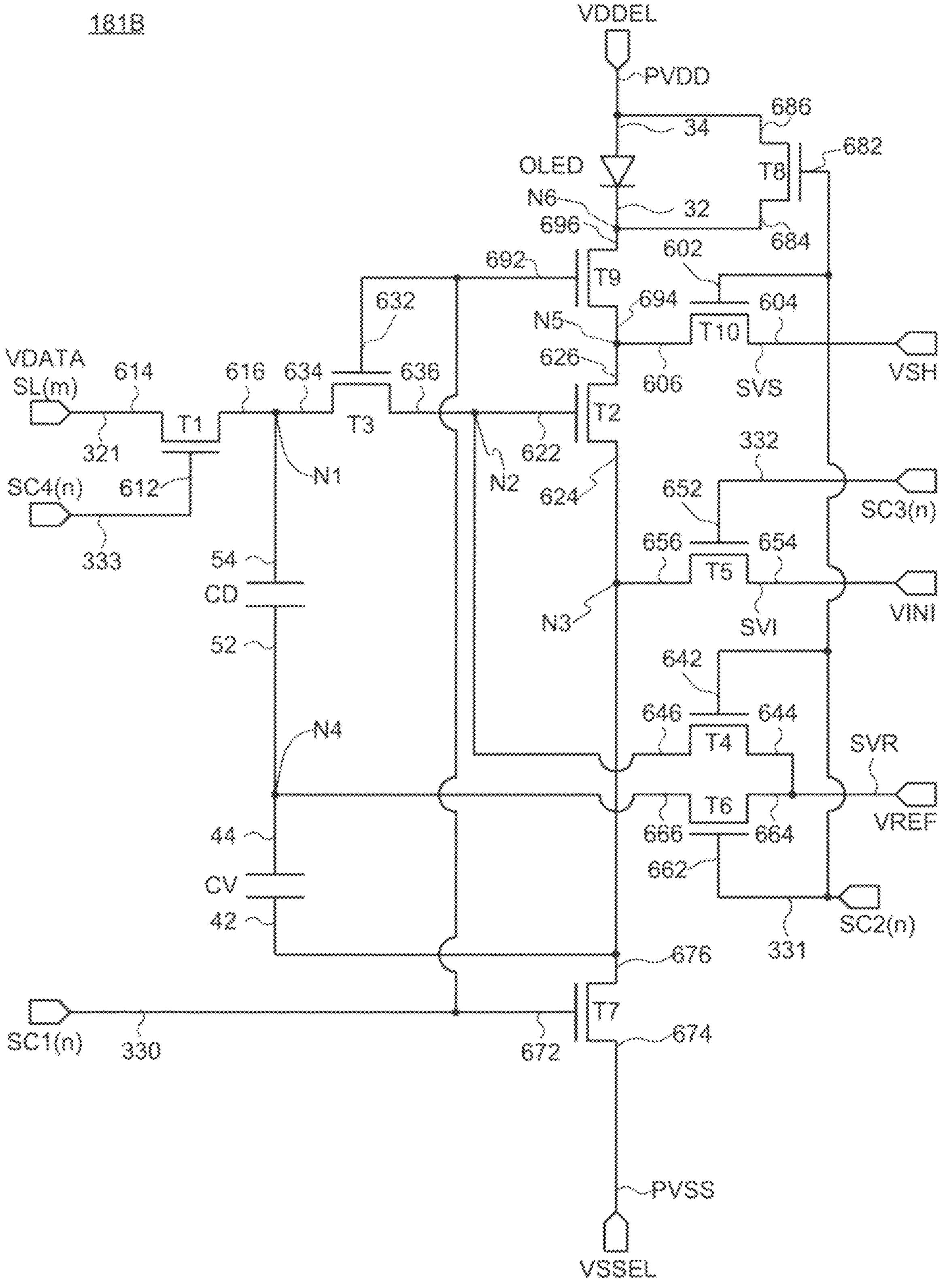
FIG. 20 is a circuit diagram showing a configuration of the pixel circuit according to the third embodiment of the present invention.

With reference to FIG. 1, FIG. 4, and FIG. 19 to FIG. 24, an overview of a display device according to a third embodiment will be described. FIG. 19 is a schematic diagram showing an input signal to a pixel 180B (pixel circuit 181B) according to the third embodiment, FIG. 20 is a circuit diagram showing a configuration of the pixel circuit 181B, and FIG. 21 to FIG. 24 are timing charts of the display device according to the third embodiment.

The display device according to the third embodiment includes the pixel 180B and the pixel circuit 181B. Configurations of the pixel 180B and the pixel circuit 181B differ from the configurations of the pixel 180 and the pixel circuit 181 of the display device according to the first embodiment. Specifically, the display device according to the third embodiment has a configuration and a function in which the seventh transistor T7, the eighth transistor T8, a ninth transistor T9, a tenth transistor T10, and a constant voltage power supply line SVS to which a constant voltage VSH is supplied are added to the configuration of the pixel 180 and the pixel circuit 181, and has a configuration and a function in which the connection of the light emitting device OLED in the pixel 180 and the pixel circuit 181 is changed. Other configurations and functions are the same as those of the display device 10 according to the first embodiment. In describing the configuration and function of the third embodiment, the same configuration and function as those of the display device 10 according to the first embodiment or the display device according to the second embodiment will be described as necessary. Configurations that are the same as or similar to those in FIG. 1 to FIG. 18 will be described as necessary.

[3-1. Configuration of Pixel 180B]

Referring to FIG. 19 and FIG. 20, an overview of the pixel 180B and the pixel circuit 181B will be described.

The pixel circuit 181B is connected to the constant voltage power supply line SVS.

The constant voltage VSH is supplied to the constant voltage power supply line SVS. For example, the constant voltage power supply line SVS is electrically connected to the connection wiring 342 that differs from the initialization voltage power supply line SVI, the reference voltage power supply line SVR, the drive power supply line PVDD, and the reference voltage line PVSS among the connection wirings 342 (see FIG. 1). The constant voltage power supply line SVS may be one of the connection wirings 342. For example, the constant voltage VSH may be supplied from an external device to the IC chip 110 (see FIG. 1), and may be supplied from the IC chip 110 to the plurality of pixels 180A via the connection wiring 342 and the constant voltage power supply line SVS. In addition, although not shown, the constant voltage VSH may be connected from an external device to the constant voltage power supply line SVS via the FPC 200, the terminal portion 150, and the connection wiring 341 without passing through the IC chip 110 and the connection wiring 342, and may be supplied to the plurality of pixels 180A.

The first electrode 624 of the second transistor T2 is not connected to the second electrode 34 of the light emitting device OLED, but is electrically connected to the second electrode 676 of the seventh transistor T7. The second electrode 626 of the second transistor T2 is disconnected from the drive power supply line PVDD and is electrically connected to a fifth node N5, a first electrode 694 of the ninth transistor T9, and a second electrode 606 of the tenth transistor T10. The rest of the configuration of the second transistor T2 is the same as the configuration of the pixel 180 and the pixel circuit 181.

The gate electrode 632 of the third transistor T3 is electrically connected to the gate electrode 672 of the seventh transistor T7 and a gate electrode 692 of the ninth transistor T9 in addition to the scan signal line 330. The second electrode 626 of the second transistor T2 is disconnected from the drive power supply line PVDD and is electrically connected to the fifth node N5, the first electrode 694 of the ninth transistor T9, and the second electrode 606 of the tenth transistor T10. The rest of the configuration of the second transistor T2 is the same as the configuration of the pixel 180 and the pixel circuit 181.

The seventh transistor T7 has a function of conducting the third node N3 and the reference voltage line PVSS. The seventh transistor T7 includes the gate electrode 672, the first electrode 674, and the second electrode 676. As described above, the gate electrode 672 is electrically connected to the scan signal line 330, the gate electrode 632 of the third transistor T3, and the gate electrode 692 of the ninth transistor T9. The first electrode 674 is electrically connected to the reference voltage line PVSS. The seventh transistor T7 is switched using the first scan signal SC1($n$). In other words, in the seventh transistor T7, the conduction state (ON state) and the non-conduction state (OFF state) are controlled by the first scan signal SC1($n$). In the case where the signal supplied to the first scan signal SC1($n$) is LO, the seventh transistor T7 becomes non-conductive. In the case where the signal supplied to the first scan signal SC1($n$) is HI, the seventh transistor T7 becomes conductive.

The eighth transistor T8 has a function of conducting the first electrode 32 and the second electrode 34 of the light-emitting device OLED and supplying the drive voltage VDDEL to a second electrode 696 of the ninth transistor T9. The eighth transistor T8 includes the gate electrode 682, the first electrode 684, and the second electrode 686. The gate electrode 682 is electrically connected to the scan signal line 331, a gate electrode 602 of the tenth transistor T10, the gate electrode 642 of the fourth transistor T4, and the gate electrode 662 of the sixth transistor T6. The first electrode 684 is electrically connected to a sixth node N6, the first electrode 32 of the light emitting device OLED, and the second electrode 696 of the ninth transistor T9. The second electrode 686 is electrically connected to the drive power supply line PVDD. Similar to the configurations of the pixel 180 and the pixel circuit 181, the second scan signal SC2($n$) is supplied to the scan signal line 331. The eighth transistor T8 is switched using the second scan signal SC2($n$). In other words, in the eighth transistor T8, the conduction state (ON state) and the non-conduction state (OFF state) are controlled by the second scan signal SC2($n$). In the case where the signal supplied to the second scan signal SC2($n$) is LO, the eighth transistor T8 becomes non-conductive. In the case where the signal supplied to the second scan signal SC2($n$) is HI, the eighth transistor T8 becomes conductive.

The ninth transistor T9 has a function of conducting the sixth node N6 (the second electrode 696 of the ninth transistor T9) and the fifth node N5 (the first electrode 694 of the ninth transistor T9 and the second electrode 626 of the second transistor T2) to provide the drive voltage VDDEL to the fifth node N5. The ninth transistor T9 includes the gate electrode 692, the first electrode 694, and the second electrode 696. The gate electrode 692 is electrically connected to the scan signal line 330, the gate electrode 632 of the third transistor T3, and the gate electrode 672 of the seventh transistor T7. The first electrode 694 is electrically connected to the fifth node N5, the second electrode 626 of the second transistor T2, and the second electrode 606 of the tenth transistor T10. Similar to the configurations of the pixel 180 and the pixel circuit 181, the first scan signal SC1(*n*) is supplied to the scan signal line 330. The ninth transistor T9 is switched using the first scan signal SC1(*n*). In other words, in the ninth transistor T9, the conduction state (ON state) and the non-conduction state (OFF state) are controlled by the first scan signal SC1(*n*). In the case where the signal supplied to the first scan signal SC1(*n*) is LO, the ninth transistor T9 becomes non-conductive. In the case where the signal supplied to the first scan signal SC1(*n*) is HI, the ninth transistor T9 becomes conductive.

The tenth transistor T10 has a function of bringing the fifth node N5 and the constant voltage power supply line SVS into conduction and supplying the constant voltage VSH to the fifth node N5. The tenth transistor T10 includes the gate electrode 602, a first electrode 604, and the second electrode 606. The gate electrode 602 is electrically connected to the scan signal line 331. The first electrode 604 is electrically connected to the constant voltage power supply line SVS. The second electrode 606 is electrically connected to the constant voltage power supply line SVS. Similar to the configurations of the pixel 180 and the pixel circuit 181, the second scan signal SC2(*n*) is supplied to the scan signal line 331. The tenth transistor T10 is switched using the second scan signal SC2(*n*). In other words, in the tenth transistor T10, the conduction state (ON state) and the non-conduction state (OFF state) are controlled by the second scan signal SC2(*n*). In the case where the signal supplied to the second scan signal SC2(*n*) is LO, the tenth transistor T10 becomes non-conductive. In the case where the signal supplied to the second scan signal SC2(*n*) is HI, the tenth transistor T10 becomes conductive.

The configuration and the function of the pixel circuit 181B other than the configuration and the function described in "3-1. Configuration of Pixel 180B" are the same as those of the pixel circuit 181.

[3-2. Driving Method for Pixel Circuit 181B]

Referring to FIG. 21 to FIG. 24, a method for driving the display device according to the third embodiment will be described. Configurations that are the same as or similar to those in FIG. 1 to FIG. 20 will be described as necessary. Further, the timings of the first scan signal SC1(*n*), the second scan signal SC2(*n*), the third scan signal SC3(*n*), the fourth scan signal SC4(*n*), and the image data signal SL(m) including the data signal VDATA are the same as those described in "1-5-1. First Example of Driving Method for Display Device 10" to "1-5-4. Fourth Example of Driving Method for Driving Display device 10".

The driving method for the display device according to the third embodiment includes a period similar to the driving method for the display device 10 according to the first embodiment shown in FIG. 4.

In one horizontal period (horizontal period HRP) in the driving method of the display device according to the third embodiment, the pixel 180B (pixel circuit 181B) receives the image data signal SL(m) including the first scan signal SC1(*n*), the second scan signal SC2(*n*), the third scan signal SC3(*n*), the fourth scan signal SC4(*n*), the initialization voltage VINI, the reference voltage VREF, the constant voltage VSH, and the data signal VDATA. For example, the pixel 180B is selected according to the timings of the first scan signal SC1(*n*), the second scan signal SC2(*n*), the third scan signal SC3(*n*), and the fourth scan signal SC4(*n*). The image data signal SL(m) is input to the selected pixel 180B according to the timings of the respective signals. A similar operation is performed on all the pixels 180B, and an image of the frame corresponding to 1FRAME is displayed in the display region 22 of the display device 10 based on the image data signal SL(m) input to all the pixels 180B.

For example, each signal of each frame and voltage (potential) supplied to each node in the timing charts shown in FIG. 21 to FIG. 24 are shown in Table 2.

TABLE 2

| | Setting Value [V] |
|---|---|
| VTH | 1 |
| VSIGL(black) | 0.2 |
| VSIGH(white) | 4.2 |
| HI | 10 |
| LO | −4 |
| VINI | −2 |
| VREF | 1.4 |
| VSH | 2.5V |
| VDDEL | 8 |
| VSSEL | 0 |

For example, as shown in FIG. 2, the constant voltage VSH is 2.5 V. The other voltage setting values are the same as the setting values shown in Table 1 described in "1-5. Driving Method for Display Device 10".

[3-2-1. First Example of Driving Method for Pixel Circuit 181B]

Figure 21:
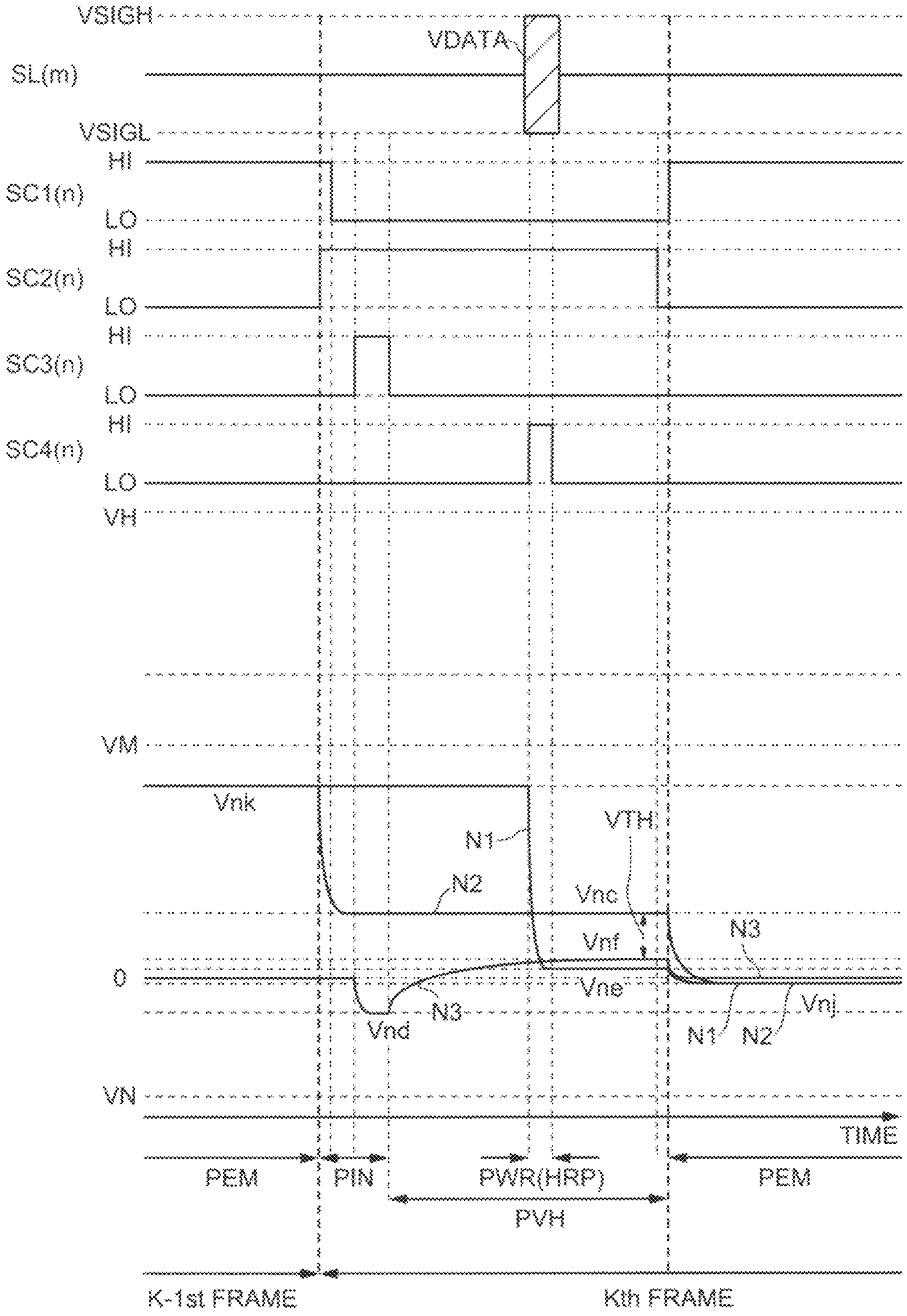
FIG. 21 is a timing chart of the pixel circuit according to the third embodiment of the present invention.

Referring to FIG. 21 and Table 2, a first example of a driving method for the pixel circuit 181B will be described. Similar to the first example of the driving method for the display device 10 according to the first embodiment, the method includes displaying images of different colors in consecutive frames.

In the light emission period PEM of the K−1stFRAME, the first transistor T1, the fourth transistor T4, the fifth transistor T5, the sixth transistor T6, the eighth transistor T8, and the tenth transistor T10 are in the OFF state, and the third transistor T3, the seventh transistor T7, and the ninth transistor T9 are in the ON state. Further, for example, the voltage Vnk supplied to the first node N1 and the second node N2 is 3.8 V, the voltage supplied to the third node N3 is 0 V (reference voltage VSSEL), and the potential difference Vgs is 3.8 V. Therefore, the second transistor T2 can cause the current Ion to flow based on the potential difference Vgs and the potential difference Vds corresponding to the voltage VSIGH input in the horizontal period HRP of K−1stFRAME. Further, the second transistor T2 is in the ON state, the drain current Ion flows from the drive power supply line PVDD to the light-emitting device OLED and the reference voltage line PVSS, and the light-emitting device OLED emits light. For example, the pixel 180B emits red, and emits white in three pixels using the pixel 180B that emits red light, the pixel 180B that emits blue light, and the pixel 180B that emits green light.

In an initial period of the period PIN of the KthFRAME following the emission period PEM of the K−1stFRAME, the third transistor T3, the seventh transistor T7, and the ninth transistor T9 are turned from the ON state to the OFF state, the fourth transistor T4, the sixth transistor T6, the eighth transistor T8, and the tenth transistor T10 are turned from the OFF state to the ON state, and the first transistor T1 and the fifth transistor T5 remain in the OFF state. Consequently, the voltage supplied to the first node N1 and the voltage supplied to the third node N3 maintain the voltage Vnk, and the voltage supplied to the second node N2 gradually drops from the voltage Vnk toward the voltage Vnc (reference voltage VREF, 1.4 V) and becomes the voltage Vnc. Further, although not shown, the voltage supplied to the fourth node N4 gradually drops toward the voltage Vnc (reference voltage VREF, 1.4 V) and becomes the voltage Vnc. The fifth node N5 is electrically connected to the constant voltage power supply line SVS, and the voltage supplied to the fifth node N5 gradually drops from the voltage supplied in the emission period PEM of the K−1stFRAME toward the voltage VSH (2.5 V), and becomes the voltage VSH. The sixth node N6 (the first electrode 32 of the light-emitting device OLED) is electrically connected to the second electrode 34 (the drive voltage power supply line PVDD) of the light-emitting device OLED, and the voltage supplied to the sixth node N6 gradually increases from the voltage supplied in the emission period PEM of the K−1 stFRAME toward the voltage VDDEL (8 V), and becomes the voltage VDDEL. Although the second transistor T2 remains in the ON state, the ninth transistor T9 is in the OFF state, and the light-emitting device OLED does not emit light because a current corresponding to the drain current Ion does not flow through the light-emitting device OLED.

In the period PIN following the initial period of the period PIN, the fifth transistor T5 is turned from the OFF state to the ON state, and the second transistor T2, the fourth transistor T4, the sixth transistor T6, the eighth transistor T8, and the tenth transistor T10 are maintained in the ON state, and the first transistor T1, the third transistor, the seventh transistor T7, and the ninth transistor T9 are maintained in the OFF state.

Consequently, the voltage supplied to the first node N1 maintains the voltage Vnk, the voltage supplied to the second node N2 and the voltage supplied to the fourth node N4 maintain the voltage Vnc, the voltage supplied to the fifth node N5 maintains the voltage VSH, and the voltage supplied to the sixth node N6 maintains the voltage VDDEL. The voltage supplied to the third node N3 gradually drops from 0 V to the voltage Vnd (initialization voltage VINI, −2 V) and becomes the voltage Vnd. The potential difference Vgs is 3.4 V (1.4 V−(−2 V)) and the potential difference Vds is 4.5 V (2.5V−(−2 V)). Although the second transistor T2 is in the ON state, the ninth transistor T9 is in the OFF state, and the light-emitting device OLED does not emit light. In this case, the capacitive element CD holds a charge corresponding to the potential difference between the voltage Vnk supplied to the first node N1 and the voltage Vnc supplied to the fourth node N4 and maintains the potential difference, and the capacitive element CV holds a charge corresponding to the potential difference between the voltage Vnc supplied to the fourth node N4 and the voltage Vnd supplied to the third node N3 and maintains the potential difference. The voltage supplied to the fourth node N4 is the same as the voltage supplied to the second node N2, and the capacitive element CV maintains the potential difference Vgs (the potential difference between the voltage supplied to the gate electrode 622 and the voltage supplied to the first electrode 624 of the second transistor T2).

As described above, in the period PIN, the second node N2 and the fourth node N4 are initialized by the reference voltage VREF (1.4 V), and the third node N3 is initialized by the initialization voltage VINI (−2 V).

In the period PVH following the period PIN, the fifth transistor T5 is turned from the ON state to the OFF state, and the second transistor T2, the fourth transistor T4, the sixth transistor T6, the eighth transistor T8, and the tenth transistor T10 are maintained in the ON state, and the first transistor T1, the third transistor, the seventh transistor T7, and the ninth transistor T9 are maintained in the OFF state.

Consequently, the voltage supplied to the first node N1 maintains the voltage Vnk, and the voltage supplied to the second node N2 and the voltage supplied to the fourth node N4 maintain the voltage Vnc. The voltage supplied to the fifth node N5 maintains the voltage VSH, and the voltage supplied to the sixth node N6 maintains the voltage VDDEL. The voltage supplied to the third node N3 gradually increases from the voltage Vnd toward the voltage Vnf. Similar to "1-5-1. First Example of Driving Method for Display Device 10", the voltage supplied to the third node N3 may be the voltage Vnf, and the voltage Vnf (0.4 V) is the voltage at which the potential difference Vgs is the threshold voltage VTH (1 V) of the second transistor T2.

In the middle of the period PVH, in the period PWR which is parallel to (overlaps) the period PVH, the first transistor T1 is turned from the OFF state to the ON state, and the first transistor T1, the third transistor, the fifth transistor T5, the seventh transistor T7, and the ninth transistor T9 remain in the OFF state while the second transistor T2, the fourth transistor T4, the sixth transistor T6, the eighth transistor T8, and the tenth transistor T10 remain in the ON state. Similar to "1-5-1. First Example of Driving Method for Display Device 10", the period during which HI is supplied to the fourth scan signal SC4(*n*) (period PWR (horizontal period HRP)) may be longer than the period shown in FIG. 5, may be longer than the period PIN during which HI is supplied to the second scan signal SC2(*n*), may be the same as the period PIN, or may be shorter than the period PIN.

Consequently, the voltage supplied to the first node N1 gradually drops toward the voltage Vne (voltage VSIGL (0.2 V)) to become the voltage Vne, and the voltage supplied to the second node N2 and the voltage supplied to the fourth node N4 maintain the voltage Vnc. The voltage supplied to the third node N3 gradually increases from the voltage Vnd toward the voltage Vnf. The voltage supplied to the third node N3 may be the voltage Vnf. The voltage supplied to the fifth node N5 maintains the voltage VSH, and the voltage supplied to the sixth node N6 maintains the voltage VDDEL. In this case, the capacitive element CD holds a charge corresponding to a potential difference between the voltage Vne supplied to the first node N1 and the voltage Vnc supplied to the fourth node N4, and maintains the potential difference. That is, the capacitive element CD holds charges corresponding to the potential difference with respect to the voltage of the data signal VDATA with reference to the reference voltage VREF and maintains (holds) the voltage included in the data signal VDATA with reference to the reference voltage VREF.

As described above, in the period PWR, the data signal VDATA is written into the pixel 180B. The capacitive element CD maintains (holds) the voltage included in the data signal VDATA.

In the period PWR after the period PVH, the first transistor T1 is turned from the ON state to the OFF state, the fourth transistor T4, the sixth transistor T6, the eighth transistor T8, and the tenth transistor T10 are maintained in the ON state, and the third transistor, the fifth transistor T5, the seventh transistor T7, and the ninth transistor T9 are maintained in the OFF state. After the first transistor T1 is turned to the OFF state, the fourth transistor T4, the sixth transistor T6, the eighth transistor T8, and the tenth transistor T10 are turned from the ON state to the OFF state.

Consequently, the voltage supplied to the first node N1 maintains the voltage Vne, and the voltage supplied to the second node N2 and the voltage supplied to the fourth node N4 maintain the voltage Vnc. The voltage supplied to the third node N3 gradually increases from the voltage Vnd toward the voltage Vnf and becomes the voltage Vnf. The voltage supplied to the fifth node N5 maintains the voltage VSH, and the voltage supplied to the sixth node N6 maintains the voltage VDDEL. At this time, the potential difference Vgs is the same as the threshold voltage VTH (1 V), and the second transistor T2 is in the OFF state. Therefore, since a current corresponding to the drain current Ion does not flow, the light-emitting device OLED does not emit light. Further, as described above, the voltage supplied to the fourth node N4 is the same as the voltage supplied to the second node N2, and the capacitive element CV maintains the potential difference Vgs, so that the capacitive element CV maintains the threshold voltage VTH.

As described above, in the period PVH, by an operation in which the potential difference Vgs of the second transistor T2 becomes the same as the threshold voltage VTH, threshold voltage VTH of the second transistor T2 is acquired, and charges corresponding to the threshold voltage VTH in the capacitive element CV are held.

In the emission period PEM of the KthFRAME following the period PVH of the KthFRAME, the first transistor T1, the fourth transistor T4, the fifth transistor T5, the sixth transistor T6, the eighth transistor T8, and the tenth transistor T9 remain in the OFF state, and the third transistor T3, the seventh transistor T7, and the ninth transistor T8 are turned from the OFF state to the ON state. In this case, the sixth node N6 is electrically connected to the fifth node N5, the second transistor T2 is electrically connected to the light-emitting device OLED, and the third node N3 is electrically connected to the reference voltage power supply line PVSS.

Consequently, the voltage supplied to the third node N3 drops from the voltage Vnf toward the reference voltage VSSEL (0 V) and becomes 0 V. Further, as will be described later, since the second transistor T2 is in the OFF state, the voltage supplied to the fifth node N5 rises from the constant voltage VSH (2.5 V) toward the drive voltage VDDEL (8 V) and becomes 8 V. The voltage supplied to the first node N1 and the second node N2 decreases, and the voltage supplied to the third node N3 decreases, whereby the voltage supplied to the second node N2 gradually decreases from the voltage Vne toward the voltage Vnj (for example, −0.2 V) to become the voltage Vnj, and the voltage supplied to the first node N1 connected to the second node N2 also gradually decreases from the voltage Vnc toward the voltage Vnj to become the voltage Vnj.

In this case, the potential difference Vgs becomes a sum of the potential difference held in the capacitive element CD and the potential difference held in the capacitive element CV (voltage included in the data signal VDATA (voltage VSIGL, 0.2 V)−reference voltage VREF (1.4 V)+threshold voltage VTH (1V)=−0.2 V). In other words, in the emission period PEM of the KthFRAME, the pixel 180B can display images based on the data signal VDATA and the corrected thresholds.

Specifically, since the potential difference Vds is 8 V and the potential difference Vgs (−0.2 V) is lower (smaller) than the threshold voltage VTH, the second transistor T2 is in the OFF state, and no current flows from the drive power supply line PVDD to the reference voltage line PVSS, so that the light-emitting device OLED does not emit light. Consequently, the pixel 180B that emits red light becomes black. Similar to the pixel 180B that emits red light, the pixel 180B that emits blue light and the pixel 180B that emits green light do not emit light, and therefore, three pixels in which the pixel 180B that emit red light, the pixel 180B that emits blue light, and the pixel 180B that emits green light become black.

The display device according to the third embodiment is a display device that is highly flexible in period PWR and highly versatile in which the driving speed can be increased, and the period PWR can be executed in parallel within the period PIN and the period PVH within the period PIN and the period PVH in the same manner as in "1-5-1. First Example of Driving Method for Display Device 10" to "1-5-4. Fourth Example of Driving Method for Display Device 10".

In addition, in the period PVH of the display device according to the third embodiment, the second transistor T2 is not connected (disconnected) to the light-emitting device OLED, the voltage supplied to the second electrode 626 of the second transistor T2 is the constant voltage VSH, and the voltage supplied to the second electrode 44 of the capacitive element CV is the reference voltage VREF. That is, parasitic capacitance added to the second transistor T2 is small because the constant voltage is supplied to the gate electrode 622 (second node N2) and the second electrode 626 of the second transistor T2, and the second transistor T2 is not connected (disconnected) to the light emitting device OLED. Therefore, the time required for the capacitive element CV to hold the potential difference Vgs (charges) corresponding to the threshold voltage VTH is shorter than the configuration in which the second transistor T2 is connected (not disconnected) to the light-emitting device OLED. Therefore, in the driving methods of the display device according to the third embodiment, the threshold voltage VTH can be acquired and times for holding the charges corresponding to the threshold voltage VTH in the capacitive element CV can be increased.

[3-2-2. Second Example of Driving Method for Pixel Circuit 181B]

Figure 22:
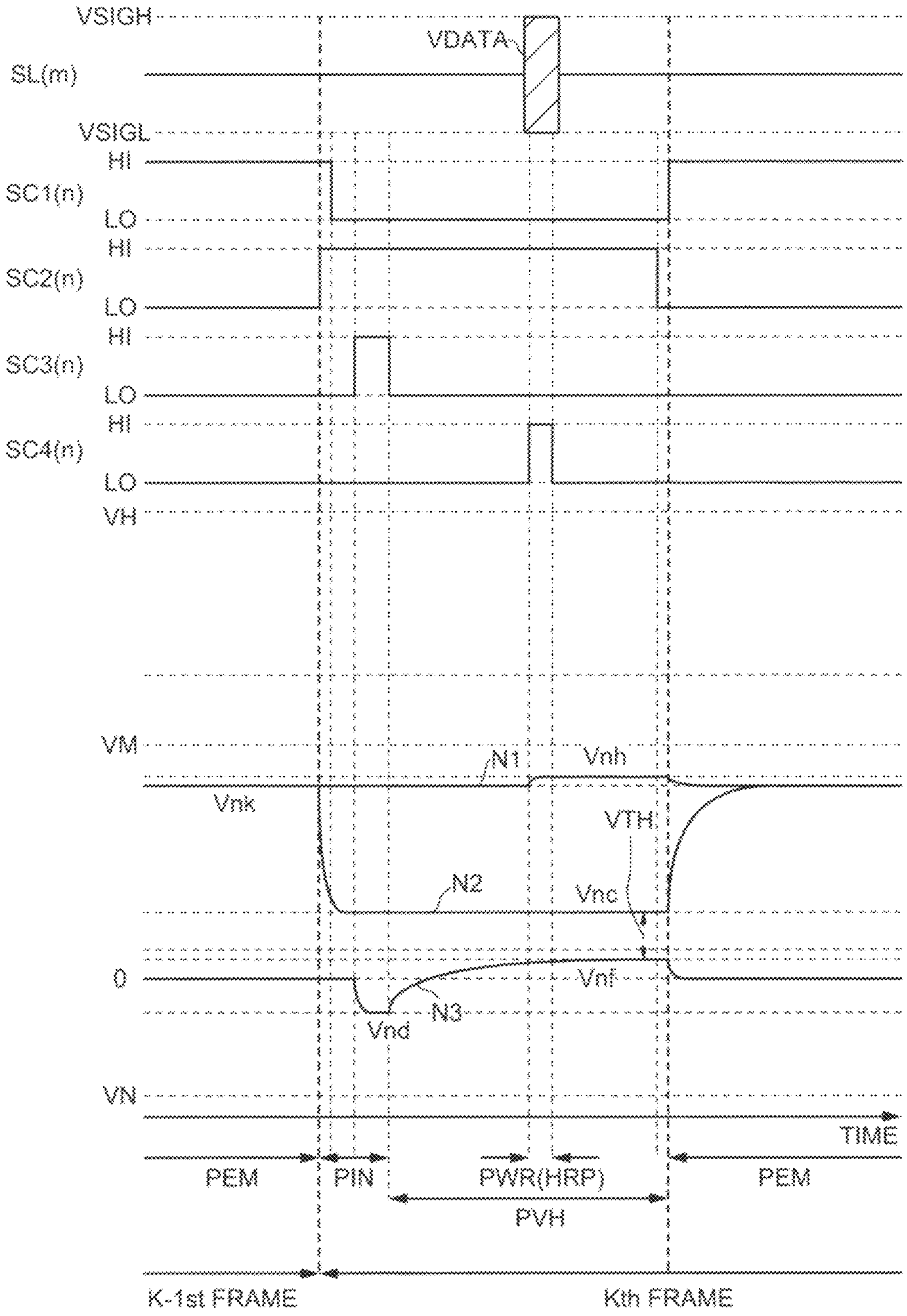
FIG. 22 is a timing chart of the pixel circuit according to the third embodiment of the present invention.

Referring to FIG. 22, a second example of the driving method for the pixel circuit 181B will be described. The driving method shown in the second example of the pixel circuit 181B includes displaying images of the same color (white) in consecutive frames as in the second example of the driving method for the display device 10 according to the first embodiment. Configurations that are the same as or similar to those in FIG. 1 to FIG. 21 will be described as necessary.

The first node N1 in the period PWR of the KthFRAME, the period PVH after the period PWR of the KthFRAME, and the period excluding the emission period PEM of KthFRAME, and the like are the same as those described in "3-2-1. First Example of Driving Method for Pixel Circuit 181B". Further, the voltage (potential) of the second node N2 and the third node N3, the voltage (potential) of the fourth node N4, and the like in the period excluding the emission period PEM of the KthFRAME are the same as the configuration described in "3-2-1. First Example of Driving Method for Pixel Circuit 181B". Further, the operation and the like of the transistors in the respective periods are the same as those described in "3-2-1. First Example of Driving Method for Pixel Circuit 181B". Therefore, the same configuration as that described in "3-2-1. First Example of Driving Method for Pixel Circuit 181B" will be described as needed. In addition, the image data signal SL(m) is supplied with the data signal VDATA including VSIGH corresponding to white in the period PWR of the KthFRAME, and is supplied with the same data signal VDATA as the configuration described in "3-2-1. First Example of Driving Method for Pixel Circuit 181B" in the period other than the period PWR of the KthFRAME.

In the emission period PEM of the K−1stFRAME, similar to the configuration described in "3-2-1. First Example of Driving Method for Pixel Circuit 181B", the drain current Ion flows from the driving power supply line PVDD to the light-emitting device OLED and the reference voltage line PVSS, and the light-emitting device OLED emits light.

In the initial period of the period PIN of the Kth FRAME following the emission period PEM of the K−1st FRAME, and the period PIN, similar to the configuration described in "3-2-1. First Example of Driving Method for Pixel Circuit 181B", the second node N2 and the fourth node N4 are initialized by the reference voltage VREF (1.4 V), the third node N3 is initialized by the initialization voltage VINI (−2 V), the voltage supplied to the fifth node N5 is the voltage VSH, and the voltage supplied to the sixth node N6 is the voltage VDDEL.

In the period PVH following the period PIN, similar to the configuration described in "3-2-1. First Example of Driving Method for Pixel Circuit 181B", the voltage supplied to the first node N1 maintains the voltage Vnk, the voltage supplied to the second node N2 and the voltage supplied to the fourth node N4 maintain the voltage Vnc, the voltage supplied to the fifth node N5 maintains the voltage VSH, the voltage supplied to the sixth node N6 maintains the voltage VDDEL, and the voltage supplied to the third node N3 gradually increases from the voltage Vnd toward the voltage Vnf.

In the middle of the period PVH, the period PWR that is parallel to (overlaps) the period PVH is executed. In the period PWR, the image data signal SL(m) is supplied with the voltage VSIGH (4.2 V). The voltage supplied to the first node N1 gradually increases toward the voltage Vnh (voltage VSIGH (4.2 V)) and becomes the voltage Vnh. The voltage supplied to the second node N2 and the voltage supplied to the fourth node N4 maintain the voltage Vnc. The voltage supplied to the third node N3 gradually increases from the voltage Vnd toward the voltage Vnf. In this case, with reference to the reference voltage VREF, the capacitive element CD holds charges corresponding to the potential difference with respect to the voltage included in the data signal VDATA and maintains (holds) the voltage included in the data signal VDATA with reference to the reference voltage VREF. The voltage supplied to the fifth node N5 maintains the voltage VSH, and the voltage supplied to the sixth node N6 maintains the voltage VDDEL.

As described above, in the period PWR, the data signal VDATA is written into the pixel 180B. The capacitive element CD maintains (holds) the voltage included in the data signal VDATA.

In the period PVH after the period PWR, the voltage supplied to the first node N1 maintains the voltage Vnh, the voltage supplied to the second node N2 and the voltage supplied to the fourth node N4 maintain the voltage Vnc, the voltage supplied to the fifth node N5 maintains the voltage VSH, and the voltage supplied to the sixth node N6 maintains the voltage VDDEL. The voltage supplied to the third node N3 gradually increases from the voltage Vnd toward the voltage Vnf and becomes the voltage Vnf. In this case, similar to the configuration described in "3-2-1. First Example of Driving Method for Pixel Circuit 181B", the second transistor T2 is in the OFF state, and since the drain current Ion does not flow from the driving power supply line PVDD to the reference voltage line PVSS, the light-emitting device OLED does not emit light, and the capacitive element CV maintains the potential difference Vgs and holds the threshold voltage VTH.

As described above, in the period PVH, the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the emission period PEM of the KthFRAME, the first node N1 is in conduction with the second node N2, and the voltage supplied to the second node N2 gradually increases from the voltage Vnc toward the voltage Vnh (4.2 V). Consequently, the second transistor T2 becomes conductive, and the drain current Ion flows from the drive power supply line PVDD to the reference voltage line PVSS. As will be described later, a sum of the potential difference held in the capacitive element CD and the potential difference held in the capacitive element CV is 3.8 V, and the potential of the first electrode 42 of the capacitive element CV at the low potential is connected to VSSEL and becomes 0 V. Therefore, the potential of the second electrode 54 of the high potential side capacitive element CD drops from 3.8 V. That is, the potential of the first node N1 drops from the voltage Vnh (4.2 V), and the potential of the second node N2 connected to the first node N1 only rises to 3.8 V (voltage Vnk). Therefore, the voltage supplied to the first node N1 and the voltage supplied to the second node N2 are 3.8 V (voltage Vnk). Further, the voltage supplied to the third node N3 drops from the voltage Vnf toward the reference voltage VSSEL (0 V) and becomes 0 V. In this case, the sixth node N6 is electrically connected to the fifth node N5.

In this case, the potential difference Vgs is a sum of the potential difference held in the capacitive element CD and the potential difference held in the capacitive element CV (voltage included in the data signal VDATA (voltage VSIGH, 4.2 V)−reference voltage VREF (1.4 V)+threshold voltage VTH (1V)=3.8 V). In other words, in the emission period PEM of the KthFRAME, the pixel 180B can display images based on the data signal VDATA and the corrected thresholds. For example, since the potential difference Vgs (3.8 V) is greater than the threshold voltage VTH (1 V), the second transistor T2 is in the ON state, the drain current Ion flows from the drive power supply line PVDD to the reference voltage line PVSS, and the light emitting device OLED emits light. For example, the pixel 180B is red, and white light is emitted by three pixels using the pixel 180B emitting red light, the pixel 180B emitting blue light, and the pixel 180B emitting green light.

The second example of the driving method for the pixel circuit 181B has the same advantageous effects as those described in "3-2-1. First Example of Driving Method for Pixel Circuit 181B".

[3-2-3. Third Example of Driving Method for Pixel Circuit 181B]

Figure 23:
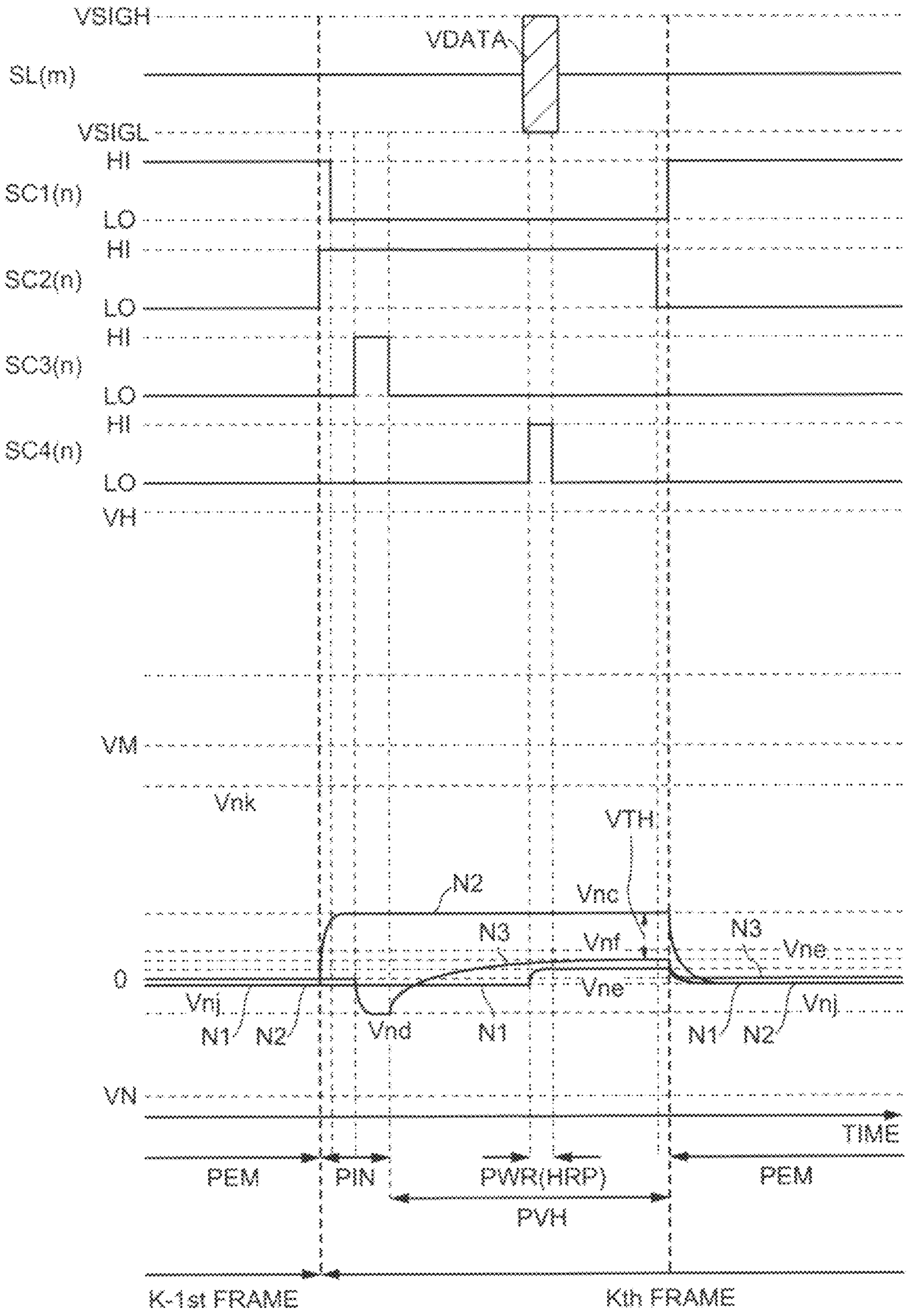
FIG. 23 is a timing chart of the pixel circuit according to the third embodiment of the present invention.

Referring to FIG. 23, a third example of the driving method for the pixel circuit 181B will be described. The driving method shown in the third example of the driving method for the pixel circuit 181B includes displaying images of the same color (black) in consecutive frames, similar to the third example of the driving method for the display device 10 according to the first embodiment. Configurations that are the same as or similar to those in FIG. 1 to FIG. 22 will be described as necessary.

In the emission period PEM of the K−1stFRAME, the voltage supplied to the first node N1 and the second node N2 is the voltage Vnj, the voltage supplied to the third node N3 is 0 V, and the potential difference Vgs is −0.2 V. Therefore, the second transistor T2 is in the OFF state, the drain current Ion does not flow from the drive power supply line PVDD to the light-emitting devices OLED and the reference voltage line PVSS, and the pixel 180B emitting red light is black. Similar to the pixel 180B that emits red light, the pixel 180B that emits blue light and the pixel 180B that emits green light do not emit light, and therefore, three pixels using the pixel 180B that emits red light, the pixel 180B that emits blue light, and the pixel 180B that emits green light become black.

In the initial period of the period PIN of the KthFRAME following the emission period PEM of the K−1stFRAME, the voltage supplied to the first node N1 maintains the voltage Vnj. The voltage supplied to the second node N2 gradually increases from the voltage Vnj toward the voltage Vnc (reference voltage VREF, 1.4 V) and becomes the voltage Vnc. The voltage supplied to the third node N3 maintains 0 V. Further, although not shown, the voltage supplied to the fourth node N4 gradually increases toward the voltage Vnc (reference voltage VREF, 1.4 V) and becomes the voltage Vnc. Similar to the configuration described in "3-2-1. First Example of Driving Method for Pixel Circuit 181B", the fifth node N5 is electrically connected to the constant voltage power supply line SVS, and the voltage supplied to the fifth node N5 gradually drops from the voltage supplied in the emission period PEM of the K−1stFRAME toward the voltage VSH (2.5 V), resulting in the voltage VSH. The sixth node N6 (the first electrode 32 of the light-emitting device OLED) is electrically connected to the second electrode 34 (the drive voltage power supply line PVDD) of the light-emitting device OLED, and the voltage supplied to the sixth node N6 gradually increases from the voltage supplied in the emission period PEM of the K−1stFRAME toward the voltage VDDEL (8 V), and becomes the voltage VDDEL. The second transistor T2 is in the OFF state, and the light-emitting device OLED does not emit light because the drain current Ion does not flow through the light-emitting device OLED.

In the period PIN following the initial period of the period PIN, the voltage supplied to the first node N1 maintains the voltage Vnj, the voltage supplied to the second node N2 and the voltage supplied to the fourth node N4 maintain the voltage Vnc, the voltage supplied to the fifth node N5 maintains the voltage VSH, and the voltage supplied to the sixth node N6 maintains the voltage VDDEL. The voltage supplied to the third node N3 gradually drops from voltage Vng toward the voltage Vnd (initialization voltage VINI, −2 V) and becomes the voltage Vnd. The potential difference Vgs is 3.4 V (1.4 V−(−2 V)) and the potential difference Vds is 10 V (8 V−(−2 V)). Similar to the configuration described in "3-2-1. First Example of Driving Method for Pixel Circuit 181B", although the second transistor T2 is turned from the OFF state to the ON state, the ninth transistor T9 is in the OFF state and the light-emitting device OLED does not emit light. In this case, the capacitive element CD holds charges corresponding to the potential difference between the voltage Vnj supplied to the first node N1 and the voltage Vnc supplied to the fourth node N4, and maintains the potential difference, and the capacitive element CV maintains the potential difference Vgs.

As described above, similar to the configuration described in "3-2-1. First Example of Driving Method for Pixel Circuit 181B", in the period PIN, the second node N2 and the fourth node N4 are initialized by the reference voltage VREF (1.4 V), and the third node N3 is initialized by the initialization voltage VINI (−2 V).

In the period PVH following the period PIN, the voltage supplied to the first node N1 maintains the voltage Vnj, the voltage supplied to the second node N2 and the voltage supplied to the fourth node N4 maintain the voltage Vnc, the voltage supplied to the fifth node N5 maintains the voltage VSH, the voltage supplied to the sixth node N3 maintains the voltage VDDEL, and the voltage supplied to the third node VDDEL gradually increases from the voltage Vnd toward the voltage Vnf.

In the middle of the period PVH, in the period PWR which is parallel to (overlaps) the period PVH, the voltage supplied to the first node N1 gradually increases toward the voltage Vne (voltage VSIGL (0.2 V)) to become the voltage Vne, the voltage supplied to the second node N2 and the voltage supplied to the fourth node N4 maintain the voltage Vnc, the voltage supplied to the fifth node N5 maintains the voltage VSH, the voltage supplied to the sixth node N6 maintains the voltage VDDEL, and the voltage supplied to the third node N3 gradually increases from the voltage Vnd toward the voltage Vnf. In this case, similar to the configuration described in "3-2-1. First Example of Driving Method for Pixel Circuit 181B", the capacitive element CD holds charges corresponding to the potential difference with the voltage included in the data signal VDATA with reference to the reference voltage VREF and maintains (holds) the voltage included in the data signal VDATA with reference to the reference voltage VREF.

As described above, the data signal VDATA is written to the pixel 180B in the period PWR in the same manner as in the configuration described in "3-2-1. First Example of Driving Method for Pixel Circuit 181B". The capacitive element CD maintains (holds) the voltage included in the data signal VDATA.

In the period PVH after the period PWR, similar to the configuration described in "3-2-1. First Example of Driving Method for Pixel Circuit 181B", the voltage supplied to the first node N1 maintains the voltage Vne, the voltage supplied to the second node N2 and the voltage supplied to the fourth node N4 maintain the voltage Vnc, the voltage supplied to the fifth node N5 maintains the voltage VSH, the voltage supplied to the sixth node N6 maintains the voltage VDDEL, and the voltage supplied to the third node N3 gradually increases from the voltage Vnd toward the voltage Vnf and becomes the voltage Vnf. Since the second transistor T2 is in the OFF state and no current corresponding to the drain current Ion flows, the light-emitting device OLED does not emit light. The capacitive element CV maintains the potential difference Vgs, and the capacitive element CV maintains the threshold voltage VTH.

As described above, in the same manner as the configuration described in "3-2-1. First Example of Driving Method for Pixel Circuit 181B", in the period PVH, the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the emission period PEM of the KthFRAME following the period PVH of the KthFRAME, similar to the configuration described in "3-2-1. First Example of Driving Method for Pixel Circuit 181B", the first node N1 becomes conductive with the second node N2, the voltage supplied to the first node N1 and the voltage supplied to the second node N2 become the voltage Vnj, and the voltage supplied to the third node N3 becomes 0 V. In this case, the sixth node N6 is electrically connected to the fifth node N5. Consequently, as in the configuration described in "3-2-1. First Example of Driving Method for Pixel Circuit 181B", since the pixel 180B emitting red light, the pixel 180B emitting blue light, and the pixel 180B emitting green light do not emit light, the three pixels using the pixel 180B emitting red light, the pixel 180B emitting blue light, and the pixel 180B emitting green light become black.

The third example of the driving method for the pixel circuit 181B has the same advantageous effects as those described in "3-2-1. First Example of Driving Method for Pixel Circuit 181B".

[3-2-4. Fourth Example of Driving Method for Pixel Circuit 181B]

Figure 24:
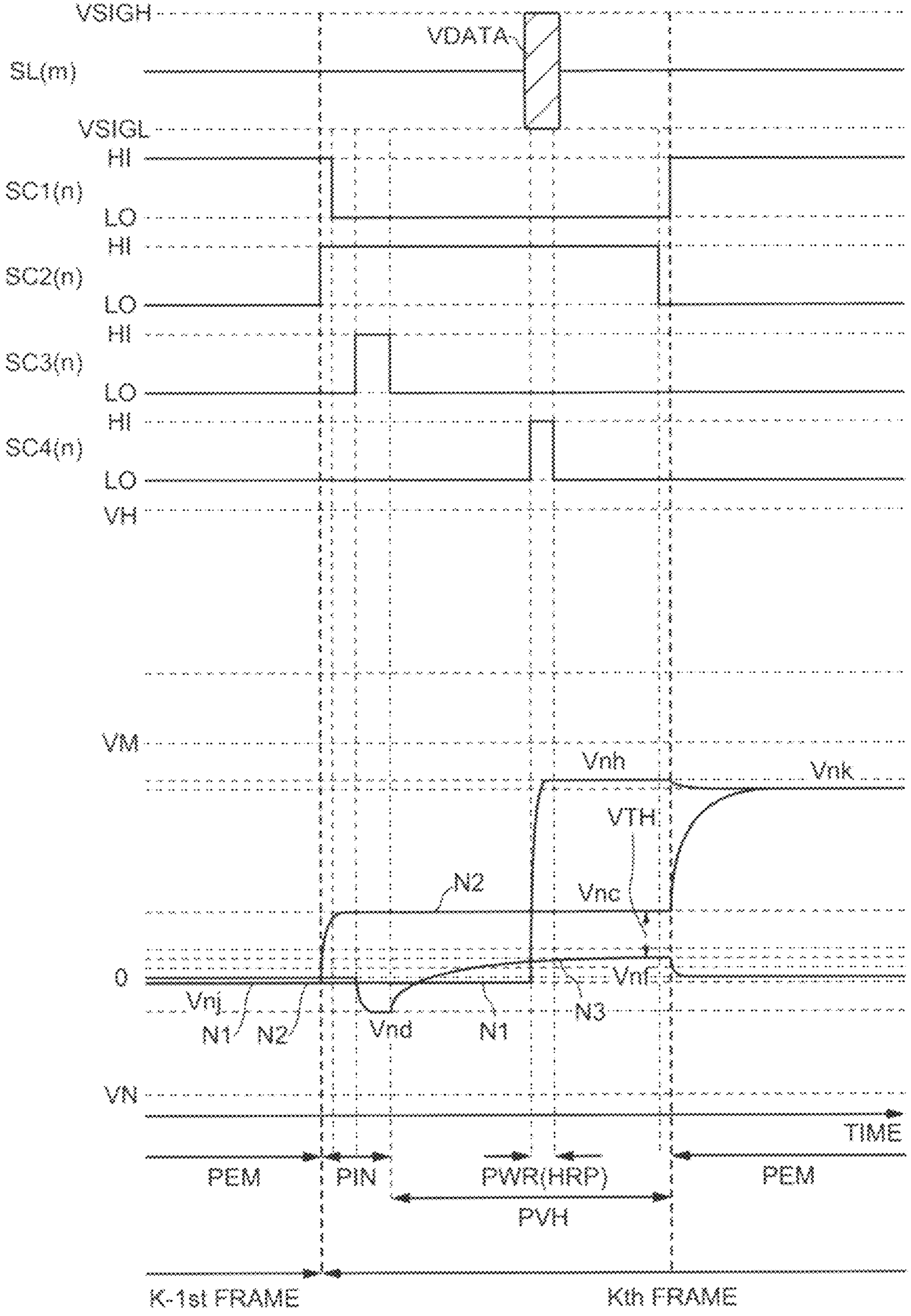
FIG. 24 is a timing chart of the pixel circuit according to the third embodiment of the present invention.

Referring to FIG. 24, a fourth example of the driving method for the pixel circuit 181B will be described. The driving method shown in the fourth example of the driving method for the pixel circuit 181B includes displaying images of differing colors in successive frames as in the fourth example of the driving method for the display device 10 according to the first embodiment. Configurations that are the same as or similar to those in FIG. 1 to FIG. 23 will be described as necessary.

The configurations of the first scan signal SC1(*n*), the second scan signal SC2(*n*), the third scan signal SC3(*n*), and the fourth scan signal SC4(*n*), and the image data signal SL(m) are the same as those described in "3-2-1. First Example of Driving Method for Pixel Circuit 181B". Further, the voltage (potential) of the second node N2 and the third node N3 during the emission period PEM of the K−1st FRAME to the period PVH of the Kth FRAME, and during the period PWR executed in parallel with the period PVH of the Kth FRAME, and the fourth node N4 are the same as the configuration described in "3-2-3. Third Example of Driving Method for Pixel Circuit 181B". Further, the first node N1 and the like during the emission period PEM of the K−1st FRAME, the period PIN of the Kth FRAME, and the period PVH between the period PIN and the period PWR are similar to the configuration described in "3-2-3. Third Example of Driving Method for Pixel Circuit 181B". In addition, the voltage (potential) of the first node N1, the second node N2, and the third node N3 in the period PVH after the period PWR of the KthFRAME to the emission period PEM of the KthFRAME, and the voltage (potential) of the fourth node N4, and the like are the same as those described in "3-2-2. Second Example of Driving Method for Pixel Circuit 181B". Further, operation and the like of the transistors in the respective periods are the same as those described in "3-2-1. First Example of Driving Method for Pixel Circuit 181B". Therefore, configurations similar to those described in "3-2-1. First Example of Driving Method for Pixel Circuit 181B" to "3-2-3. Third Example of Driving Method for Pixel Circuit 181B" will be described as needed.

In the emission period PEM of the K−1stFRAME, the pixel 180B is black in the same manner as described in "3-2-3. Third Example of Driving Method for Pixel Circuit 181B".

In the period PIN of the KthFRAME, as in "3-2-3. Third Example of Driving Method for Pixel Circuit 181B", the light-emitting device OLED does not emit light, and the capacitive element CD maintains the potential difference Vgs while holding the charge corresponding to the potential difference between the voltage Vnj supplied to the first node N1 and the voltage Vnc supplied to the fourth node N4. In the period PIN, the second node N2 and the fourth node N4 are initialized by the reference voltage VREF (1.4 V), and the third node N3 is initialized by the initialization voltage VINI (−2 V).

In the period PVH between the period PIN and the period PWR of the KthFRAME, as in "3-2-3. Third Example of Driving Method for Pixel Circuit 181B", the voltage supplied to the first node N1 maintains the voltage Vnj, the voltage supplied to the second node N2 and the voltage supplied to the fourth node N4 maintain the voltage Vnc, the voltage supplied to the fifth node N5 maintains the voltage VSH, the voltage supplied to the sixth node N6 maintains the voltage VDDEL, and the voltage supplied to the third node N3 gradually increases from the voltage Vnd toward the voltage Vnf.

In the period PWR of the KthFRAME, the voltage supplied to the first node N1 gradually increases from the voltage Vnf toward the voltage Vnh (voltage VSIGH (4.2 V)) and becomes the voltage Vnh. The voltage supplied to the second node N2 and the voltage supplied to the fourth node N4 maintain the voltage Vnc, the voltage supplied to the fifth node N5 maintains the voltage VSH, the voltage supplied to the sixth node N6 maintains the voltage VDDEL, and the voltage supplied to the third node N3 gradually increases from the voltage Vnd toward the voltage Vnf.

In the period PVH after the period PWR of the KthFRAME, as in "3-2-2. Second Example of Driving Method for Pixel Circuit 181B", the voltage supplied to the first node N1 maintains the voltage Vnh, the voltage supplied to the second node N2 and the voltage supplied to the fourth node N4 maintain the voltage Vnc, the voltage supplied to the fifth node N5 maintains the voltage VSH, the voltage supplied to the sixth node N6 maintains the voltage VDDEL, and the voltage supplied to the third node N3 becomes the voltage Vnf. Further, the light-emitting device OLED does not emit light, and the capacitive element CV maintains the potential difference Vgs and maintains the threshold voltage VTH. Consequently, in the period PVH, the threshold voltage VTH of the second transistor T2 is acquired by the operation in which the potential difference Vgs of the second transistor T2 becomes the same as the threshold voltage VTH, and the charge corresponding to the threshold voltage VTH is held in the capacitive element CV.

In the emission period PEM of the KthFRAME, which follows the period PVH after the period PWR of the KthFRAME, in the same manner as in "3-2-2. Second Example of Driving Method for Pixel Circuit 181B", the first node N1 is electrically connected to the second node N2, the second transistor T2 is electrically connected, and the drain current Ion flows from the drive power supply line PVDD to the reference voltage line PVSS. The potential difference Vgs is a sum (3.8 V) of the potential difference held in the capacitive element CD and the potential difference held in the capacitive element CV, and the voltage supplied to the first node N1 and the voltage supplied to the second node N2 connected to the first node N1 are 3.8 V (voltage Vnk). Therefore, since the potential difference Vgs (3.8 V) is larger than the threshold voltage VTH (1 V) and the drain current Ion flows from the drive power supply line PVDD to the reference voltage line PVSS, the light-emitting device OLED emits light. For example, three pixels using the pixel 180B that emits red light, the pixel 180B that emits blue light, and the pixel 180B that emits green light emit white light.

The fourth example of the driving method for the pixel circuit 181B exhibits the same advantageous effects as those described in "3-2-1. First Example of Driving Method for Pixel Circuit 181B".

4. Fourth Embodiment

Figure 25:
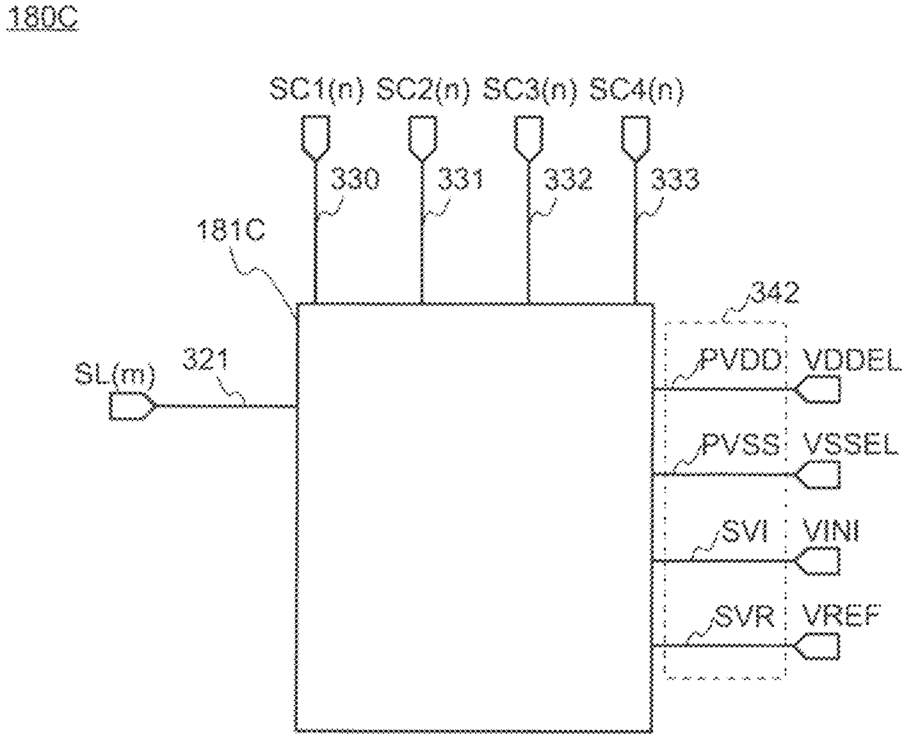
FIG. 25 is a schematic diagram showing an input signal to a pixel circuit according to a fourth embodiment of the present invention.
Figure 26:
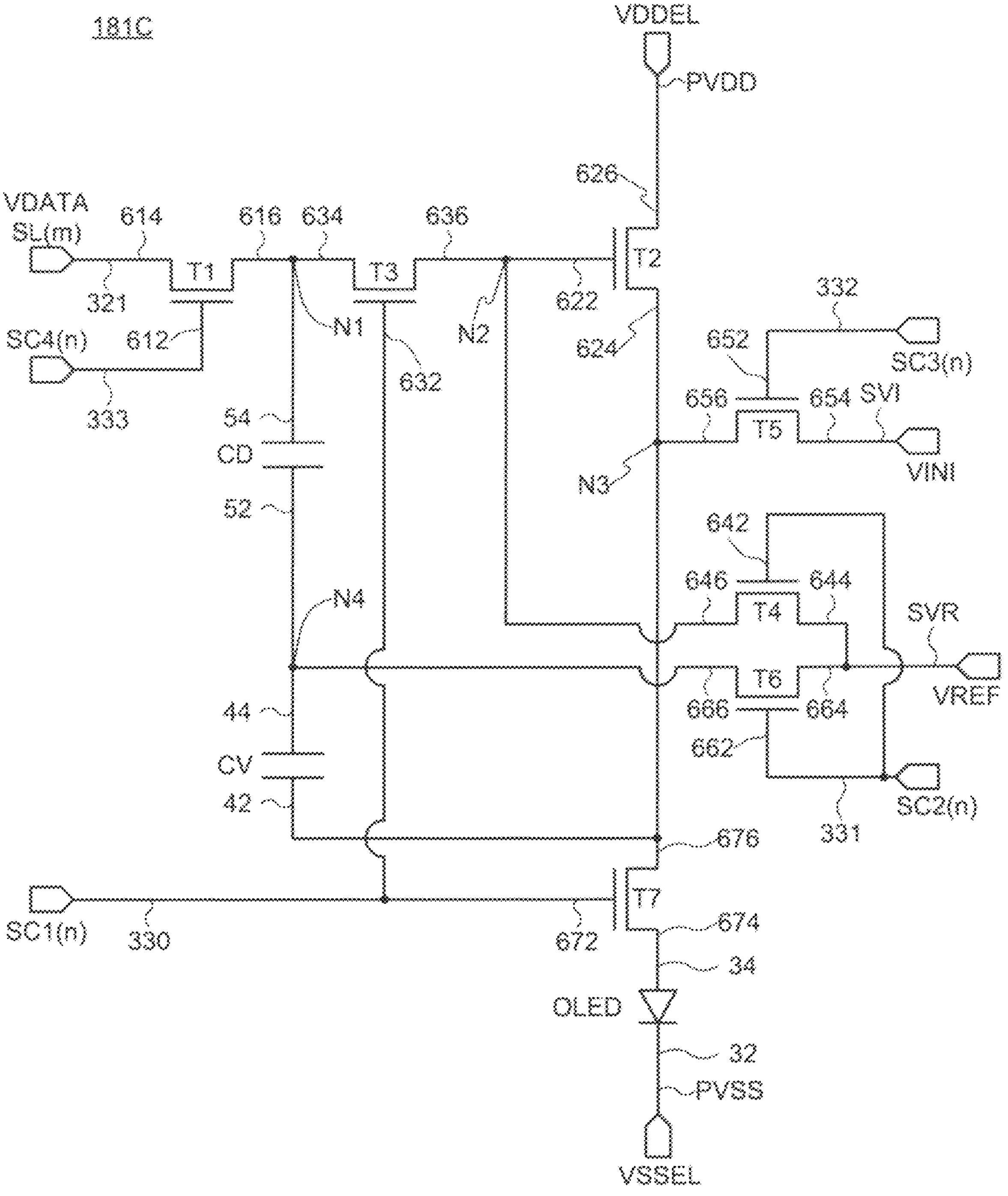
FIG. 26 is a circuit diagram showing a configuration of the pixel circuit according to the fourth embodiment of the present invention.

Referring to FIG. 1, FIG. 4, FIG. 25, and FIG. 26, an overview of a display device according to a fourth embodiment will be described. FIG. 25 is a schematic diagram showing an input signal to a pixel 180C (pixel circuit 181C) according to a fourth embodiment, and FIG. 26 is a circuit diagram showing a configuration of the pixel circuit 181C.

The display device according to the fourth embodiment includes the pixel 180C and the pixel circuit 181C. Configurations of the pixel 1800 and the pixel circuit 181C differ from the configuration of the pixel 180A and the pixel circuit 181A of the display device according to the second embodiment. Specifically, the display device according to the fourth embodiment has a configuration and a function in which a configuration related to the eighth transistor T8 and the reset voltage power supply line SVRE to which the reset voltage VRES is supplied is removed from the configuration of the pixel 180A and the pixel circuit 181A. Other configurations and functions are the same as those of the display device according to the second embodiment. In describing the configuration and function of the fourth embodiment, the same configuration and function as those of the display device 10 according to the first embodiment, the display device according to the second embodiment, and the display device according to the third embodiment will be described as necessary. Configurations that are the same as or similar to those in FIG. 1 to FIG. 24 will be described as necessary.

[4-1. Configuration of Pixel 180C]

Referring to FIG. 25 and FIG. 26, an overview of the pixel 180C and the pixel circuit 181C will be described.

As described above, the pixel circuit 181C has a configuration in which a configuration related to the reset voltage power supply line SVRE to which the eighth transistor T8 and the reset voltage VRES are supplied is removed from the pixel circuit 181A. Therefore, the pixel circuit 181C does not include the eighth transistor T8 and the reset voltage VRES, the seventh transistor T7 and the light-emitting device OLED are not electrically connected to the eighth transistor T8, and the first electrode 674 of the seventh transistor T7 is electrically connected to the second electrode 34 of the light-emitting device OLED.

The configuration and the function of the pixel circuit 181C other than the configuration and the function described in "4-1. Configuration of Pixel 180C" are the same as those of the pixel circuit 181A.

[4-2. Driving Method for Pixel Circuit 181C]

A method for driving the display device according to the fourth embodiment will be described. A driving method for the pixel circuit 181C does not include the configuration and the function related to the operation of the eighth transistor T8 as compared with the configuration described in "2-2. Driving Method for Pixel Circuit 181A".

Configurations and functions other than those related to the operation of the eighth transistor T8 in the driving method for the pixel circuit 181C are the same as those described in "2-2. Driving Method for Pixel Circuit 181A".

The driving method for the pixel circuit 181C including the configuration described above is a driving method capable of speeding up writing speed of data to the first node N1 as in "1-5-1. First Example of Driving Method for Display Device 10" to "1-5-4. Fourth Example of Driving Method for Display Device 10", and is a driving method capable of executing the period PWR in parallel with the period PIN and the period PVH within the period PIN and the period PVH, and is a driving method having a higher degree of flexibility in the period PWR and higher versatility.

5. Fifth Embodiment

Figure 27:
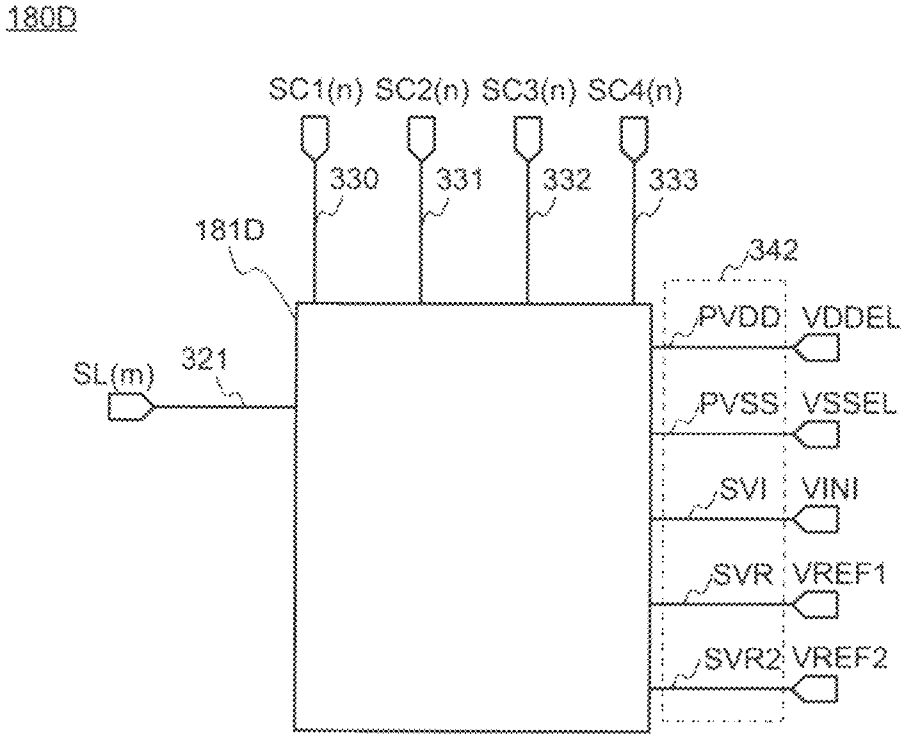
FIG. 27 is a schematic diagram showing an input signal to a pixel circuit according to a fifth embodiment of the present invention.
Figure 28:
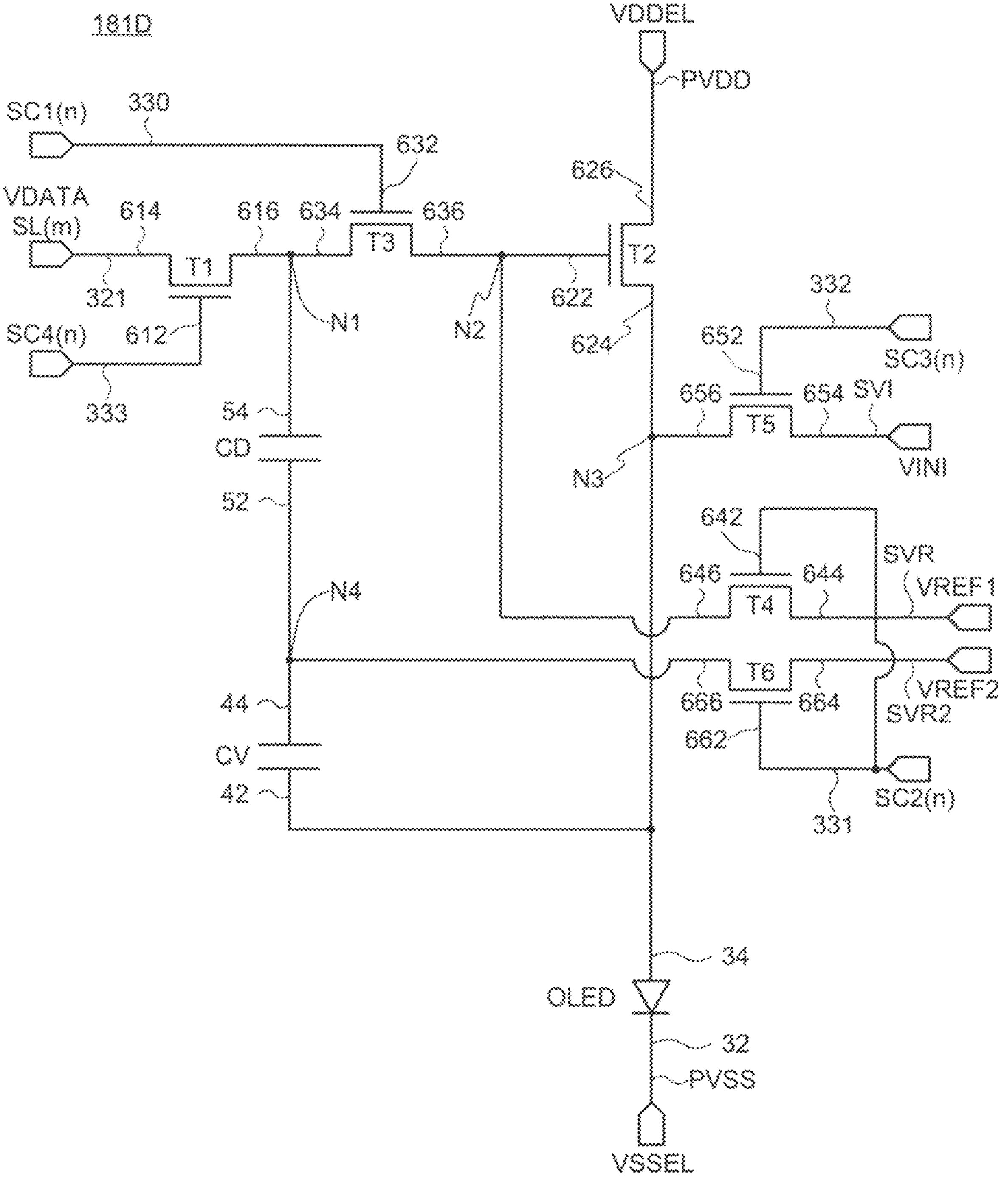
FIG. 28 is a circuit diagram showing a configuration of the pixel circuit according to the fifth embodiment of the present invention.

Referring to FIG. 1, FIG. 4, FIG. 27, and FIG. 28, an overview of a display device according to a fifth embodiment will be described. FIG. 27 is a schematic diagram showing an input signal to a pixel 180D (pixel circuit 181D) according to the fifth embodiment, and FIG. 28 is a circuit diagram showing a configuration of the pixel circuit 181D.

The display device according to the fifth embodiment includes the pixel 180D and the pixel circuit 181D. Configurations of the pixel 180D and the pixel circuit 181D differ from the configuration of the pixel 180 and the pixel circuit 181 of the display device 10 according to the first embodiment. Specifically, the display device according to the fifth embodiment has a configuration and a function in which, in the configuration of the pixel 180 and the pixel circuit 181, the reference voltage power supply line SVR is separated into a first reference voltage power supply line SVR1 to which a first reference voltage VREF1 is supplied and a reference voltage power supply line SVR2 to which a second reference voltage VREF2 is supplied. Other configurations and functions are the same as those of the display device 10 according to the first embodiment. In describing the configuration and function of the fifth embodiment, the same configuration and function as those of the display device 10 according to the first embodiment will be described as necessary. Configurations that are the same as or similar to those in FIG. 1 to FIG. 26 will be described as necessary.

[5-1. Configuration of Pixel 180D]

Referring to FIG. 27 and FIG. 28, an overview of the pixel 180D and the pixel circuit 181D will be described.

The pixel circuit 181D is connected to the first reference voltage power supply line SVR1 and the second reference voltage power supply line SVR2.

The first reference voltage VREF1 is supplied to the first reference voltage power supply line SVR1. The second reference voltage VREF2 is supplied to the second reference voltage power supply line SVR2. For example, each of the first reference voltage power supply line SVR1 and the second reference voltage power supply line SVR2 is electrically connected to the connection wiring 342 that differs from the initialization voltage power supply line SVI, the drive power supply line PVDD, and the reference voltage line PVSS among the connection wirings 342 (see FIG. 1). Further, each of the first reference voltage power supply line SVR1 and the second reference voltage power supply line SVR2 may be one of the connection wirings 342. For example, the first reference voltage VREF1 may be supplied from an external device to the IC chip 110 (see FIG. 1) as in the initialization voltage VINI, and may be supplied from the IC chip 110 to a plurality of pixels 180D via the connection wiring 342 and the first reference voltage power supply line SVR. The second reference voltage VREF2 may be supplied from an external device to the IC chip 110 (see FIG. 1) as in the initialization voltage VINI, and may be supplied from the IC chip 110 to the plurality of pixels 180D via the connection wiring 342 and the second reference voltage power supply line SVR2. In addition, although not shown, each of the first reference voltage VREF1 and the second reference voltage VREF2 may be connected to the first reference voltage power supply line SVR and the second reference voltage power supply line SVR2 from an external device via the FPC 200, the terminal portion 150, and the connection wiring 341, without passing through the IC chip 110 and the connection wiring 342, and may be supplied to the plurality of pixels 180D, as in the initialization voltage VINI.

The fourth transistor T4 has a function of conducting the second node N2 and the first reference voltage power supply line SVR1. The first electrode 644 of the fourth transistor T4 is electrically connected to the first reference voltage power supply line SVR1. The rest of the configuration of the fourth transistor T4 is the same as the configuration of the pixel 180 and the pixel circuit 181.

The sixth transistor T6 has a function of conducting the fourth node N4 and the second reference voltage power supply line SVR2. The first electrode 664 of the sixth transistor T6 is electrically connected to the second reference voltage power supply line SVR2. The rest of the configuration of the sixth transistor T6 is the same as the configuration of the pixel 180 and the pixel circuit 181.

The configuration and the function of the pixel circuit 181D other than the configuration and the function described in "5-1. Configuration of Pixel 180D" are the same as those of the pixel circuit 181.

[5-2. Driving Method for Pixel Circuit 181D]

A method for driving the display device according to the fifth embodiment will be described. A method for driving the pixel circuit 181D includes the following (1) to (4) as compared with the configurations described in "1-5-1. First Example of Driving Method for Display Device 10" to "1-5-4. Fourth Example of Driving Method for Display Device 10".

(1) In the case where HI is supplied to the second scan signal SC2(*n*), the fourth transistor T4 is in the ON state, the second node N2 is electrically connected to the first reference voltage power supply line SVR, and the voltage supplied to the second node N2 is the first reference voltage VREF1. For example, the first reference voltage VREF1 is 1.4 V, similar to the reference voltage VREF.

(2) In the case where LO is supplied to the second scan signal SC2(*n*), the fourth transistor T4 is in the OFF state, the second node N2 is not conducting with the first reference voltage power supply line SVR, and the second node N2 is not supplied with the first reference voltage VREF1.

(3) In the case where HI is supplied to the second scan signal SC2(*n*), the sixth transistor T6 is in the ON state, the fourth node N4 is electrically connected to the second reference voltage power supply line SVR2, and the voltage supplied to the fourth node N4 becomes the second reference voltage VREF2. For example, the second reference voltage VREF2 is 1.9 V.

(4) In the case where LO is supplied to the second scan signal SC2(*n*), the sixth transistor T6 is in the OFF state, the fourth node N4 is not conducting with the second reference voltage power supply line SVR2, and the fourth node N4 is not supplied with the second reference voltage VREF2.

Configurations and functions other than those related to (1) to (4) described above in the driving method for the pixel circuit 181D are the same as those described in "1-5-1. First Example of Driving Method for Display Device 10" to "1-5-4. Fourth Example of Driving Method for Display Device 10".

The driving method for the pixel circuit 181D including the configuration described above is a driving method capable of speeding up writing speed of data to the first node N1 as in "1-5-1. First Example of Driving Method for Display Device 10" to "1-5-4. Fourth Example of Driving Method for Display Device 10", and is a driving method capable of executing the period PWR in parallel with the period PIN and the period PVH within the period PIN and the period PVH, and is a driving method that has a higher degree of flexibility in the period PWR and higher versatility.

Further, the second reference voltage VREF2 is a voltage (intermediate potential) approximately intermediate between the voltage supplied to the first node N1 and the voltage supplied to the fourth node N4. Consequently, the potential difference between the voltage supplied to the first electrode 52 of the capacitive element CD and the voltage supplied to the second electrode 54 is the same as the potential difference between the voltage supplied to the first electrode 42 of the capacitive element CV and the voltage supplied to the second electrode 44. Therefore, the potential difference of the capacitive element CD of the display device according to the fifth embodiment can be suppressed from significantly deviating from the potential difference of the capacitive element CV. That is, the display device according to the fifth embodiment can reduce the loads applied to the capacitive element CD and the capacitive element CV by dispersing the voltages applied to the capacitive element CD and the capacitive element CV.

6. Sixth Embodiment

Figure 29:
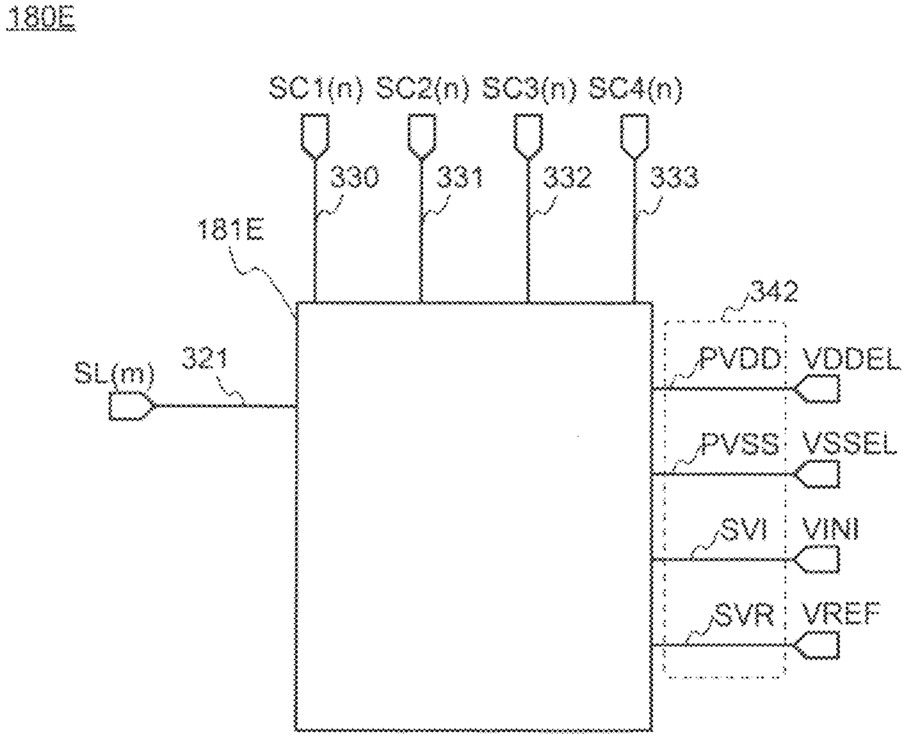
FIG. 29 is a schematic diagram showing an input signal to a pixel circuit according to a sixth embodiment of the present invention.
Figure 30:
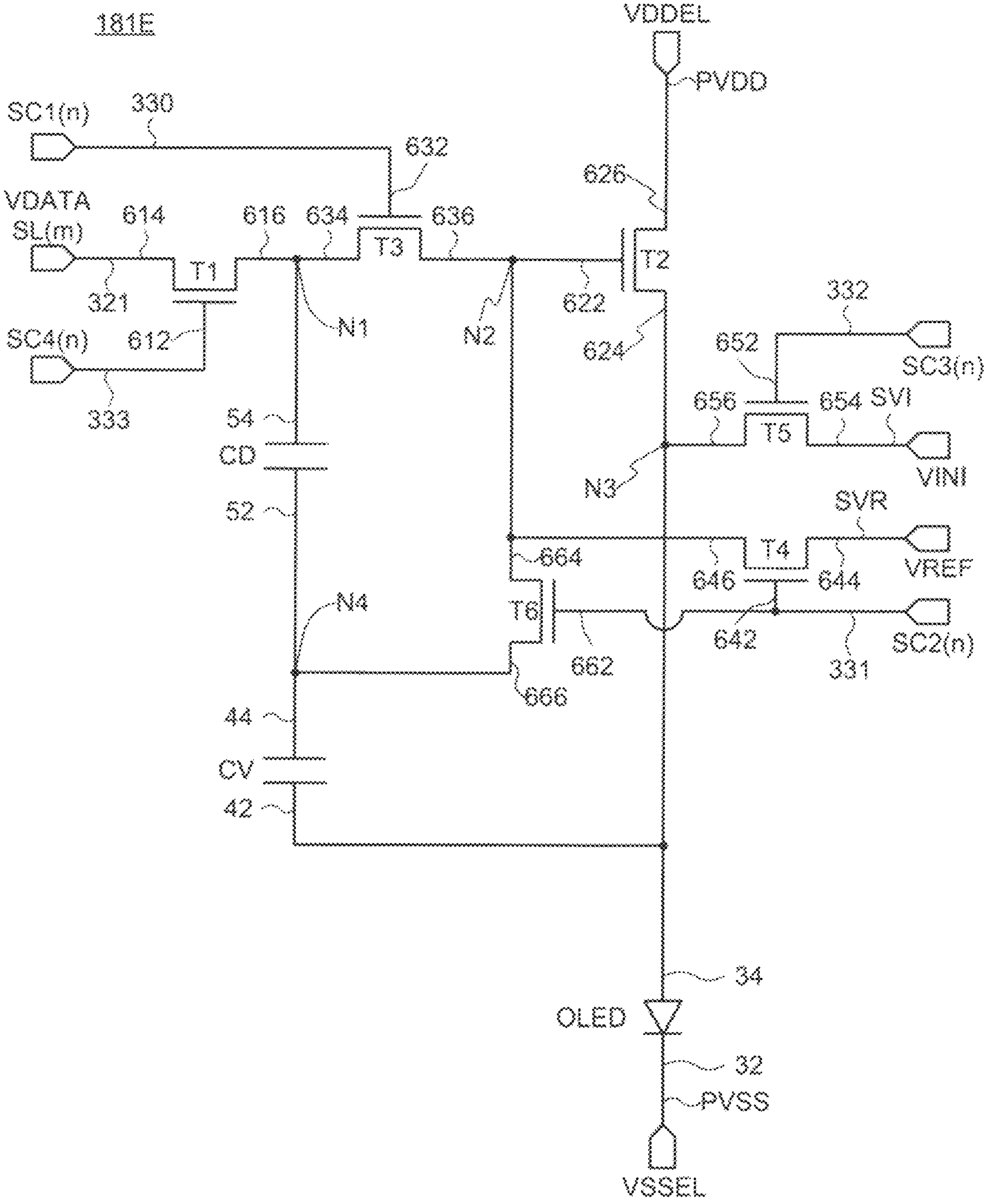
FIG. 30 is a circuit diagram showing a configuration of the pixel circuit according to the sixth embodiment of the present invention.

With reference to FIG. 1, FIG. 4, FIG. 29, and FIG. 30, an overview of a display device according to a sixth embodiment will be described. FIG. 29 is a schematic diagram showing an input signal to a pixel 180E (pixel circuit 181E) according to the sixth embodiment, and FIG. 30 is a circuit diagram showing a configuration of the pixel circuit 181E.

The display device according to the sixth embodiment includes the pixel 180E and the pixel circuit 181E. Configurations of the pixel 180E and the pixel circuit 181E differ from the configuration of the pixel 180 and the pixel circuit 181 of the display device 10 according to the first embodiment. Specifically, the display device according to the sixth embodiment has a configuration and a function in which the first electrode 664 of the sixth transistor T6 is changed in the configuration of the pixel 180 and the pixel circuit 181. Other configurations and functions are the same as those of the display device 10 according to the first embodiment. In describing the configuration and function of the sixth embodiment, the same configuration and function as those of the display device 10 according to the first embodiment will be described as necessary. Configurations that are the same as or similar to those in FIG. 1 to FIG. 26 will be described as necessary.

[6-1. Configuration of Pixel 180E]

Referring to FIG. 29 and FIG. 30, an overview of the pixel 180E and the pixel circuit 181E will be described.

As described above, the pixel circuit 181E has a configuration in which the connection of the first electrode 664 of the sixth transistor T6 in the configurations of the pixel 180 and the pixel circuit 181 is changed. Specifically, the first electrode 664 of the sixth transistor T6 of the pixel circuit 181E is disconnected from the reference voltage power supply line SVR and electrically connected to the second electrode 646 and the second node N2 of the fourth transistor T4. The sixth transistor T6 has a function of conducting the fourth node N4 and the second node N2 in accordance with the second scan signal SC2(*n*). That is, the fourth transistor T4 supplies the reference voltage VREF to the second node N2 and supplies the reference voltage VREF to the fourth node N4 through the sixth transistor T6.

The configuration and the function of the pixel circuit 181E other than the configuration and the function described in "6-1. Configuration of Pixel 180E" are the same as those of the pixel circuit 181.

[6-2. Driving Method for Pixel Circuit 181E]

A method for driving the display device according to the sixth embodiment will be described. A method of driving the pixel circuit 181E includes the following (1) and (2) as compared with the configurations described in "1-5-1. First Example of Driving Method for Display Device 10" to "1-5-4. Fourth Example of Driving Method for Display Device 10".

(1) In the case where the second scan signal SC2(*n*) is supplied with HI, the fourth transistor T4 and the sixth transistor T6 are in the ON state, the second node N2 is electrically connected to the reference voltage power supply line SVR, the voltage supplied to the second node N2 is the reference voltage VREF, the fourth node N4 is electrically connected to the reference voltage power supply line SVR, and the voltage supplied to the fourth node N4 is the reference voltage VREF.

(2) In the case where the second scan signal SC2(*n*) is supplied with LO, the fourth transistor T4 and the sixth transistor T6 are in the OFF state, the second node N2 is not conductive to the reference voltage power supply line SVR, the reference voltage VREF is not supplied to the second node N2, the fourth node N4 is not conductive to the reference voltage power supply line SVR, and the reference voltage VREF is not supplied to the fourth node N4.

Configurations and functions other than those related to (1) and (2) described above in the driving method for the pixel circuit 181E are the same as those described in "1-5-1. First Example of Driving Method for Display Device 10" to "1-5-4. Fourth Example of Driving Method for Display Device 10".

The driving method for the pixel circuit 181E including the configuration described above is a driving method capable of speeding up writing speed of data to the first node N1 as in "1-5-1. First Example of Driving Method for Display Device 10" to "1-5-4. Fourth Example of Driving Method for Display Device 10", and is a driving method capable of executing the period PWR in parallel with the period PIN and the period PVH within the period PIN and the period PVH, and is a driving method having a higher degree of flexibility in the period PWR and higher versatility.

In addition, in the pixel circuit 181E, the sixth transistor T6 is electrically connected to the second node N2. Consequently, parasitic capacitance of the second node N2 in the pixel circuit 181E is larger than the parasitic capacitance of the second node N2 in the pixel circuit 181. Therefore, in the pixel circuit 181E, in the case where HI is supplied from the state in which LO is supplied to the first scan signal SC1(*n*), an excessive increase in the voltage supplied to the second node N2 can be suppressed.

7. Seventh Embodiment

[7-1. Overview of Display Device 20]

Figure 31:
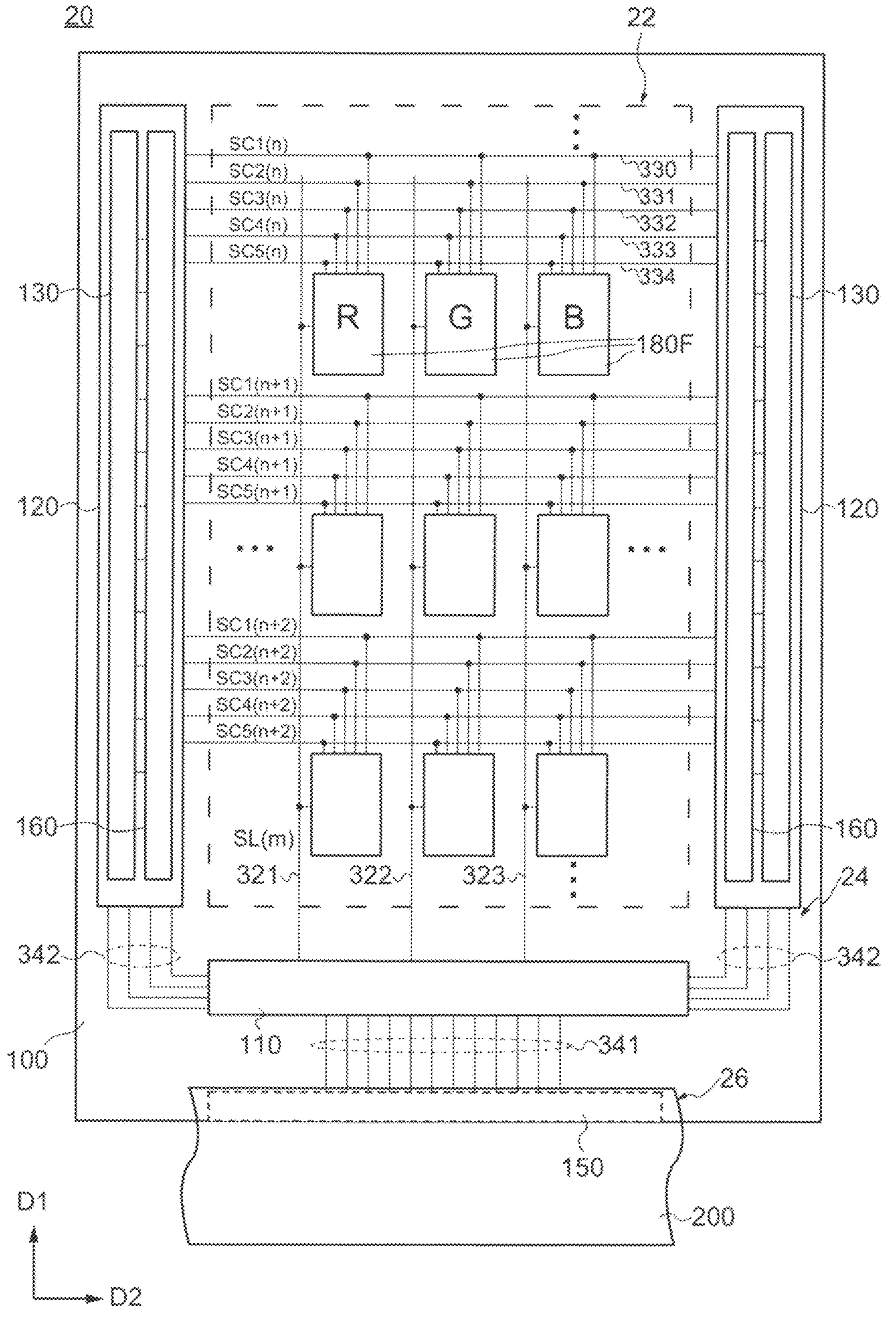
FIG. 31 is a schematic diagram showing a configuration of a display device according to a seventh embodiment of the present invention.

An overview of a display device 20 according to the seventh embodiment will be described with reference to FIG. 31. FIG. 31 is a schematic diagram showing a configuration of the display device 20. The configuration of the display device 20 shown in FIG. 31 is an example, and the configuration of the display device 20 is not limited to the configuration shown in FIG. 31.

The display device 20 has a configuration in which a scan signal line 334 to which a fifth scan signal SC5(*n*) is supplied and the reset voltage power supply line SVRE to which the reset voltage VRES is supplied are added to the configuration of the display device 10 according to the first embodiment, and the pixel 180 (pixel circuit 181) in the configuration of the display device 10 is replaced with a pixel 180F (pixel circuit 181F). The configuration of the pixel circuit 181F differs from the configuration of the pixel circuit 181. Other configurations and functions of the display device 20 are the same as those of the display device 10 according to the first embodiment. In describing the configuration and function of the seventh embodiment, the same configuration and function as those of the display device 10 according to the first embodiment will be described as necessary. Configurations that are the same as or similar to those in FIG. 1 to FIG. 30 will be described as necessary.

The fifth scan signal SC5(*n*) is one scan signal having a different timing output by the scan driver circuit 160, similar to the first scan signal SC1(*n*), the second scan signal SC2(*n*), the third scan signal SC3(*n*), and the fourth scan signal SC4(*n*). The scan signal line 334 to which the fifth scan signal SC5(*n*) is supplied is electrically connected to the control circuit 120 (scan driver circuit 160) and the pixel circuits 181F.

[7-2. Configuration of Pixel 180F]

Figure 33:
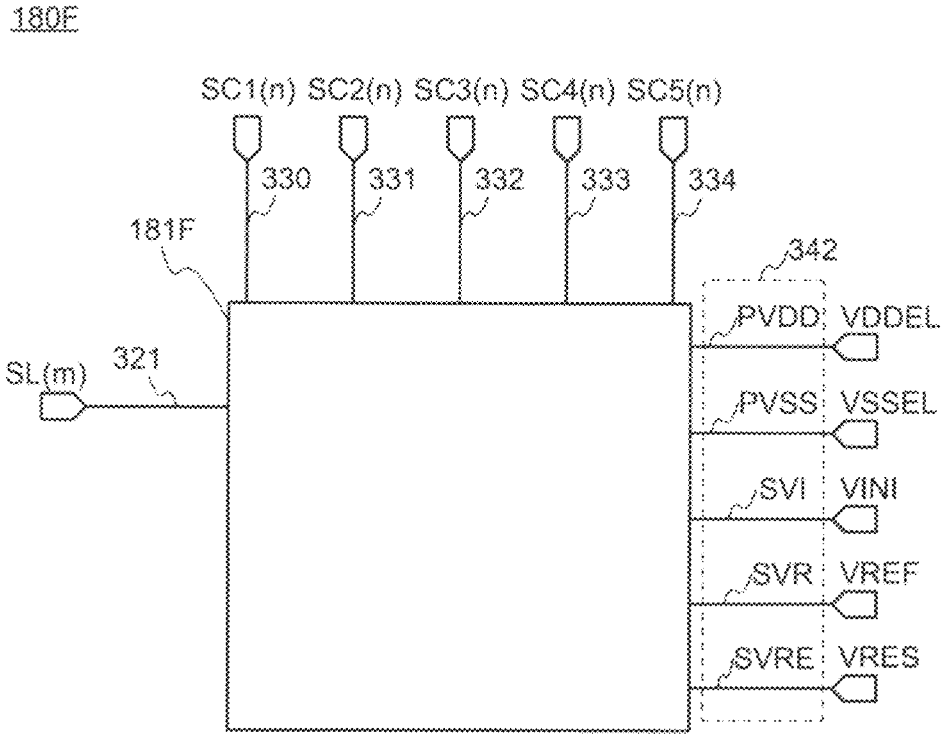
FIG. 33 is a schematic diagram showing an input signal to a pixel circuit according to the seventh embodiment of the present invention.
Figure 34:
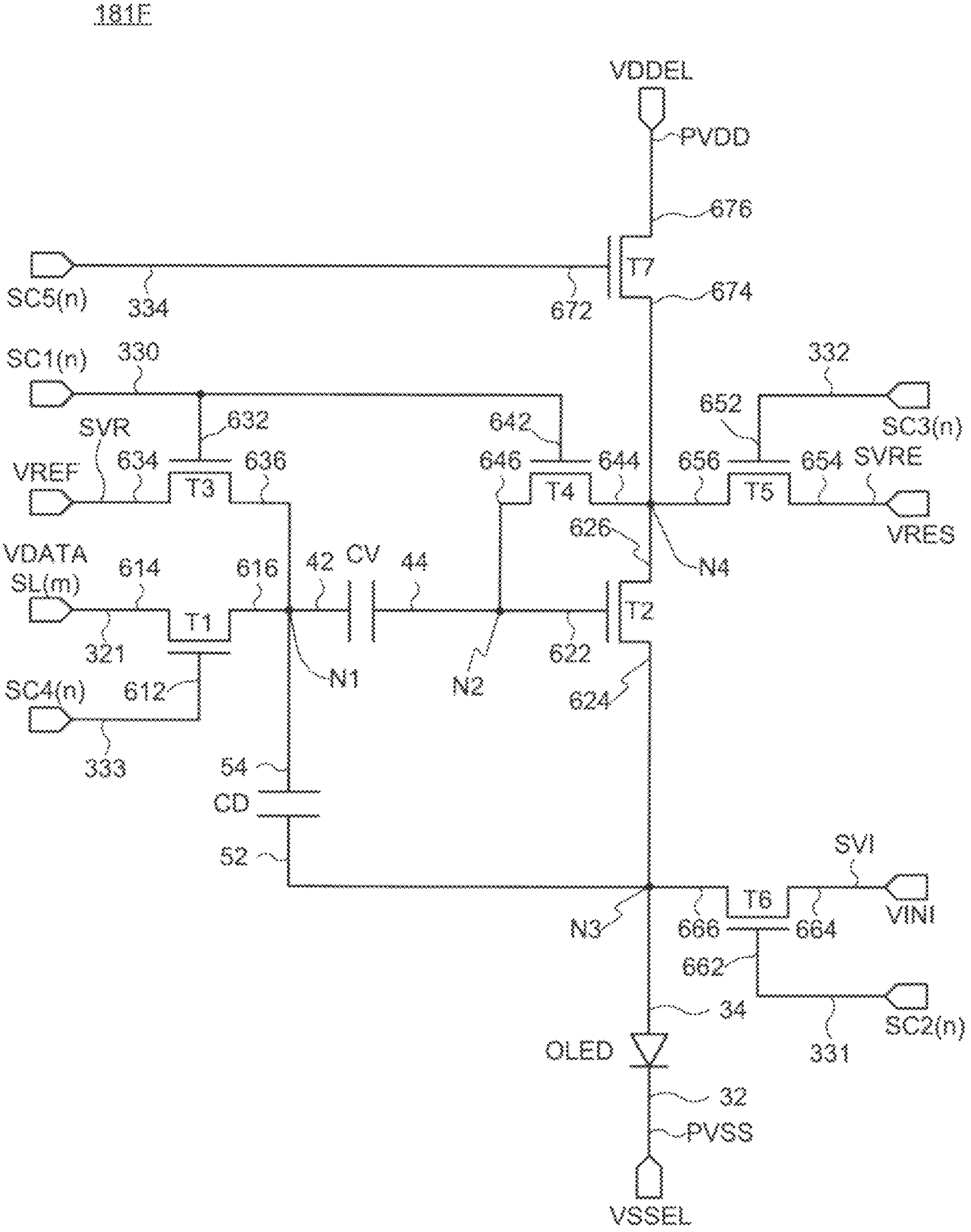
FIG. 34 is a circuit diagram showing a configuration of the pixel circuit according to the seventh embodiment of the present invention.

Referring to FIG. 31, FIG. 33, and FIG. 34, the overview of the pixel 180F and the pixel circuit 181F will be described. FIG. 33 is a schematic diagram showing an input signal to the pixel circuit 181F included in the pixel 180F. FIG. 34 is a circuit diagram showing a configuration of the pixel circuit 181F. FIG. 33 and FIG. 34 exemplarily show the configuration of the pixel circuit 181F of the pixel 180F shown in FIG. 31. The configurations of the pixel 180F and the pixel circuit 181F are not limited to the configuration shown in FIG. 31, FIG. 33, and FIG. 34. Configurations that are the same as or similar to those in FIG. 31 will be described as necessary.

The pixel circuit 181F is the circuit for driving the pixel 180F. As described above, the pixel circuit 181F includes the scan signal line 334 to which the fifth scan signal SC5(*n*) is supplied, the reset voltage power supply line SVRE to which the reset voltage VRES is supplied, and a circuit configuration that differs from the pixel circuit 181. The rest of the configuration and function of the pixel circuit 181F are the same as those of the pixel circuit 181.

For example, the reset voltage VRES may be supplied from an external device to the IC chip 110 as well as the initialization voltage VINI, and may be supplied from the IC chip 110 to a plurality of pixels 180F via the connection wiring 342 and the reset voltage power supply line SVRE. In addition, although not shown, the reset voltage VRES may be connected to the reset voltage power supply line SVRE from an external device through the FPC 200, the terminal portion 150, and the connection wiring 341 without passing through the IC chip 110 and the connection wiring 342, and may be supplied to the plurality of pixels 180F, similar to the initialization voltage VINI.

As shown in FIG. 34, the pixel circuit 181F includes the first transistor T1, the second transistor T2, the third transistor T3, the fourth transistor T4, the fifth transistor T5, the sixth transistor T6, the seventh transistor T7, the capacitive element CD, the capacitive element CV, and the light-emitting device OLED. Each of these transistors includes a gate electrode and a pair of electrodes (a source electrode and a drain electrode) including a first electrode and a second electrode. Each of the capacitive element CD, the capacitive element CV, and the light-emitting device OLED has a pair of electrodes including a first electrode and a second electrode.

For example, the first transistor T1 is a selection transistor. The first transistor T1 has a function of supplying the image data signal SL(m) to the first node N1.

For example, the second transistor T2 is a driving transistor. A gate voltage obtained by correcting the threshold voltage VTH based on the reset voltage VRES, the reference voltage VREF, and the initialization voltage VINI is applied between the gate electrode 622 and the first electrode (source) 624 of the second transistor T2. Further, the second transistor T2 controls an amount of current flowing from the driving power supply line PVDD to the light emitting device OLED based on the gate voltage with threshold voltage VTH variation corrected (voltage between the gate electrode 622 and the first electrode (source) 624) and the input image data signal SL(m). That is, the second transistor T2 has a function of causing the light-emitting device OLED to emit light by supplying the drive voltage VDDEL to the light-emitting device OLED and supplying a current.

The third transistor T3 has a function of conducting the first node N1 and the reference voltage power supply line SVR to provide the reference voltage VREF to the first node N1.

The fourth transistor T4 has a function of conducting the second node N2 and the fourth node N4 to supply the reset voltage VRES supplied to the fourth node N4 to the second node N2, and resetting the second node N2. In addition, the reset may be referred to as initialization.

The fifth transistor T5 has a function of conducting the fourth node N4 and the reset voltage power supply line SVRE to supply the reset voltage VRES to the fourth node N4, and resetting the fourth node N4.

The sixth transistor T6 has a function of conducting the third node N3 and the initialization voltage power supply line SVI to supply the initialization voltage VINI to the third node N3 and initializing the third node N3.

The seventh transistor T7 has a function of conducting the fourth node N4 and the drive voltage power supply line PVDD and supplying the drive voltage VDDEL to the fourth node N4.

As will be described later, the capacitive element CV has a function of holding (storing) charges corresponding to the threshold voltage VTH of the second transistor T2.

The capacitive element CD has a function of holding (storing) charges corresponding to a data voltage (voltage equal to or higher than the voltage VSIGL (see FIG. 35) and equal to or lower than the voltage VSIGH (see FIG. 35)) included in the image data signal SL(m) supplied to the first node N1.

The light-emitting device OLED has a diode characteristic and has a function of emitting light based on a current (that is, the drain current Ion of the second transistor T2) flowing through the light-emitting device OLED.

The first transistor T1 includes the gate electrode 612, the first electrode 614, and the second electrode 616. The gate electrode 612 is electrically connected to the scan signal line 333. The first electrode 614 is electrically connected to the image data signal line 321. The second electrode 616 is electrically connected to the first node N1, the second electrode 636 of the third transistor T3, the first electrode 42 of the capacitive element CV, and the second electrode 54 of the capacitive element CD. The fourth scan signal SC4(*n*) is supplied to the scan signal line 333. Similar to the first transistor T1 in the display device 10 according to the first embodiment, the switching of the first transistor T1 is controlled by using the fourth scan signal SC4(*n*), and the conduction state (ON state) and the non-conduction state (OFF state) are controlled.

The second transistor T2 includes the gate electrode 622, the first electrode 624, and the second electrode 626. The gate electrode 622 is electrically connected to the second node N2, the second electrode 44 of the capacitive element CV, and the second electrode 646 of the fourth transistor T4. The first electrode 624 is electrically connected to the third node N3, the second electrode 666 of the sixth transistor T6, and the second electrode 34 of the light emitting device OLED. The second electrode 626 is electrically connected to the fourth node N4, the first electrode 644 of the fourth transistor T4, the second electrode 656 of the fifth transistor T5, and the first electrode 674 of the seventh transistor T7. The threshold voltage of the second transistor T2 is the threshold voltage VTH. In the second transistor T2, the conduction state (ON state) and the non-conduction state (OFF state) are controlled in accordance with a potential difference between a voltage supplied to the gate electrode 622 (second node N2) and a voltage supplied to the first electrode 624 (third node N3) and a potential difference between the second electrode 626 (fourth node N4) and the first electrode 624. For example, the second transistor T2 whose potential difference between the voltage supplied to the second node N2 and the voltage supplied to the third node N3 is smaller than the threshold voltage VTH becomes non-conductive. For example, in the case where the potential difference between the voltage supplied to the second node N2 and the voltage supplied to the third node N3 is greater than or equal to the threshold voltage VTH, and the potential difference between the voltage supplied to the fourth node N4 and the voltage supplied to the third node N3 is greater than or equal to 0 V, the second transistor T2 becomes conductive.

The third transistor T3 includes the gate electrode 632, the first electrode 634, and the second electrode 636. The gate electrode 632 is electrically connected to the scan signal line 330. The first electrode 634 is electrically connected to the reference voltage power supply line SVR. The first scan signal SC1(*n*) is supplied to the scan signal line 330. In the third transistor T3, as in the third transistor T3 of the display device 10 according to the first embodiment, switching is controlled by using the first scan signal SC1(*n*), and the conduction state (ON state) and the non-conduction state (OFF state) are controlled.

The fourth transistor T4 includes the gate electrode 642, the first electrode 644, and the second electrode 646. The gate electrode 642 is electrically connected to the scan signal line 330. The fourth transistor T4 is switched using the first scan signal SC1(*n*). In other words, the fourth transistor T4 is controlled to be in the conductive state (ON state) or the non-conductive state (OFF state) by the first scan signal SC1(*n*). In the case where the signal supplied to the first scan signal SC1(*n*) is LO, the fourth transistor T4 becomes non-conductive, and in the case where the signal supplied to the scan signal line 330 is HI, the fourth transistor T4 becomes conductive.

The fifth transistor T5 includes the gate electrode 652, the first electrode 654, and the second electrode 656. The gate electrode 652 is electrically connected to the scan signal line 332. The first electrode 654 is electrically connected to the reset voltage power supply line SVRE. The third scan signal SC3(*n*) is supplied to the scan signal line 332. The fifth transistor T5 is switched using the third scan signal SC3(*n*).

In other words, in the fifth transistor T5, the conduction state (ON state) and the non-conduction state (OFF state) are controlled by the third scan signal SC3(*n*). In the case where the signal supplied to the third scan signal SC3(*n*) is LO, the fifth transistor T5 becomes non-conductive, and in the case where the signal supplied to the third scan signal SC3(*n*) is HI, the fifth transistor T5 becomes conductive.

The sixth transistor T6 includes the gate electrode 662, the first electrode 664, and the second electrode 666. The gate electrode 662 is electrically connected to the scan signal line 331. The first electrode 664 is electrically connected to the initialization voltage power supply line SVI. The second scan signal SC2(*n*) is supplied to the scan signal line 331. Similar to the sixth transistor T6 in the display device 10 according to the first embodiment, the switching of the sixth transistor T6 is controlled using the second scan signal SC2(*n*).

The seventh transistor T7 includes the gate electrode 672, the first electrode 674, and the second electrode 676. The gate electrode 672 is electrically connected to the scan signal line 334. The second electrode 676 is electrically connected to the drive voltage power supply line PVDD. The fifth scan signal SC5(*n*) is supplied to the scan signal line 334. The seventh transistor T7 is switched using the fifth scan signal SC5(*n*). In other words, in the seventh transistor T7, the conduction state (ON state) and the non-conduction state (OFF state) are controlled by the fifth scan signal SC5(*n*). In the case where the signal supplied to the fifth scan signal SC5(*n*) is LO, the seventh transistor T7 becomes non-conductive. In the case where the signal supplied to the fifth scan signal SC5(*n*) is HI, the seventh transistor T7 becomes conductive.

The first electrode 32 of the light emitting device OLED is electrically connected to the reference voltage line PVSS. The reference voltage VSSEL is supplied to the reference voltage line PVSS. The first electrode 32 of the light-emitting device OLED is, for example, a cathode electrode, and the second electrode 34 of the light-emitting device OLED is, for example, an anode electrode.

The configuration and the function of the pixel circuit 181F other than the configuration and the function described in "7-2. Configuration of Pixel 180F" are the same as those of the pixel circuit 181. For example, each transistor shown in FIG. 34 may be an n-channel type field effect transistor similar to the display device 10 according to the first embodiment, and may have a Group 14 element such as silicon or germanium, or an oxide exhibiting semiconductor characteristics in a channel region.

[7-3. Driving Method for Display Device 20]

Figure 32:
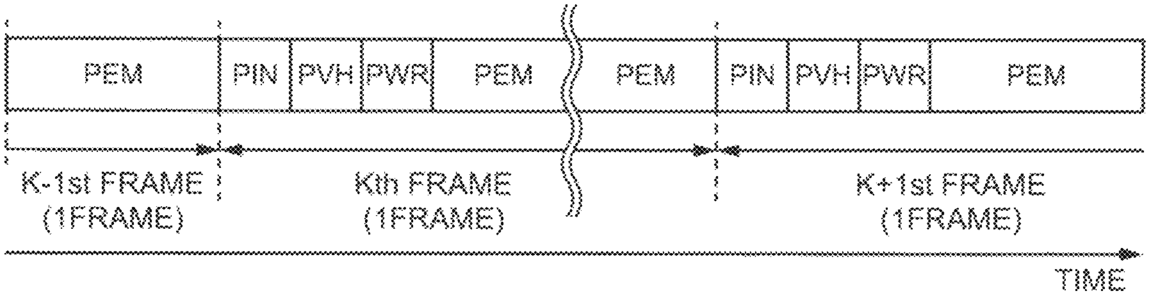
FIG. 32 is a timing chart of the display device according to the seventh embodiment of the present invention.
Figure 35:
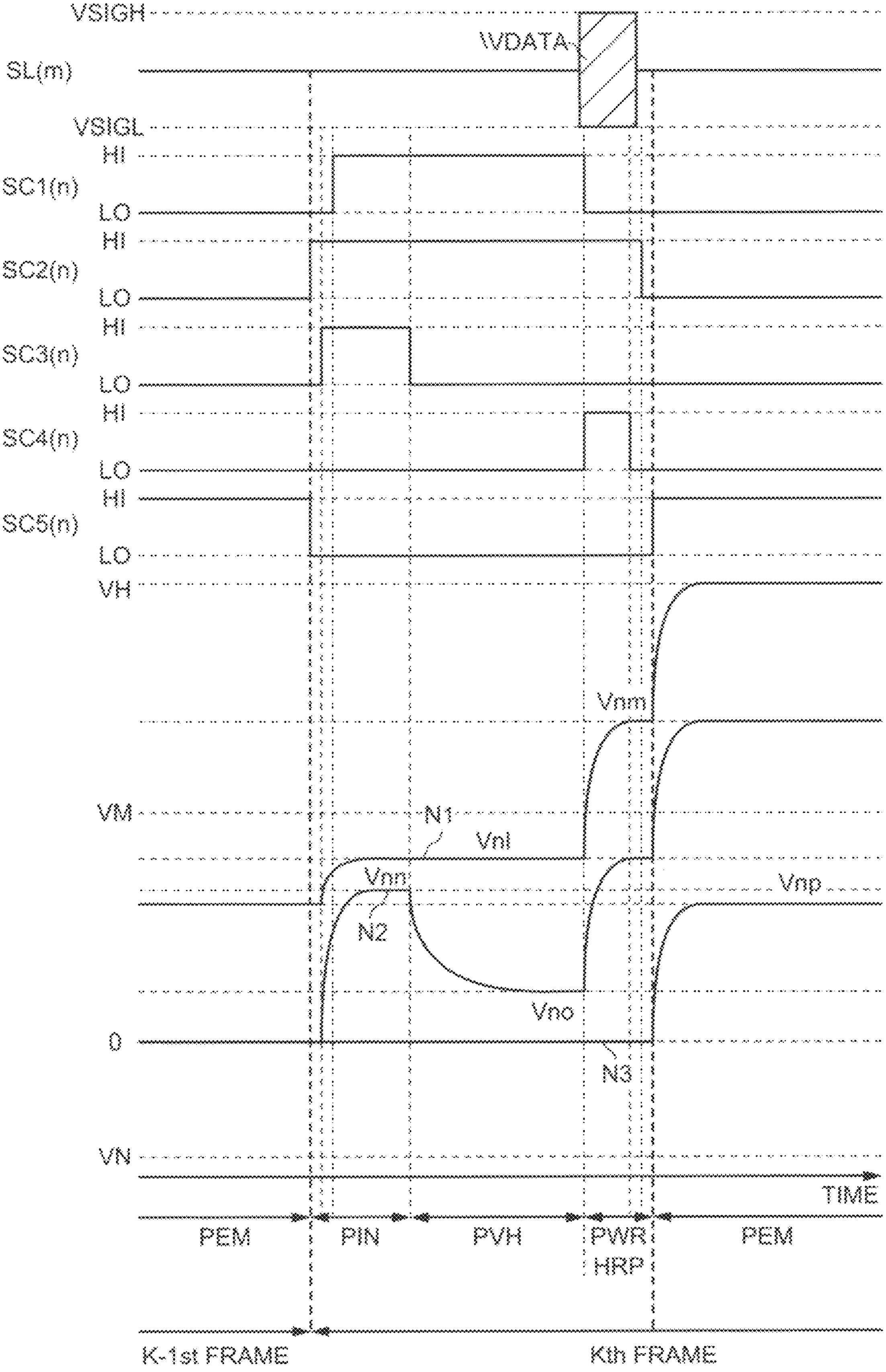
FIG. 35 is a timing chart of the display device according to the seventh embodiment of the present invention.
Figure 36:
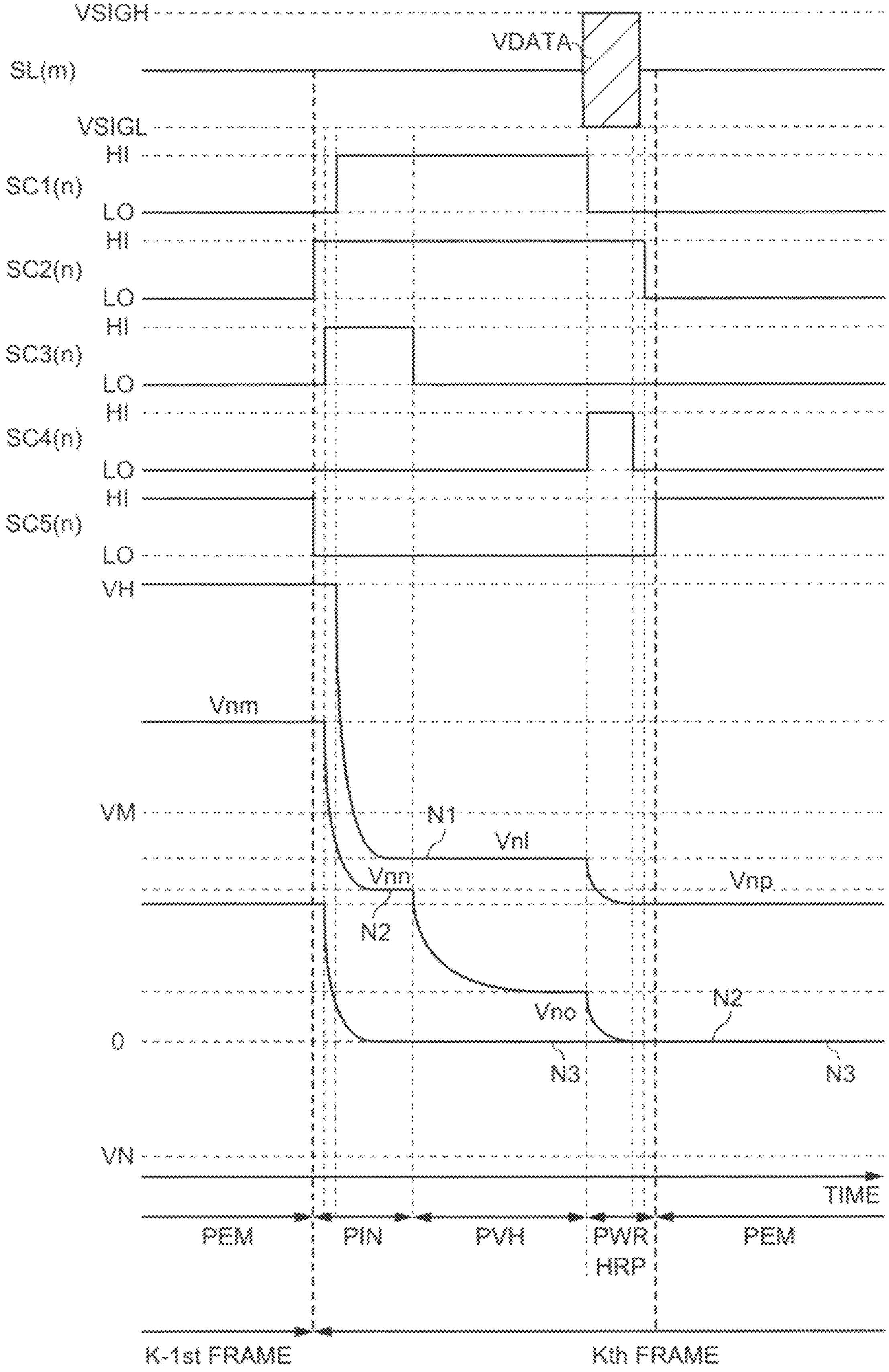
FIG. 36 is a timing chart of the display device according to the seventh embodiment of the present invention.

A method for driving the display device 20 will be described with reference to FIG. 32 to FIG. 36. FIG. 32, FIG. 35, and FIG. 36 are schematic diagrams showing timing charts of the display device 20. Configurations that are the same as or similar to those in FIG. 1 to FIG. 31, FIG. 33, and FIG. 34 will be described as necessary.

For example, the driving method for the display device 20 based on the timing chart shown in FIG. 32 includes executing the threshold acquisition and holding period PVH (period PVH) after executing the initialization period PIN (period PIN) as compared with the driving method for the display device 10 based on the timing chart shown in FIG. 4, and executing the threshold acquisition and holding period PVH, and then executing the write period PWR. The period PIN in the driving methods of the display device 20 is a period in which the first node N1, the second node N2, the third node N3, and the fourth node N4 are initialized. Other configurations and functions of the driving method for the display device 20 are the same as those of the driving method for the display device 10.

Next, specific methods of driving the pixel 180F of the display device 20 will be described.

The pixel 180F receives the first scan signal SC1(*n*), the second scan signal SC2(*n*), the third scan signal SC3(*n*), the fourth scan signal SC4(*n*), the fifth scan signal SC5(*n*), the image data signal SL(m) including the data signal VDATA, the reset voltage VRES, the initialization voltage VINI, and the reference voltage VREF. For example, the pixel 180F is selected according to timings of the first scan signal SC1(*n*), the second scan signal SC2(*n*), the third scan signal SC3(*n*), the fourth scan signal SC4(*n*), and the fifth scan signal SC5(*n*). The image data signal SL(m), the reset voltage VRES, the initialization voltage VINI, and the reference voltage VREF are input to the selected pixel 180F in accordance with the timings of the respective signals. A similar operation is performed on all the pixels 180F, and an image of the frame corresponding to 1FRAME is displayed in the display region 22 of the display device 20 based on the image data signal SL(m) input to all the pixels 180F.

For example, voltages (potentials) supplied to the respective signals and the respective nodes in the respective periods of the respective frames of the timing charts shown in FIG. 32, FIG. 35, and FIG. 36 are shown in Table 3.

TABLE 3

| | Setting Value [V] |
|---|---|
| VTH | 1 |
| VSIGL(black) | 3 |
| VSIGH(white) | 7 |
| HI | 12 |
| LO | −2 |
| VINI | 0 |
| VREF | 4 |
| VRES | 3.4 |
| VDDEL | 8 |
| VSSEL | 0 |

[7-3-1. First Example of Driving Method for Display Device 20]

Referring to FIG. 35 and Table 3, a first example of the driving method for the display device 20 will be described. The driving method shown in the first embodiment includes that the pixel 180F displays the white image based on the KthFRAME and the voltage VSIGH (7 V) included in the data signal VDATA after displaying the black image based on the voltage of the data signal VDATA in the frame (K−1stFRAME) immediately before the current frame (KthFRAME). In other words, the driving method shown in the first example includes displaying images of different colors in successive frames.

The image data signal SL(m) including the data signal VDATA is input to each pixel 180F in accordance with each period (the period PIN, the period PWR (horizontal period HRP), and the period PVH). The data signal VDATA is analog data including a voltage equal to or higher than the voltage VSIGL and equal to or lower than the voltage VSIGH. For example, in the respective period PWR, a voltage equal to or higher than the voltage VSIGL and equal to or lower than the voltage VSIGH is selected by using a selection signal (not shown), and is supplied to the image data signal SL(m). For example, in a period excluding the period PWR, the data signal VDATA is supplied with a voltage that is supplied to pixels other than the selected pixel 180F. As shown in Table 2, for example, the voltage VSIGL is 3 V, and the pixel 180F to which the voltage VSIGL is supplied is not emitted and becomes black. Further, for example, the voltage VSIGH is 7 V, and the pixel 180F to which the voltage VSIGH is supplied emits light and emits white color. For example, the voltage VH (HI) is 12 V, the voltage VL (LO) is −2 V, the reset voltage VRES is 3.4 V, the reference voltage VREF is 4 V, the initialization voltage VINI is 5 V, and the voltage VN is −5 V.

In the emission period PEM of the K−1stFRAME, the data signal VDATA is supplied with a voltage to be supplied to the pixels other than the selected pixel 180F, the first scan signal SC1(*n*), the second scan signal SC2(*n*), the third scan signal SC3(*n*), and the fourth scan signal SC4(*n*) are supplied with LO, and the fifth scan signal SC5(*n*) is supplied with HI. The transistors except the second transistor T2 and the seventh transistor T7 are in the OFF state, and the seventh transistor T7 is in the ON state. The voltage supplied to the first node N1 is the voltage Vnp (3 V) in black, the voltage supplied to the second node N2 and the voltage supplied to the third node N3 are 0 V, and the potential difference Vgs is 0 V. Therefore, the second transistor T2 is in the OFF state, and the current Ion does not flow from the drive power supply line PVDD to the light-emitting device OLED and the reference voltage line PVSS, and the light-emitting device OLED does not emit light.

In the period PIN of the KthFRAME following the emission period PEM of the K−1stFRAME, the image data signal SL(m) (data signal VDATA) is supplied with a voltage that is supplied to the pixels other than the selected pixel 180F. The second scan signal SC2(*n*) is supplied with LO from a state where HI is supplied, and the fifth scan signal SC5(*n*) is supplied with LO from a state where HI is supplied. In the case where the second scan signal SC2(*n*) is supplied with HI and the fifth scan signal SC5(*n*) is supplied with LO, the third scan signal SC3(*n*) is supplied with HI. In the case where the third scan signal SC3(*n*) is supplied with HI, the first scan signal SC1(*n*) is supplied with HI from the state where LO is supplied. The fourth scan signal SC4(*n*) is supplied with LO. Therefore, the seventh transistor T7 is turned from the ON state to the OFF state, the third transistor T3 to the sixth transistor T6 are turned from the OFF state to the ON state, and the first transistor T1 is maintained in the OFF state. The voltage supplied to the first node N1 rises from the voltage Vnp (3 V) to the voltage Vnl (reference voltage VREF, 4 V), the voltage supplied to the second node N2 rises from 0 V to the voltage Vnn (reset voltage VRES, 3.4 V), and the voltage supplied to the third node N3 maintains 0 V. Further, although not shown, the voltage supplied to the fourth node N4 rises toward the reset voltage VRES and becomes the reset voltage VRES. Although the second transistor T2 changes from the OFF state to the ON state in accordance with the potential difference Vgs, the voltage supplied to the third node N3 is the initialization voltage VINI (0 V), and the light-emitting device OLED does not emit light because the drain current Ion does not flow through the light-emitting device OLED.

As described above, in the period PIN, the first node N1 is initialized by the reference voltage VREF (4 V), the second node N2 and the fourth node N4 are reset (initialized) by the reset voltage VRES (3.4 V), and the third node N3 is initialized by the initialization voltage VINI (0 V).

In the period PVH following the period PIN, the image data signal SL(m) is supplied with a voltage that is supplied to the pixels other than the selected pixel 180F, the first scan signal SC1(*n*) and the second scan signal SC2(*n*) are maintained in a state where HI is supplied, and the fourth scan signal SC4(*n*) and the fifth scan signal SC5(*n*) are maintained in a state where LO is supplied. The third scan signal SC3(*n*) is supplied with LO from the state where HI is supplied. Therefore, the fifth transistor T5 is turned from the ON state to the OFF state, the second transistor T2, the third transistor T3, the fourth transistor T4, and the sixth transistor T6 are maintained in the ON state, and the first transistor T1 and the seventh transistor T7 are maintained in the OFF state.

Consequently, the voltage supplied to the first node N1 maintains the voltage Vnl, and the voltage supplied to the third node N3 maintains 0 V. When the fifth transistor T5 is turned off, the voltage supplied to the second node N2 and the voltage supplied to the fourth node N4 are released, and discharging by the drain current Ion of the second transistor T2 starts. The voltage supplied to the second node N2 and the voltage supplied to the fourth node N4 drop from the voltage Vnn toward the voltage Vno (1 V) and become the voltage Vno. The voltage Vno corresponds to the threshold voltage VTH. In this case, the capacitive element CD holds a charge corresponding to a potential difference (4 V) between the voltage Vnl (4 V) supplied to the first node N1) and the voltage (0 V) supplied to the third node N3, and maintains the potential difference, and the capacitive element CV holds a charge corresponding to a potential difference (reference voltage VREF (4 V)−threshold voltage (1 V)=3 V) between the voltage Vnl (4 V) supplied to the first node N1 and the voltage (1 V) supplied to the second node N2 (1 V), and maintains the potential difference. Further, coupling capacitance between the capacitive element CV and the capacitive element CD holds charges corresponding to the potential difference Vgs (threshold voltage VTH, 1 V) with reference to the reference voltage VREF (4 V), and maintains (holds) the threshold voltage VTH with reference to the reference voltage VREF.

As described above, in the period PVH, by making the potential difference Vgs of the second transistor T2 equal to the threshold voltage VTH, the threshold voltage VTH of the second transistor T2 is acquired, and a charge equivalent to the threshold voltage VTH is held in the capacitive element CV.

In the period PWR following the period PVH, the image data signal SL(m) is supplied with the voltage VSIGH (7 V). The second scan signal SC2(*n*) remains in a state in which HI is supplied, and the third scan signal SC3(*n*) and the fifth scan signal SC5(*n*) remain in a state in which LO is supplied. The first scan signal SC1(*n*) changes from a state supplied with HI to a state supplied with LO, and the third scan signal SC3(*n*) changes from a state supplied with LO to a state supplied with HI. Therefore, the first transistor T1 is turned from the OFF state to the ON state, the third transistor T3 and the fourth transistor T4 are turned from the ON state to the OFF state, the sixth transistor T6 is maintained in the ON state, and the fifth transistor T5 and the seventh transistor T7 are maintained in the OFF state.

Consequently, the voltage supplied to the first node N1 gradually increases from the voltage Vnl toward the voltage Vnm (voltage VSIGH (7 V)) and becomes the voltage Vnm. When the voltage supplied to the first node N1 increases, the voltage supplied to the second node N2 gradually increases from the voltage Vno toward the voltage Vnl (4 V) due to the capacitive device CV and becomes the voltage Vnl. The voltage supplied to the third node N3 maintains 0 V. Thus, the potential difference Vgs is 4 V and the second transistor T2 is in the ON state. Although not shown, since the second transistor T2 is in the ON state, for example, the voltage supplied to the fourth node N4 becomes 0 V. In this case, the capacitive element CD holds charges corresponding to a potential difference (voltage VSIGH (7 V)−initialization voltage VINI (0 V)=7 V) between the voltage Vnm (7 V) supplied to the first node N1 and the voltage (0 V) supplied to the third node N3, and maintains the potential difference. In other words, the capacitive element CD maintains (holds) a white display voltage of the data signal VDATA.

As described above, in the period PWR, the data signal VDATA is written into the pixel 180F. The capacitive element CD maintains (holds) the voltage of the data signal VDATA.

In the emission period PEM of the KthFRAME following the period PVH of the KthFRAME, a voltage that is supplied to the pixels other than the selected pixel 180F is supplied. LO is supplied to the second scan signal SC2(*n*) from the state where HI is supplied. In the case where LO is supplied to the second scan signal SC2(*n*), the fifth scan signal SC5(*n*) is supplied with HI from the state where LO is supplied. The first scan signal SC2(*n*), the third scan signal SC3(*n*), and the fourth scan signal SC4(*n*) remain in the states supplied with LO. Therefore, the sixth transistor T6 is turned from the ON state to the OFF state, the seventh transistor T7 is turned from the OFF state to the ON state, and the first transistor T1, the third transistor T3, the fourth transistor T4, and the fifth transistor T5 remain in the OFF state.

Consequently, the fourth node N4 is electrically connected to the drive voltage power supply line PVDD, and the voltage supplied to the fourth node N4 becomes the drive voltage VDDEL. In the case where the voltage supplied to the fourth node N4 becomes the drive voltage VDDEL and the voltage Vds becomes larger than the threshold voltage VTH, the second transistor T2 causes the drain current Ion to flow. As a result, the potential of the third node N3 rises to the voltage Vnp, and accordingly, the voltage of the second node N2 capacitively coupled by the capacitive element CD and the capacitive element CV rises from the voltage Vnn toward the voltage Vnm and becomes the voltage Vnm, and the voltage of the first node N1 capacitively coupled to the third node N3 by the capacitive element CD increases from the voltage Vnm toward the voltage VH and becomes the voltage VH.

In this case, the potential difference Vgs is a sum of the potential difference held in the capacitive element CD and the potential difference held in the capacitive element CV (voltage included in the data signal VDATA (voltage VSIGH, 7 V)−reference voltage VREF (4 V)+threshold voltage VTH (1 V) included in the data signal VDATA). In other words, in the emission period PEM of the KthFRAME, the pixel 180F can display images based on the data signal VDATA and the corrected thresholds.

Specifically, since the potential difference Vds and the potential difference Vgs are higher (larger) than the threshold voltage VTH, the second transistor T2 is in the ON state, the drain current Ion flows from the drive power supply line PVDD to the light-emitting device OLED and the reference voltage line PVSS, and the light-emitting device OLED emits light. For example, the pixel 180F that emits red light, the pixel 180F that emits blue light, and the pixel 180F that emits green emit respectively, and three pixels using the pixel 180F that emits red light, the pixel 180F that emits blue light, and the pixel 180F that emits green light are white.

Similar to the display device 10, the display device 20 can control each transistor and initialize each node independently. Similar to the display device 10, the display device 20 can generate the potential difference Vgs of the second transistor T2 by using the two capacitive elements CD and the capacitive element CV to maintain (hold) the voltage included in the data signal VDATA by the capacitive element CD, holding the potential difference (charge) corresponding to the threshold voltage VTH by the capacitive element CV, and coupling the capacitive element CD and the capacitive element CV.

[7-3-2. Second Example of Driving Method for Display Device 20]

Referring to FIG. 36 and Table 3, a second example of the driving method for the display device 20 will be described. The driving method shown in the second embodiment includes the pixel 180F displaying the black image in the KthFRAME based on the voltage VSIGL included in the data signal VDATA after the pixel 180F displaying the white image based on the voltage of the data signal VDATA in the frame (K−1stFRAME) immediately before the current frame (KthFRAME). In other words, the driving method shown in the second example includes displaying images of different colors in successive frames. Configurations that are the same as or similar to those in FIG. 1 to FIG. 35 will be described as necessary.

The configurations of the first scan signal SC1(*n*), the second scan signal SC2(*n*), the third scan signal SC3(*n*), the fourth scan signal SC4(*n*), and the fifth scan signal SC5(*n*) are the same as those described in "7-3-1. First Example of Driving Method for Display Device 20". Further, the voltages (potentials) and the like of the respective nodes in the emission period of the K−1stFRAME to the period PVH of the KthFRAME are the same as the configurations described in "7-3-1. First Example of Driving Method for Display Device 20". Further, the operation and the like of each transistor in each period are the same as those described in "7-3-1. First Example of Driving Method for Display Device 20". Therefore, configurations and the like similar to those described in "7-3-1. First Example of Driving Method for Display Device 20" will be described as necessary. In addition, in the period PWR of the KthFRAME, the image data signal SL(m) is supplied with the data signal VDATA including the VSIGH corresponding to white, and in a period other than the period PWR of the KthFRAME, the data signal VDATA similar to the configuration described in "7-3-1. First Example of Driving Method for Display Device 20" is supplied.

In the emission period PEM of the K−1stFRAME, the first scan signal SC1(*n*) to the fifth scan signal SC5(*n*) are applied in the same manner as in the configuration described in "7-3-1. First Example of Driving Method for Display Device 20". The voltage supplied to the first node N1 is 10 V at the time of white display, the voltage supplied to the second node N2 is 7 V (voltage Vnm), the voltage supplied to the third node N3 is 3 V, and the potential difference Vgs is 4 V. Therefore, the second transistor T2 is in the ON state, the current Ion flows from the drive power supply line PVDD to the light-emitting device OLED and the reference-voltage line PVSS, and the light-emitting device OLED emits light.

In addition, similar to the configuration described in "7-3-1. First Example of Driving Method for Display Device 20", in the period PIN of the KthFRAME following the period PEM of the K−1stFRAME, the first node N1 is initialized by the reference voltage VREF (4 V), the second node N2 and the fourth node N4 are reset (initialized) by the reset voltage VRES (3.4 V), and the third node N3 is initialized by the initialization voltage VINI (0 V).

Further, in the period PVH, similar to the configuration described in "7-3-1. First Example of Driving Method for Display Device 20", the voltage supplied to the first node N1 maintains the voltage Vnl, the voltage supplied to the third node N3 maintains 0 V, and the voltage supplied to the second node N2 and the voltage supplied to the fourth node N4 become the voltage Vno (corresponding to the threshold voltage VTH). The capacitive element CD holds a charge corresponding to a potential difference between the voltage supplied to the first node N1 and the voltage supplied to the third node N3, and maintains the potential difference, and the capacitive element CV holds a charge corresponding to a potential difference between the voltage supplied to the first node N1 and the voltage supplied to the second node N2, and maintains the potential difference. The coupling capacitance between the capacitive element CV and the capacitive element CD holds charges corresponding to the potential difference Vgs and maintains (holds) the threshold voltage VTH with reference to the reference voltage VREF. That is, in the period PVH, the threshold voltage VTH of the second transistor T2 is obtained by making the potential difference Vgs of the second transistor T2 equal to the threshold voltage VTH, and charges corresponding to the threshold voltage VTH to the capacitive element CV are held.

In the period PWR following the period PVH, the image data signal SL(m) is supplied with the voltage VSIGL (3 V). The voltage supplied to the first node N1 gradually drops from the voltage Vnl toward the voltage Vnp (voltage VSIGL (3 V)) and becomes the voltage Vnp. In the case where the voltage supplied to the first node N1 drops, the voltage supplied to the second node N2 by the capacitive element CV gradually drops from the voltage Vno toward 0 V (reference voltage VREF) and becomes 0 V. The voltage supplied to the third node N3 maintains 0 V. Therefore, the potential difference Vgs is 0 V, and the second transistor T2 is in the OFF state. Although not shown, for example, the voltage supplied to the fourth node N4 is undefined. In this case, the capacitive element CD holds charges corresponding to a potential difference (voltage VSIGL (3 V)−initialization voltage VINI (0 V)=3 V) between the voltage Vnp (3 V) supplied to the first node N1 and the voltage (0 V) supplied to the third node N3, and maintains the potential difference. In other words, the capacitive element CD maintains (holds) the voltage included in the data signal VDATA.

As described above, in the period PWR, the data signal VDATA is written into the pixel 180F. The capacitive element CD maintains (holds) the voltage included in the data signal VDATA.

In the emission period PEM of the KthFRAME following the period PVH of the KthFRAME, the voltage supplied to the first node N1 maintains the voltage Vnp, and the voltage supplied to the second node N2 and the voltage supplied to the third node N3 maintain 0 V. That is, since the potential difference Vgs is 0 V and smaller than the threshold voltage VTH, the second transistor T2 is in the OFF state. The potential difference Vgs is a sum of the potential difference held in the capacitive element CD and the potential difference held in the capacitive element CV (voltage included in the data signal VDATA (voltage VSIGL, 3 V)−reference voltage VREF (4 V)+threshold voltage VTH (1V)). In other words, in the emission period PEM of the KthFRAME, the pixel 180F can display images based on the data signal VDATA and the corrected threshold.

Specifically, the second transistor T2 is in the OFF state, and the light-emitting device OLED does not emit light from the driving power supply line PVDD to the light-emitting device OLED and the reference voltage line PVSS without flowing the drain current Ion. For example, the pixel 180F emitting red light, the pixel 180F emitting blue light, and the pixel 180F emitting green light do not emit light, and three pixels using the pixel 180F emitting red light, the pixel 180F emitting blue light, and the pixel 180F emitting green light become black.

The second example of the driving method for the display device 20 has the same effects as those described in "7-3-1. First Example of Driving Method for Display Device 20".

8. Eighth Embodiment

Figure 37:
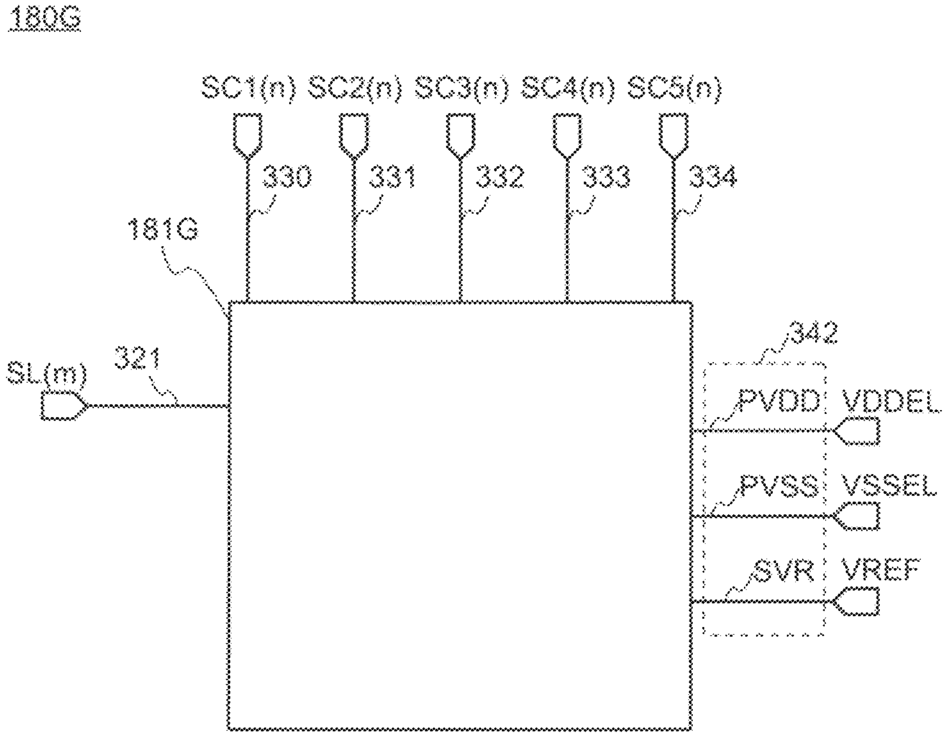
FIG. 37 is a schematic diagram showing an input signal to a pixel circuit according to an eighth embodiment of the present invention.
Figure 38:
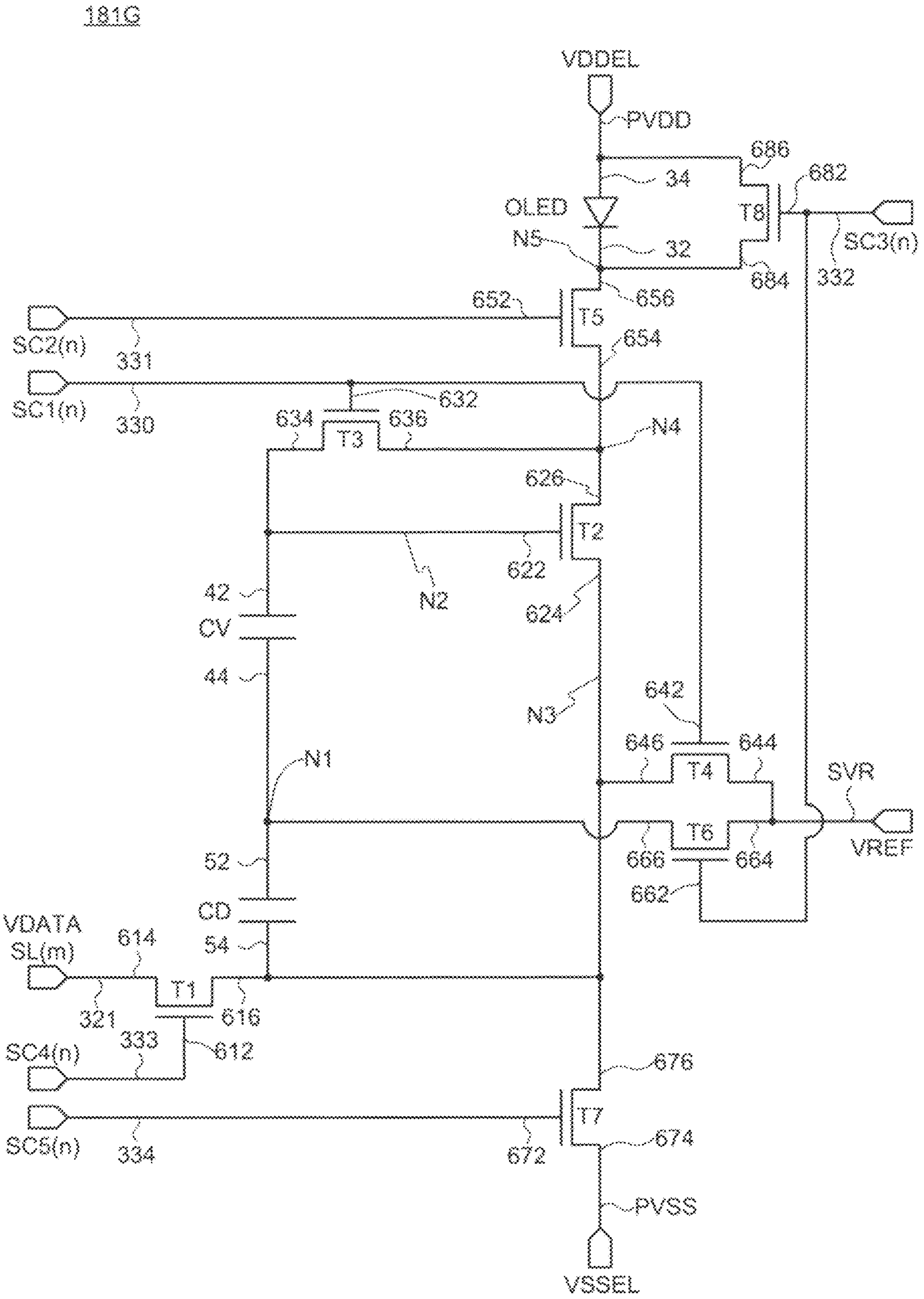
FIG. 38 is a circuit diagram showing a configuration of the pixel circuit according to the eighth embodiment of the present invention.

With reference to FIG. 31, FIG. 32, and FIG. 37 to FIG. 42, an overview of a display device according to an eighth embodiment will be described. FIG. 37 is a schematic diagram showing an input signal to a pixel 180G according to the eighth embodiment, FIG. 38 is a circuit diagram showing a configuration of a pixel circuit 181G, and FIG. 39 to FIG. 42 are timing charts of the display device according to the eighth embodiment.

The display device according to the eighth embodiment includes the pixel 180G and the pixel circuit 181G. Configurations of the pixel 180G and the pixel circuit 181G differ from the circuit configurations of the pixel 180F and the pixel circuit 181F of the display device 20 according to the seventh embodiment. Specifically, the display device according to the eighth embodiment has a configuration and a function in which the pixel 180F and the pixel circuit 181F in the display device 20 according to the seventh embodiment are replaced with a pixel 180G. Other configurations and functions are the same as those of the display device 20 according to the seventh embodiment. In describing the configuration and function of the eighth embodiment, the same configuration and function as those of the display device 10 according to the first embodiment and the display device 20 according to the seventh embodiment will be described as necessary. Configurations that are the same as or similar to those in FIG. 31 to FIG. 36 will be described as necessary.

[8-1. Configuration of Pixel 180G]

Referring to FIG. 37 and FIG. 38, an overview of the pixel 180G and the pixel circuit 181G will be described.

The pixel circuit 181G has a configuration in which the initialization voltage power supply line SVI and the reset voltage power supply line SVRE are removed from the pixel circuit 181F. That is, the pixel circuit 181G is electrically connected to the first scan signal SC1(*n*), the second scan signal SC2(*n*), the third scan signal SC3(*n*), the fourth scan signal SC4(*n*), the fifth scan signal SC5(*n*), the image data signal SL(m) including the data signal VDATA, and the reference voltage VREF. In addition, although detailed later, the circuit configuration of the pixel circuit 181G differs from the circuit configuration of the pixel circuit 181F, and a driving method for the pixel circuit 181G differs from the driving method for the pixel circuit 181F. The scan signal lines 330 to 334 to which the first scan signal SC1(*n*), the second scan signal SC2(*n*), the third scan signal SC3(*n*), the fourth scan signal SC4(*n*), the fifth scan signal SC5(*n*), the image data signal SL(m) including the data signal VDATA, and the reference voltage VREF are connected, the image data signal line 321, and the reference voltage power supply line SVR have the same circuit configuration as the pixel circuit 181F.

As shown in FIG. 37, the pixel circuit 181G includes the first transistor T1, the second transistor T2, the third transistor T3, the fourth transistor T4, the fifth transistor T5, the sixth transistor T6, the seventh transistor T7, the eighth transistor T8, the capacitive element CV, and the light emitting device OLED. Each of these transistors includes a gate electrode and a pair of electrodes (a source electrode and a drain electrode) including a first electrode and a second electrode. Each of the capacitive element CD, the capacitive element CV, and the light-emitting device OLED has a pair of electrodes including a first electrode and a second electrode.

For example, the first transistor T1 is a selection transistor. The first transistor T1 has a function of supplying the image data signal SL(m) to the third node N3.

For example, the second transistor T2 is a driving transistor. A gate voltage in which the threshold voltage VTH is corrected based on the reference voltage VREF is applied between the gate electrode 622 and the first electrode (source) 624 of the second transistor T2. Further, the second transistor T2 controls an amount of current flowing from the driving power supply line PVDD to the light emitting device OLED based on the gate voltage (voltage between the gate electrode 622 and the first electrode (source) 624) in which the variation in the threshold voltage VTH is corrected and the input image data signal SL(m). That is, the second transistor T2 has a function of causing the light-emitting device OLED to emit light by supplying the drive voltage VDDEL to the light-emitting device OLED and supplying a current.

The third transistor T3 has a function of bringing the second node N2 and the fourth node N4 into conduction to set a potential difference between the gate electrode 622 and the second electrode 626 of the second transistor T2 to 0 V.

The fourth transistor T4 has a function of conducting the third node N3 and the reference voltage power supply line SVR, supplying the reference voltage VREF to the third node N3, and initializing the third node N3.

The fifth transistor T5 has a function of conducting the fourth node N4 (the second electrode 626 of the second transistor T2) and the fifth node N5 (the first electrode 32 of the light emitting device OLED).

The sixth transistor T6 has a function of conducting the first node N1 and the reference voltage power supply line SVR, supplying the reference voltage power supply line SVR to the first node N1, and initializing the first node N1.

The seventh transistor T7 has a function of conducting the third node N3 and the reference voltage line PVSS and supplying the reference voltage VSSEL to the third node N3.

The eighth transistor T8 has a function of conducting the first electrode 32 and the second electrode 34 of the light-emitting device OLED and supplying the drive voltage VDDEL to the second electrode 656 of the fifth transistor T5.

As will be described later, the capacitive element CV has a function of holding (storing) charges corresponding to the threshold voltage VTH of the second transistor T2.

The capacitive element CD has a function of holding (storing) charges corresponding to a data voltage (equal to or higher than the voltage VSIGL (see FIG. 39) and equal to or lower than the voltage VSIGH (see FIG. 39)) included in the image data signal SL(m) supplied to the third node N3.

The light-emitting device OLED has a diode characteristic and has a function of emitting light based on a current flowing through the light-emitting device OLED (that is, the drain current Ion of the second transistor T2). The first electrode 32 of the light-emitting device OLED is, for example, a cathode electrode, and the second electrode 34 of the light-emitting device OLED is, for example, an anode electrode.

The first transistor T1 includes the gate electrode 612, the first electrode 614, and the second electrode 616. The gate electrode 612 is electrically connected to the scan signal line 333. The first electrode 614 is electrically connected to the image data signal line 321. The second electrode 616 is electrically connected to the third node N3, the first electrode 624 of the second transistor T2, the second electrode 646 of the fourth transistor T4, and the second electrode 44 of the capacitive element CD. The fourth scan signal SC4(*n*) is supplied to the scan signal line 333. Similar to the first transistor T1 in the display device 10 according to the first embodiment, the switching of the first transistor T1 is controlled by using the fourth scan signal SC4(*n*), and the conduction state (ON state) and the non-conduction state (OFF state) are controlled.

The second transistor T2 includes the gate electrode 622, the first electrode 624, and the second electrode 626. The gate electrode 622 is electrically connected to the second node N2, the first electrode 42 of the capacitive element CV, and the first electrode 634 of the third transistor T3. The second electrode 626 is electrically connected to the fourth node N4, the second electrode 636 of the third transistor T3, and the first electrode 654 of the fifth transistor T5. The threshold voltage of the second transistor T2 is the threshold voltage VTH. In the second transistor T2, a conduction state (ON state) and a non-conduction state (OFF state) are controlled according to a potential difference Vgs between a voltage supplied to the gate electrode 622 (second node N2) and a voltage supplied to the first electrode 624 (third node N3) and a potential difference Vds between the second electrode 626 (fourth node N4) and the first electrode 624. For example, in the case where the potential difference Vgs between the voltage supplied to the second node N2 and the voltage supplied to the third node N3 is smaller than the threshold voltage VTH, the second transistor T2 becomes non-conductive. For example, in the case where the potential difference Vgs between the voltage supplied to the second node N2 and the voltage supplied to the third node N3 is greater than or equal to the threshold voltage VTH and the potential difference Vds between the voltage supplied to the fourth node N4 and the voltage supplied to the third node N3 is larger than 0 V, the second transistor T2 becomes conductive.

The third transistor T3 includes the gate electrode 632, the first electrode 634, and the second electrode 636. The gate electrode 632 is electrically connected to the scan signal line 330. The first electrode 634 is electrically connected to the reference voltage power supply line SVR. The first scan signal SC1(*n*) is supplied to the scan signal line 330. In the third transistor T3, as in the third transistor T3 of the display device 10 according to the first embodiment, switching is controlled by using the first scan signal SC1(*n*), and a conduction state (ON state) and a non-conduction state (OFF state) are controlled.

The fourth transistor T4 includes the gate electrode 642, the first electrode 644, and the second electrode 646. The gate electrode 642 is electrically connected to the scan signal line 330. The first electrode 644 is electrically connected to the reference voltage power supply line SVR. The fourth transistor T4 is switched using the first scan signal SC1(*n*). In other words, the fourth transistor T4 is controlled to be in the conductive state (ON state) or the non-conductive state (OFF state) by the first scan signal SC1(*n*). In the case where the signal supplied to the first scan signal SC1(*n*) is LO, the fourth transistor T4 becomes non-conductive, and in the case where the signal supplied to the scan signal line 330 is HI, the fourth transistor T4 becomes conductive.

The fifth transistor T5 includes the gate electrode 652, the first electrode 654, and the second electrode 656. The gate electrode 652 is electrically connected to the scan signal line 331. The second electrode 656 is electrically connected to the first electrode 684 of the eighth transistor T8. The second scan signal SC2(*n*) is supplied to the scan signal line 331. The fifth transistor T5 is switched using the second scan signal SC2(*n*). In other words, in the fifth transistor T5, the conduction state (ON state) and the non-conduction state (OFF state) are controlled by the second scan signal SC2(*n*). In the case where the signal supplied to the second scan signal SC2(*n*) is LO, the fifth transistor T5 becomes non-conductive, and in the case where the signal supplied to the second scan signal SC2(*n*) is HI, the fifth transistor T5 becomes conductive.

The sixth transistor T6 includes the gate electrode 662, the first electrode 664, and the second electrode 666. The gate electrode 662 is electrically connected to the scan signal line 332. The first electrode 664 is electrically connected to the reference voltage power supply line SVR. The third scan signal SC3(*n*) is supplied to the scan signal line 332. The sixth transistor T6 is switched using the third scan signal SC3(*n*). In other words, in the sixth transistor T6, the conduction state (ON state) and the non-conduction state (OFF state) are controlled by the third scan signal SC3(*n*). In the case where the signal supplied to the third scan signal SC3(*n*) is LO, the sixth transistor T6 becomes non-conductive, and in the case where the signal supplied to the third scan signal SC3(*n*) is HI, the sixth transistor T6 becomes conductive.

The seventh transistor T7 includes the gate electrode 672, the first electrode 674, and the second electrode 676. The gate electrode 672 is electrically connected to the scan signal line 334. The first electrode 674 is electrically connected to the reference voltage line PVSS. The fifth scan signal SC5(*n*) is supplied to the scan signal line 334. In the seventh transistor T7, similar to the seventh transistor T7 described in "7-2. Configuration of Pixel 180F", the conduction state (ON state) and the non-conduction state (OFF state) are controlled by using the fifth scan-signal SC5(*n*).

The eighth transistor T8 includes the gate electrode 682, the first electrode 684, and the second electrode 686. The gate electrode 682 is electrically connected to the scan signal line 332 and the gate electrode 662 of the sixth transistor T6. The second electrode 686 is electrically connected to the second electrode 34 of the light emitting device OLED and the drive power supply line PVDD. The third scan signal SC3(*n*) is supplied to the scan signal line 332. The eighth transistor T8 is switched using the third scan signal SC3(*n*). In other words, in the eighth transistor T8, the conduction state (ON state) and the non-conduction state (OFF state) are controlled by the third scan signal SC3(*n*). In the case where the signal supplied to the third scan signal SC3(*n*) is LO, the eighth transistor T8 becomes non-conductive. In the case where the signal supplied to the third scan signal SC3(*n*) is HI, the eighth transistor T8 becomes conductive.

The configuration and the function of the pixel circuit 181G other than the configuration and the function described in "8-1. Configuration of Pixel 180G" are the same as those of the pixel circuit 181F. For example, each transistor shown in FIG. 38 may be an n-channel type field effect transistor similar to the display device 10 according to the first embodiment, and may have a Group 14 element such as silicon or germanium, or an oxide exhibiting semiconductor characteristics in a channel region.

[8-2. Driving Method for Pixel Circuit 181G]

With reference to FIG. 39 to FIG. 42, a method for driving the display device according to the eighth embodiment will be described. Configurations that are the same as or similar to those in FIG. 31 to FIG. 38 will be described as necessary.

The driving method for the display device according to the eighth embodiment includes a period similar to the driving method for the display device 20 according to the seventh embodiment shown in FIG. 32.

In one horizontal period (horizontal period HRP) in the driving process of the display device according to the eighth embodiment, the pixel 180G receives the first scan signal SC1(*n*), the second scan signal SC2(*n*), the third scan signal SC3(*n*), the fourth scan signal SC4(*n*), the fifth scan signal SC5(*n*), the image data signal SL(m) including the data signal VDATA, and the reference voltage VREF. For example, the pixel 180G is selected according to timings of the first scan signal SC1(*n*), the second scan signal SC2(*n*), the third scan signal SC3(*n*), the fourth scan signal SC4(*n*), and the fifth scan signal SC5(*n*). The image data signal SL(m) is input to the selected pixel 180G according to the timings of the respective signals. A similar operation is performed on all the pixels 180G, and an image of the frame corresponding to the 1FRAME is displayed in the display region 22 of the display device 20 based on the image data signal SL(m) input to all the pixels 180G.

For example, each signal of each frame and the voltage (potential) supplied to each node in the timing charts shown in FIGS. 39 to 42 FIG. are shown in Table 4.

TABLE 4

| | Setting Value [V] |
|---|---|
| VTH | 1 |
| VSIGH(black | 4 |
| VSIGL(white | 0 |
| HI | 8 |
| LO | −4 |
| VREF | 3 |
| VDDEL | 6 |
| VSSEL | −2 |

For example, as shown in Table 4, the voltage VSIGH is 4 V, and the pixel 180 supplied with the voltage VSIGH does not emit light and becomes black. Further, for example, the voltage VSIGL is 0 V, and the pixel 180 to which the voltage VSIGL is supplied emits light and emits white color. For example, the voltage VH (HI) is 8 V, the voltage VL (LO) is-4 V, the reference voltage VREF is 3 V, the drive voltage VDDEL is 6 V, the reference voltage VSSEL is 5 V, and the voltage VN is-5 V. The constant voltage VSH is 2.5 V.

[8-2-1. First Example of Driving Method for Pixel Circuit 181G]

Figure 39:
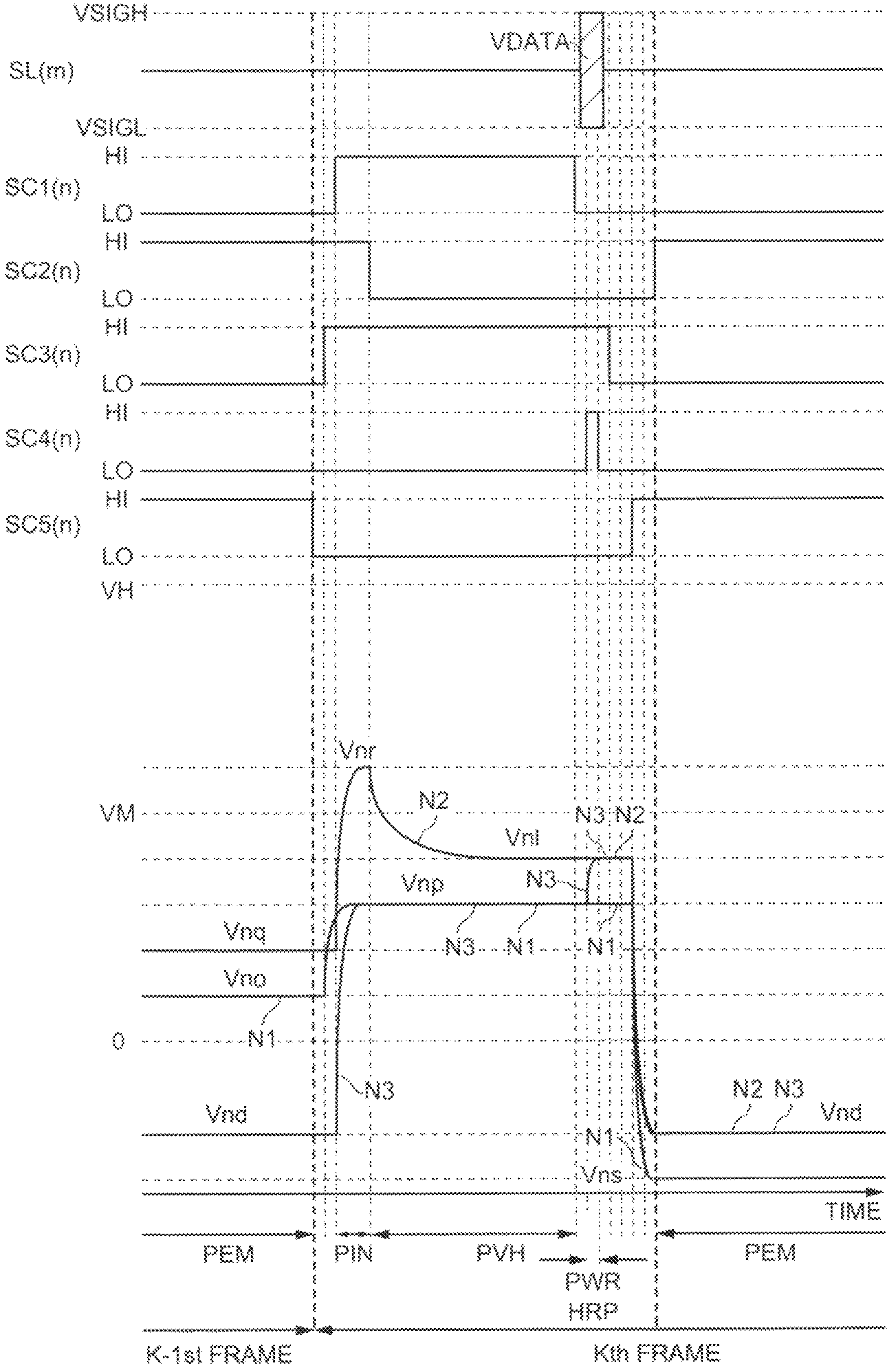
FIG. 39 is a timing chart of the pixel circuit according to the eighth embodiment of the present invention.

Referring to FIG. 39 and Table 2, a first example of the driving method for the pixel circuit 181G will be described. Similar to the first example of the driving method for the display device 10 according to the first embodiment, the method includes displaying images of different colors in consecutive frames.

In the emission period PEM of the K−1stFRAME, the image data signal SL(m) (data signal VDATA) is supplied with the voltage of the data signal VDATA supplied to pixels other than the selected pixel 180G, the first scan signal SC1(*n*), the third scan signal SC3(*n*) and the fourth scan signal SC4(*n*) are supplied with LO, and the second scan signal SC2(*n*) and the fifth scan signal SC5(*n*) are supplied with HI. The first transistor T1, the third transistor T3, the fourth transistor T4, the sixth transistor T6, and the eighth transistor T8 are in the OFF state, and the fifth transistor T5 and the seventh transistor T7 are in the ON state. Further, for example, the voltage supplied to the third node N3 is the voltage Vnd (−2 V), the voltage supplied to the second node N2 is the voltage Vnq (2 V), and the potential difference Vgs is 4 V. Therefore, the second transistor T2 is in the ON state, and the drain current Ion can be supplied the light-emitting device OLED and the reference voltage line PVSS can be supplied with the voltage VSIGH from the drive power supply line PVDD based the potential difference Vgs and the potential difference Vds corresponding to the voltage input in the horizontal period HRP of the K−1stFRAME. Consequently, the light-emitting device OLED emits light. The voltage supplied to the second node N2 is 1 V by capacitive coupling by the capacitive element CV and the capacitive element CD. For example, the pixel 180G emits red light, and three pixels using the pixel 180G that emits red light, the pixel 180G that emits blue light, and the pixel 180G that emits green light emit white light.

In the period PIN of the KthFRAME following the emission period PEM of the K−1stFRAME, the image data signal SL(m) (data signal VDATA) is supplied with the data signal VDATA supplied to pixels other than the selected pixel 180G. First, the fifth scan signal SC5(*n*) is supplied with LO from the state where HI is supplied. In the case where LO is supplied to the fifth scan signal SC5(*n*), the third scan signal SC3(*n*) changes from a state in which LO is supplied to a state where HI is supplied. In the case where the third scan signal SC3(*n*) is supplied with HI, the first scan signal SC1(*n*) changes from a state where LO is supplied to a state where HI is supplied. The second scan signal SC2(*n*) is in a state where HI is supplied, and the fourth scan signal SC4(*n*) is in a state where LO is supplied.

The seventh transistor T7 is turned from the ON state to the OFF state, and the drain current Ion does not flow from the drive power supply line PVDD to the light emitting device OLED and the reference voltage line PVSS. The sixth transistor T6 and the eighth transistor T8 are turned from the OFF state to the ON state, the potential difference between the first electrode 32 and the second electrode 34 of the light-emitting device OLED becomes 0 V, the emission of the light-emitting device OLED is stopped, and the voltage supplied to the first node N1 rises from the voltage Vno (1 V) toward the voltage Vnp (reference voltage VREF, 3 V) and becomes the voltage Vnp. The third transistor T3 and the fourth transistor T4 are turned from the OFF state to the ON state, the fifth transistor T5 remains in the ON state, the first transistor T1 remains in the OFF state, the voltage supplied to the first node N1 rises from the voltage Vno (1 V) toward the voltage Vnp (reference voltage VREF, 3 V), the second node N2 and the fourth node N4 are conducted, and the voltage Vnr (drive voltage VDDEL, 6 V) is supplied to the second node N2 (the gate electrode 622 of the second transistor T2) and the fourth node N4 (the second electrode 626 of the second transistor T2). The potential difference Vgs is 3 V (6 V−3 V) and the second transistor T2 is in the ON state.

As described above, in the period PIN, the second node N2 and the fourth node N4 are initialized by the drive voltage VDDEL, and the first node N1 and the third node N3 are initialized by the reference voltage VREF.

In the period PVH following the period PIN, the image data signal SL(m) (data signal VDATA) is supplied with the data signal VDATA that is supplied to pixels other than the selected pixel 180G. The second scan signal SC2(*n*) changes from a state in which HI is supplied to a state in which LO is supplied. The rest of the scan signals are in the same condition as the period PIN. The fifth transistor T5 is turned from the ON state to the OFF state, and the rest of the transistors are in the same state as the period PIN. The first node N1 and the third node N3 maintain the voltage Vnp. The second transistor T2 is in the ON state, the drain electrode Ion flows, and the first node N1 and the third node N3 maintain the voltage Vnp. Therefore, due to the OFF state of the fifth transistor T5, the voltage supplied to the second node N2 and the fourth node N4 is released, and gradually decreases (discharges) from the voltage Vnr. If the potential difference Vgs between the voltage supplied to the second node N2 and the voltage supplied to the fourth node N4 and the voltage supplied to the third node N3 becomes the threshold voltage VTH, the second transistor T2 is turned to the OFF state. In this case, the voltage supplied to the second node N2 and the fourth node N4 is the voltage Vnl (4 V).

As described above, in the period PVH, by making the potential difference Vgs of the second transistor T2 equal to the threshold voltage VTH, the threshold voltage VTH of the second transistor T2 is acquired, and a charge equivalent to the threshold voltage VTH is held in the capacitive element CV.

In the period PWR following the period PVH, the image data signal SL(m) (the data signal VDATA) is supplied with the voltage VSIGH (4 V). First, the first scan signal SC1(*n*) changes from the state where HI is supplied to the state where LO is supplied. In the case where the first scan signal SC1(*n*) is supplied with LO, the fourth scan signal SC4(*n*) changes from the state where LO is supplied to the state where HI is supplied. The third scan signal SC3(*n*) is supplied with HI, and the second scan signal SC2(*n*) and the fifth scan signal SC5(*n*) are supplied with LO. The third transistor T3 and the fourth transistor T4 are turned from the ON state to the OFF state. The rest of the transistors are similar to the period PVH. The voltage supplied to the second node N2 maintains the voltage Vnl (4 V) and the voltage supplied to the first node N1 maintains the voltage Vnp (reference voltage VREF, 3 V). The voltage supplied to the third node N3 gradually increases from the voltage Vnp and becomes the voltage Vnl (voltage VSIGH, 4 V). In this case, the capacitive element CD holds a charge corresponding to a potential difference between the voltage Vnp (reference voltage VREF, 3 V) supplied to the first node N1 and the voltage Vnl (voltage VSIGH, 4V) supplied to the third node N3, and maintains the potential difference (−1 V). That is, the potential difference Vgs is 0 V.

As described above, in the period PWR, the data signal VDATA is written into the pixel 180G. The capacitive element CD maintains (holds) the voltage included in the data signal VDATA.

During a period after the period PWR, the fourth scan signal SC4(*n*) changes from a state where HI is supplied to a state where LO is supplied. In the case where the fourth scan signal SC4(*n*) is supplied with LO, the third scan signal SC3(*n*) changes from the state where HI is supplied to the state where LO is supplied. In the case where LO is supplied to the third scan signal SC3(*n*), the fifth scan signal SC5(*n*) changes from the state where LO is supplied to the state where HI is supplied. The first transistor T1, the sixth transistor T6, and the eighth transistor T8 are turned from the ON state to the OFF state, and the seventh transistor T7 is turned from the OFF state to the ON state. The other scan signals and the other transistors are the same as the period PWR. The voltage supplied to the second node N2 and the voltage supplied to the third node N3 drop from the voltage Vnl to the voltage Vnd (−2 V). That is, the potential difference Vgs is maintained at 0 V. In this case, the voltage supplied to the first node N1 capacitively coupled by the capacitive element CV and the capacitive element CD drops from the voltage Vnp to the voltage Vns (−3 V).

In the emission period PEM of the KthFRAME following the period after the period PWR of the KthFRAME, the image data signal SL(m) (data signal VDATA) is supplied with the data signal VDATA supplied to pixels other than the selected pixel 180G. In addition, the second scan signal SC2(*n*) changes from the state where LO is supplied to the state where HI is supplied. Therefore, the fifth transistor T5 is turned from the OFF state to the ON state. The other scan signals and the other transistors are in the same condition as the period after the period PWR of the KthFRAME. The fifth transistor T5 is turned to the ON state, and the first electrode 32 of the light-emitting device OLED is electrically connected to the second electrode 626 (fourth node N4) of the second transistor T2. The potential difference Vgs is a sum of the potential difference held in the capacitive element CD and the potential difference held in the capacitive element CV (reference voltage VREF (3 V)−the voltage of the data signal VDATA (voltage VSIGH, 4 V)+threshold voltage VTH (1 V)=0 V). In the pixel 180G in which the data signal VDATA includes the voltage VSIGH, since the potential difference Vgs is 0 V and the second transistor T2 is the OFF state, the drain electrode Ion does not flow. Therefore, the light-emitting device OLED does not emit light. Consequently, the pixel 180G that emits red light becomes black. Similar to the pixel 180G that emits red light, the pixel 180G that emits blue light and the pixel 180G that emits green light do not emit light, and therefore, three pixels using the pixel 180G that emits red light, the pixel 180G that emits blue light, and the pixel 180G that emits green light become black.

The display device according to the eighth embodiment can control each node independently, similar to the display device 10 according to the first embodiment.

The display device according to the eighth embodiment includes a configuration in which the first node N1, the second node N2, the third node N3, the capacitive element CV, and the capacitive element CD are not directly connected to the light-emitting device OLED. The voltages supplied to the first node N1, the second node N2, the third node N3, the capacitive element CV, and the capacitive element CD are constant voltages such as the drive voltage VDDEL, the reference voltage VREF, and the data signal VDATA. Thus, for example, redistribution of charges between the first node N1, the second node N2, and the third node N3 and the parasitic capacitances added to the capacitive element CD, the capacitive element CV, and the light-emitting device OLED does not occur. Consequently, the display device according to the eighth embodiment can suppress the variation in the voltages of the first node N1, the second node N2, and the third node N3 due to the redistribution of the charges, so that the threshold voltage VTH can be obtained at high speed.

[8-2-2. Second Example of Driving Method for Pixel Circuit 181G]

Figure 40:
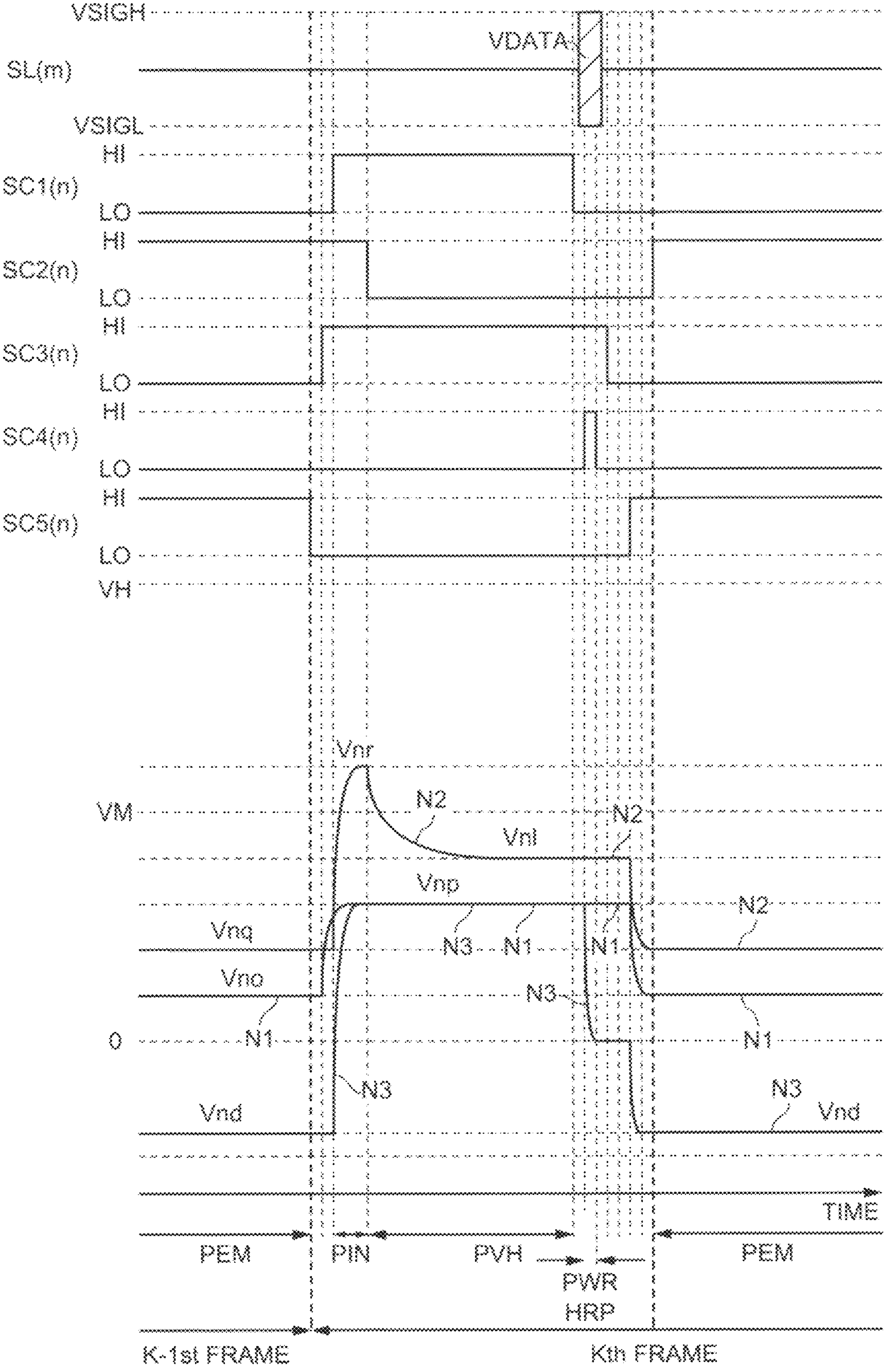
FIG. 40 is a timing chart of the pixel circuit according to the eighth embodiment of the present invention.

Referring to FIG. 40, a second example of the driving method for the pixel circuit 181G will be described. The driving method shown in the second example of the pixel circuit 181G includes displaying images of the same color (for example, white) in consecutive frames, similar to the second example of the driving method for the display device 10 according to the first embodiment. Configurations that are the same as or similar to those in FIG. 31 to FIG. 39 will be described as necessary.

The voltages (potentials) and the like of the respective nodes in the emission period PEM of the K−1thFRAME to the period PWR of the KthFRAME are the same as the configurations described in "8-2-1. First Example of Driving Method for Pixel Circuit 181G". In addition, a configuration of each scan signal and operation of each transistor in each period are the same as those described in "8-2-1. First Example of Driving Method for Pixel Circuit 181G". Therefore, the same configuration as that described in "8-2-1. First Example of Driving Method for Pixel Circuit 181G" will be described as needed. In addition, the image data signal SL(m) is supplied with the data signal VDATA including the VSIGL (0 V) corresponding to white in the period PWR of the KthFRAME, and is supplied with the data signal VDATA similar to the configuration described in "8-2-1. First Example of Driving Method for Pixel Circuit 181G" in a period other than the period PWR of the KthFRAME.

In the emission period PEM of the K−1stFRAME, similar to the configuration described in "8-2-1. First Example of Driving Method for Pixel Circuit 181G", the pixel 180G emits red light and three pixels using the pixel 180G that emits red light, the pixel 180G that emits blue light, and the pixel 180G that emits green light emit white light.

In the period PIN of the KthFRAME following the emission period PEM of the K−1stFRAME, the second node N2 and the fourth node N4 are initialized by the drive voltage VDDEL and the first node N1 and the third node N3 are initialized by the reference voltage VREF, similar to the configuration described in "8-2-1. First Example of Driving Method for Pixel Circuit 181G".

In the period PIN subsequent to the period PVH, similar to the configuration described in "8-2-1. First Example of Driving Method for Pixel Circuit 181G", the second transistor T2 has the same potential difference Vgs as the threshold voltage VTH, so that the threshold voltage VTH of the second transistor T2 is acquired and the charge corresponding to the threshold voltage VTH is held in the capacitive element CV.

In the period PWR following the period PVH, the image data signal SL(m) (the data signal VDATA) is supplied with the voltage VSIGL (0 V). The voltage supplied to the second node N2 maintains the voltage Vnl (4 V) and the voltage supplied to the first node N1 maintains the voltage Vnp (reference voltage VREF, 3 V). The voltage supplied to the third node N3 gradually drops from the voltage Vnp and becomes 0 V (voltage VSIGL). In this case, the capacitive element CD holds charges corresponding to the potential difference between the voltage Vnp (reference voltage VREF, 3 V) supplied to the first node N1 and 0 V (voltage VSIGL) supplied to the third node N3, and maintains the potential difference (3 V). That is, the potential difference Vgs is 4 V.

As described above, in the period PWR, the data signal VDATA is written into the pixel 180G. In addition, the capacitive element CD maintains (holds) the voltage included in the data signal VDATA.

During the period after the period PWR, when HI is supplied to the fifth scan signal SC5(*n*), the seventh transistor T5 is turned from the OFF state to the ON state, and the third node N3 is connected to the reference voltage VSSEL, so that the voltage supplied to the third node N3 drops from 0 V to the voltage Vnd (−2 V). Accordingly, the voltage of the second node N2 capacitively coupled by the capacitive element CV and the capacitive element CD drops from the voltage Vnl to the voltage Vnq (2 V). That is, the potential difference Vgs is maintained at 4 V. In this case, the voltage supplied to the first node N1 capacitively coupled by the capacitive element CV and the capacitive element CD drops from the voltage Vnp to the voltage Vno (1 V).

In the emission period PEM of the KthFRAME following the period after the period PWR of the KthFRAME, the potential difference Vgs becomes a sum of the potential difference held in the capacitive element CD and the potential difference held in the capacitive element CV (reference voltage VREF (3 V)−the voltage included in the data signal VDATA (voltage VSIGL, 0 V)+threshold voltage VTH (1 V)=4 V). That is, the pixel 180G can display images based on the data signal VDATA and the corrected thresholds. In the case where the data signal VDATA includes the voltage VSIGL, the potential difference Vgs is 4 V and the second transistor T2 is in the ON state, so that the drain current Ion flows from the driving power supply line PVDD to the light emitting element OLED and the reference voltage line PVSS, and the light emitting element OLED emits light. For example, the pixel 180F that emits red light, the pixel 180F that emits blue light, and the pixel 180F that emits green light emit light respectively, and three pixels using the pixel 180F that emits red light, the pixel 180F that emits blue light, and the pixel 180F that emits green light are white.

The second example of the driving method for the pixel circuit 181G has the same advantageous effects as those described in "8-2-1. First Example of Driving Method for Pixel Circuit 181G".

[8-2-3. Third Example of Driving Method for Pixel Circuit 181G]

Figure 41:
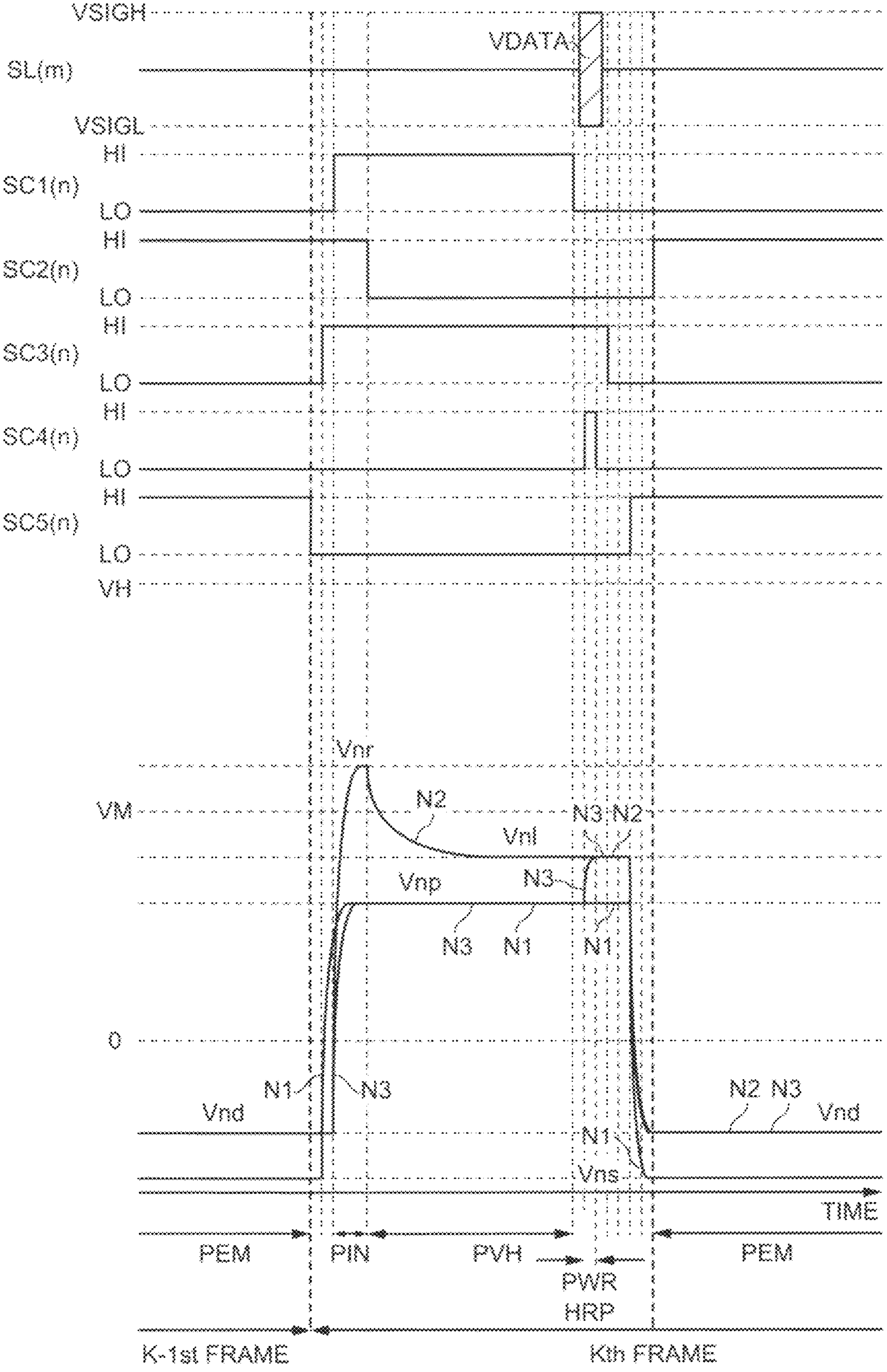
FIG. 41 is a timing chart of the pixel circuit according to the eighth embodiment of the present invention.

Referring to FIG. 41, a third example of the driving method for the pixel circuit 181G will be described. The driving method shown in the third example of the driving method for the pixel circuit 181G includes displaying images of the same color (for example, black) in consecutive frames, similar to the third example of the driving method for the display device 10 according to the first embodiment. Configurations that are the same as or similar to those in FIG. 31 to FIG. 40 will be described as necessary.

Voltages (potentials) and the like of the respective nodes in the period PIN of the KthFRAME following the emission period PEM of the K−1stFRAME to the emission period PEM of the KthFRAME are the same as those described in "8-2-1. First Example of Driving Method for Pixel Circuit 181G". In addition, a configuration of each scan signal and operation of each transistor in each period are the same as those described in "8-2-1. First Example of Driving Method for Pixel Circuit 181G". Therefore, the same configuration as that described in "8-2-1. First Example of Driving Method for Pixel Circuit 181G" will be described as needed.

In the emission period PEM of the K−1stFRAME, for example, the voltage supplied to the second node N2 and the third node N3 is the voltage Vnd (−2 V), and the potential difference Vgs is 0 V. Therefore, the second transistor T2 is in the OFF state, the drain electrode Ion does not flow, and the light-emitting device OLED does not emit light.

Consequently, the pixel 180G that emits red light becomes black. Similar to the pixel 180G that emits red light, the pixel 180G that emits blue light and the pixel 180G that emits green light do not emit light, and therefore, three pixels using the pixel 180G that emit red light, the pixel 180G that emits blue light, and the pixel 180G that emits green light become black.

In the period PIN of the KthFRAME following the emission period PEM of the K−1stFRAME, the second node N2 and the fourth node N4 are initialized by the drive voltage VDDEL and the first node N1 and the third node N3 are initialized by the reference voltage VREF, similar to the configuration described in "8-2-1. First Example of Driving Method for Pixel Circuit 181G".

In the period PVH following the period PIN, similar to the configuration described in "8-2-1. First Example of Driving Method for Pixel Circuit 181G", the second transistor T2 has the same potential difference Vgs as the threshold voltage VTH, so that the threshold voltage VTH of the second transistor T2 is acquired and the charge corresponding to the threshold voltage VTH is held in the capacitive element CV.

In the period PWR following the period PVH, the data signal VDATA is written in the pixel 180G in the same manner as in the configuration described in "8-2-1. First Example of Driving Method for Pixel Circuit 181G". The capacitive element CD maintains (holds) the voltage included in the data signal VDATA.

In the period after the period PWR and the emission period PEM of the KthFRAME following the period after the period PWR, the pixel circuit 181G operates in the same manner as the configuration described in "8-2-1. First Example of Driving Method for Pixel Circuit 181G". Since the potential difference Vgs is 0 V and the second transistor T2 is in the OFF state, no current flows through the drain electrode Ion and the light-emitting element OLED does not emit light. As a consequence, three pixels using the pixel 180G that emits red light, the pixel 180G that emits blue light, and the pixel 180G that emits green light are black.

The third example of the driving method of the pixel circuit 181G has the same advantageous effects as those described in "8-2-1. First Example of Driving Method for Pixel Circuit 181G".

[8-2-4. Fourth Example of Driving Method for Pixel Circuit 181G]

Figure 42:
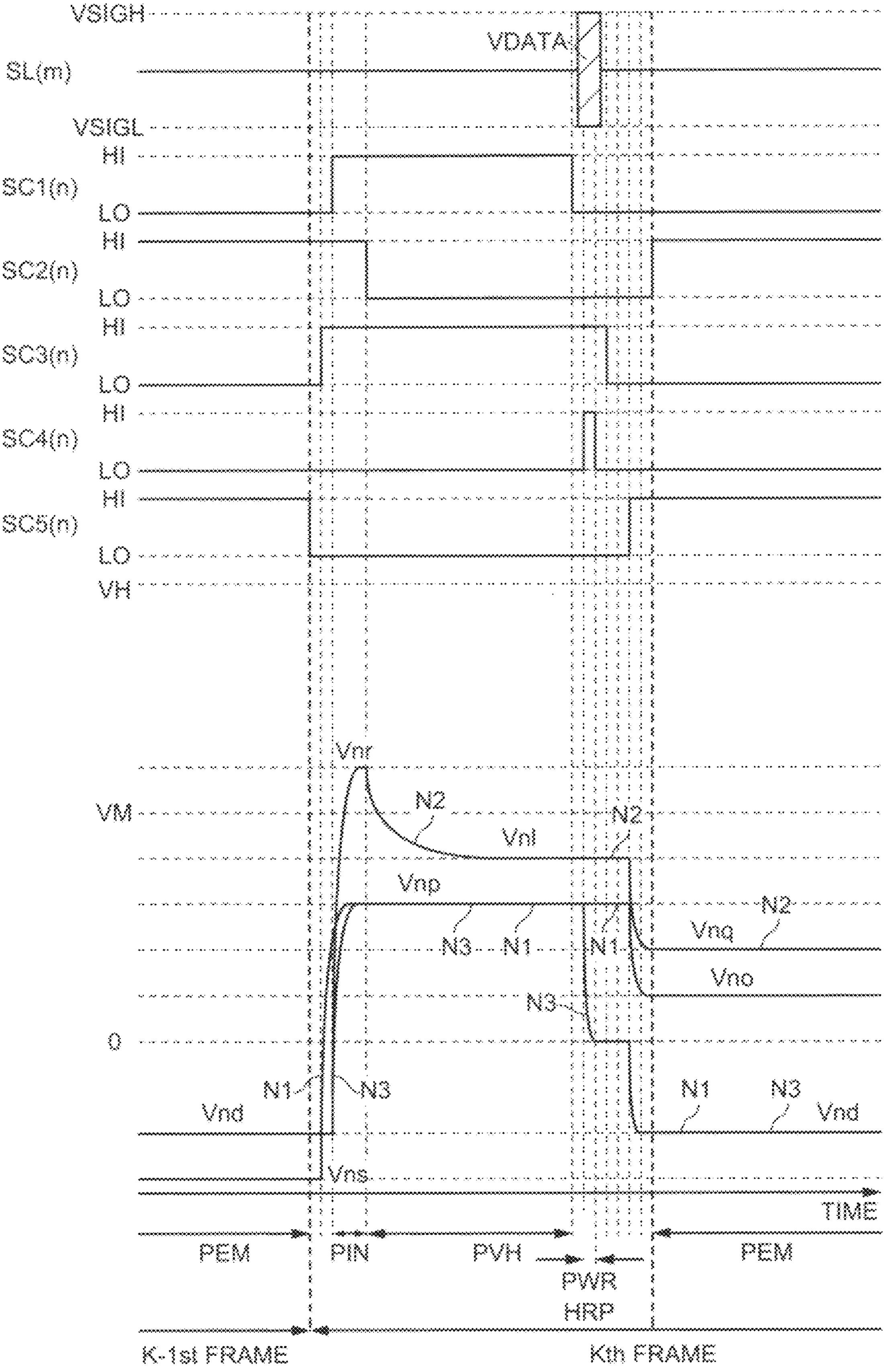
FIG. 42 is a timing chart of the pixel circuit according to the eighth embodiment of the present invention.

Referring to FIG. 42, a fourth example of the driving method for the pixel circuit 181G will be described. The driving method shown in the fourth example of the driving method for the pixel circuit 181G includes displaying images of differing colors in successive frames as in the fourth example of the driving method for the display device 10 according to the first embodiment. Configurations that are the same as or similar to those in FIG. 31 to FIG. 41 will be described as necessary.

The voltage (potential) of each node in the emission period PEM of the K−1stFRAME to the period PVH of the KthFRAME, a configuration of each scan signal, operation of each transistor, and the like are the same as those described in "8-2-3. Third Example of Driving Method for Pixel Circuit 181G". Further, the voltage (potential) of each node in the period after the period PVH of the KthFRAME to the emission period PEM of the KthFRAME, a configuration of each scan signal, operation of each transistor, and the like are the same as those described in "8-2-2. Second Example of Driving Method for Pixel Circuit 181G". Therefore, the description thereof will be omitted.

The fourth example of the driving method for the pixel circuit 181G has the same advantageous effects as those described in "8-2-1. First Example of Driving Method for Pixel Circuit 181G".

As the embodiment of the present invention, each of the embodiments described above or a part of each of the embodiments described above can be appropriately combined as long as they do not conflict with each other.

It is to be understood that the present invention provides other functional effects that are different from the operational effects provided by the aspects of the embodiments described above, and those that are obvious from the description of the present specification or those that can be easily predicted by a person skilled in the art.

What is claimed is:

1. A display device comprising:

a first transistor electrically connected between an image data signal line to which a data voltage is supplied and a first node, switching of the first transistor is controlled by a first control signal;

a second transistor electrically connected between a power supply line to which a first constant voltage is supplied and a third node, the second transistor includes a gate electrode electrically connected to a second node;

a third transistor electrically connected between the first node and the second node, switching of the third transistor is controlled by a second control signal different from the first control signal;

a fourth transistor electrically connected to the second node, and supplying a reference voltage to the second node, switching of the fourth transistor is controlled by a third control signal different from the first control signal and the second control signal;

a fifth transistor electrically connected between an initialization voltage power supply line to which an initialization voltage is supplied and the third node, switching of the fifth transistor is controlled by a fourth control signal different from the first control signal, the second control signal, and the third control signal;

a sixth transistor electrically connected to the fourth node, and supplying the reference voltage to the fourth node, switching of the sixth transistor is controlled by the third control signal;

a first capacitive element electrically connected between the first node and the fourth node;

a second capacitive element electrically connected between the third node and the fourth node; and a light-emitting element electrically connected to the second transistor.

2. The display device according to claim 1, wherein the light-emitting element is electrically connected to the third node.

3. The display device according to claim 1, wherein the light-emitting element is electrically connected to the third node, and a value of the reference voltage supplied to the second node is different from a value of the reference voltage supplied to the fourth node.

4. The display device according to claim 1, further including a seventh transistor, wherein switching of the seventh transistor is controlled by the second control signal, the seventh transistor being electrically connected between the third node and the light-emitting element, and the light-emitting element is electrically connected to the third node.

5. The display device according to claim 4, further comprising:

an eighth transistor and a reset voltage power supply line to which a reset voltage is supplied, wherein switching of the eighth transistor is controlled by using the third control signal, the eighth transistor being electrically connected between the reset voltage power supply line and the light-emitting element, and the light-emitting element is electrically connected to the third node.

6. The display device according to claim 5, wherein the first transistor, the second transistor, the third transistor, the fourth transistor, the fifth transistor, the sixth transistor, the seventh transistor, and the eighth transistor are n-channel type field effect transistors, and a channel region of each of the first transistor, the second transistor, the third transistor, the fourth transistor, the fifth transistor, the sixth transistor, the seventh transistor, and the eighth transistor is comprised of an oxide semiconductor.

7. The display device according to claim 1, further comprising a reference voltage power supply line to which the reference voltage is supplied, wherein the light-emitting element is electrically connected to the third node, the fourth transistor is electrically connected between the second node and the reference voltage power supply line, and the sixth transistor is electrically connected between the fourth node and the fourth transistor and the second node.

8. The display device according to claim 1, further comprising:

a seventh transistor;

an eighth transistor;

a ninth transistor;

a tenth transistor;

a constant voltage power supply line to which a second constant voltage is supplied; and a reference voltage power supply line to which a reference voltage is supplied;

wherein the second transistor is electrically connected between the third node and the fifth node, switching of the seventh transistor is controlled by using the second control signal, the seventh transistor being electrically connected between the third node and the reference voltage power supply line, switching of the eighth transistor is controlled by using the third control signal, the eighth transistor being electrically connected between the power supply line and a sixth node, switching of the ninth transistor is controlled by using the second control signal, the ninth transistor being electrically connected between the fifth node and the sixth node, switching of the tenth transistor is controlled by using the third control signal, the tenth transistor being electrically connected between the fifth node and the constant voltage power supply line, and the light-emitting element is electrically connected between the power supply line and the sixth node.

9. The display device according to claim 8, wherein the first transistor, the second transistor, the third transistor, the fourth transistor, the fifth transistor, the sixth transistor, the seventh transistor, the eighth transistor, the ninth transistor, and the tenth transistor are n-channel type field effect transistors, and a channel region of each of the first transistor, the second transistor, the third transistor, the fourth transistor, the fifth transistor, the sixth transistor, the seventh transistor, the eighth transistor, the ninth transistor, and the tenth transistor is comprised of an oxide semiconductor.

10. The display device according to claim 1, wherein the first transistor, the second transistor, the third transistor, the fourth transistor, the fifth transistor, and the sixth transistor are n-channel type field effect transistors, and a channel region of each of the first transistor, the second transistor, the third transistor, the fourth transistor, the fifth transistor, and the sixth transistor is comprised of an oxide semiconductor.

11. The display device according to claim 1, further comprising a control circuit outputting the first control signal, the second control signal, the third control signal, and the fourth control signal, wherein the control circuit performs control so that a period during which a high-level voltage is supplied to the first control signal switching ON the first transistor and the first transistor supplies the data voltage to the first node overlaps a part of a period during which a high-level voltage is supplied to the third control signal switching ON the sixth transistor, and the sixth transistor supplies the reference voltage to the fourth node, and the control circuit performs control so that a potential difference corresponding to the data voltage is held in the first capacitive element and a potential difference corresponding to a threshold voltage of the second transistor is held in the second capacitive element.

12. The display device according to claim 1, wherein the gate electrode overlaps the first capacitive element and the second capacitive element in a plan view.

13. A display device comprising:

a first transistor and electrically connected between an image data signal line to which a data voltage is supplied and a first node, switching of the first transistor is controlled by a first control signal;

a second transistor electrically connected between a third node and a fourth node, the second transistor includes a gate electrode electrically connected to a second node;

a third transistor electrically connected between a reference voltage power supply line to which a reference voltage is supplied and the first node, switching of the third transistor is controlled by a second control signal different from the first control signal;

a fourth transistor electrically connected between the second node and the fourth node, switching of the fourth transistor is controlled by the second control signal;

a fifth transistor electrically connected between a reset voltage power supply line to which a reset voltage is supplied and the fourth node, switching of the fifth transistor is controlled by a third control signal different from the first control signal and the second control signal;

a sixth transistor electrically connected between an initialization voltage power supply line to which an initialization voltage is supplied and the third node, switching of the sixth transistor is controlled by a fourth control signal different from the first control signal, the second control signal, and the third control signal;

a seventh transistor electrically connected between a power supply line through which a constant voltage is supplied and the fourth node, switching of the seventh transistor is controlled by a fifth control signal different from the first control signal, the second control signal, the third control signal, and the fourth control signal;

a first capacitive element electrically connected between the first node and the second node;

a second capacitive element electrically connected between the first node and the third node; and a light-emitting element electrically connected to the third node.

14. The display device according to claim 13, wherein the first transistor, the second transistor, the third transistor, the fourth transistor, the fifth transistor, the sixth transistor, and the seventh transistor are n-channel type field effect transistors, and a channel region of each of the first transistor, the second transistor, the third transistor, the fourth transistor, the fifth transistor, the sixth transistor, and the seventh transistor is comprised of an oxide semiconductor.

15. The display device according to claim 13, further comprising a control circuit outputting the first control signal, the second control signal, the third control signal, the fourth control signal, and the fifth control signal, wherein the control circuit controls the first capacitive element to hold a potential difference corresponding to a threshold voltage of the second transistor, and then controls the second capacitive element to hold a potential difference corresponding to the data voltage.

16. A display device comprising:

a first transistor electrically connected between an image data signal line to which a data voltage is supplied and a third node, switching of the first transistor is controlled by a first control signal;

a second transistor electrically connected between the third node and a fourth node, the second transistor includes a gate electrode electrically connected to a second node;

a third transistor electrically connected between the second node and the fourth node, switching of the third transistor is controlled by a second control signal different from the first control signal;

a fourth transistor electrically connected between a reference voltage power supply line to which a reference voltage serving as an initialization voltage is supplied and the third node, switching of the fourth transistor is controlled by the second control signal;

a fifth transistor electrically connected between the fourth node and a fifth node, switching of the fifth transistor is controlled by a third control signal different from the first control signal and the second control signal;

a sixth transistor the third control signal, and electrically connected between the reference voltage power supply line and the first node, switching of the sixth transistor is controlled by a fourth control signal different from the first control signal, the second control signal;

a seventh transistor electrically connected between a reference voltage line to which a reference voltage is supplied and the third node, switching of the seventh transistor is controlled by a fifth control signal different from the first control signal, the second control signal, the third control signal, and the fourth control signal;

an eighth transistor electrically connected between a power supply line to which a constant voltage is supplied and the fifth node, switching of the eighth transistor is controlled by the fourth control signal;

a first capacitive element electrically connected between the first node and the second node;

a second capacitive element electrically connected between the first node and the third node; and a light-emitting element electrically connected between the power supply line and the fifth node.

17. The display device according to claim 16, wherein the first transistor, the second transistor, the third transistor, the fourth transistor, the fifth transistor, the sixth transistor, the seventh transistor, and the eighth transistor are n-channel type field effect transistors, and a channel region of each of the first transistor, the second transistor, the third transistor, the fourth transistor, the fifth transistor, the sixth transistor, the seventh transistor, and the eighth transistor is comprised of an oxide semiconductor.

18. The display device according to claim 16, further including a control circuit outputting the first control signal, the second control signal, the third control signal, the fourth control signal, and the fifth control signal, wherein the control circuit controls the first capacitive element to hold a potential difference corresponding to a threshold voltage of the second transistor, and then controls the second capacitive element to hold a potential difference corresponding to the data voltage.

* * * * *